United States Patent
Ito

(10) Patent No.: US 10,015,473 B2
(45) Date of Patent: *Jul. 3, 2018

(54) COMPUTER-READABLE STORAGE MEDIUM, IMAGE DISPLAY APPARATUS, IMAGE DISPLAY SYSTEM, AND IMAGE DISPLAY METHOD

(75) Inventor: Yuichiro Ito, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 270 days.

This patent is subject to a terminal disclaimer.

(21) Appl. No.: 13/158,939

(22) Filed: Jun. 13, 2011

(65) Prior Publication Data
US 2011/0304703 A1 Dec. 15, 2011

(30) Foreign Application Priority Data

Jun. 11, 2010 (JP) .................. 2010-134545
Jun. 11, 2010 (JP) .................. 2010-134575
Jun. 14, 2010 (JP) .................. 2010-135507

(51) Int. Cl.
G06T 19/00 (2011.01)
H04N 13/02 (2006.01)
H04N 13/00 (2018.01)

(52) U.S. Cl.
CPC ....... *H04N 13/0239* (2013.01); *G06T 19/006* (2013.01); *H04N 13/004* (2013.01); *H04N 13/0275* (2013.01)

(58) Field of Classification Search
CPC combination set(s) only.
See application file for complete search history.

(56) References Cited

U.S. PATENT DOCUMENTS 5,161,803 A 11/1992 Ohara
5,184,830 A 2/1993 Okada et al.
(Continued)

FOREIGN PATENT DOCUMENTS

CN 1244762 2/2000
CN 1845064 10/2006
(Continued)

OTHER PUBLICATIONS

Report on Nintendo DS Lite Hardware, Mar. 2, 2006, download from the internet, with a partial English translation, 13 pages.
(Continued)

*Primary Examiner* — Dave Czekaj
*Assistant Examiner* — Tyler W Sullivan
(74) *Attorney, Agent, or Firm* — Nixon & Vanderhye P.C.

(57) ABSTRACT

First, the interval between a left virtual camera and a right virtual camera is determined based on the relative position and the relative orientation of an outer imaging section (left) with respect to a marker, which are calculated from a result of marker recognition in the left real world image, and on the relative position and the relative orientation of an outer imaging section (right) with respect to the marker, which are calculated from a result of marker recognition in the right real world image. After the interval between the left virtual camera and the right virtual camera is determined, the positions and the orientations of the left virtual camera and the right virtual camera are determined based on the determined interval such that the relationship between the position and the orientation of the left virtual camera, and the position and the orientation of the right virtual camera is ideal.

17 Claims, 30 Drawing Sheets

(56) References Cited

U.S. PATENT DOCUMENTS

| | | | |
|---|---|---|---|
| 5,684,529 A | 11/1997 | Yoshimi et al. | |
| 5,704,837 A | 1/1998 | Iwasaki et al. | |
| 5,964,830 A | 10/1999 | Durrett | |
| 6,005,607 A | 12/1999 | Uomori et al. | |
| 6,020,891 A | 2/2000 | Rekimoto | |
| 6,042,478 A | 3/2000 | Ng | |
| 6,057,833 A | 5/2000 | Heidmann et al. | |
| 6,057,909 A | 5/2000 | Yahav et al. | |
| 6,160,574 A | 12/2000 | Oba et al. | |
| 6,252,624 B1 | 6/2001 | Yuasa et al. | |
| 6,313,864 B1 | 11/2001 | Tabata et al. | |
| 6,325,287 B1 | 12/2001 | Nakajima et al. | |
| 6,342,900 B1 | 1/2002 | Ejima et al. | |
| 6,384,859 B1 | 5/2002 | Matsumoto et al. | |
| 6,474,819 B2 | 11/2002 | Yoder et al. | |
| 6,504,710 B2 | 1/2003 | Sutton et al. | |
| 6,518,939 B1 * | 2/2003 | Kikuchi | G06F 3/147 345/7 |
| 6,529,875 B1 | 3/2003 | Nakajima et al. | |
| 6,708,046 B1 | 3/2004 | Takagi | |
| 6,743,104 B1 | 6/2004 | Ota et al. | |
| 6,810,463 B2 | 10/2004 | Okada et al. | |
| 6,820,056 B1 | 11/2004 | Harif | |
| 6,897,865 B2 | 5/2005 | Higashiyama | |
| 7,321,682 B2 * | 1/2008 | Tooyama | H04N 13/0011 348/E13.022 |
| 7,371,163 B1 | 5/2008 | Best | |
| 7,374,490 B2 | 5/2008 | Tahara et al. | |
| 7,519,218 B2 * | 4/2009 | Takemoto et al. | 382/165 |
| 7,532,224 B2 | 5/2009 | Bannai | |
| 7,571,103 B2 | 8/2009 | Mizuki et al. | |
| 7,643,025 B2 | 1/2010 | Lange | |
| 7,760,242 B2 * | 7/2010 | Anabuki | G06F 3/0325 348/208.14 |
| 8,115,814 B2 | 2/2012 | Iwase et al. | |
| 8,189,038 B2 | 5/2012 | DeCusatis et al. | |
| 8,202,094 B2 | 6/2012 | Spector | |
| 8,305,428 B2 | 11/2012 | Hu | |
| 8,411,931 B2 | 4/2013 | Zhou et al. | |
| 8,418,924 B2 * | 4/2013 | Hepworth et al. | 235/454 |
| 8,830,304 B2 | 9/2014 | Miyatani et al. | |
| 9,025,007 B1 * | 5/2015 | Parsons | H04N 13/0246 345/419 |
| 9,530,249 B2 * | 12/2016 | Kawamoto | G06T 19/006 |
| 2001/0019946 A1 | 9/2001 | Okuda | |
| 2001/0050756 A1 * | 12/2001 | Lipton | H04N 13/0257 353/15 |
| 2002/0078291 A1 | 6/2002 | Sutton et al. | |
| 2002/0113865 A1 | 8/2002 | Yano et al. | |
| 2002/0120925 A1 | 8/2002 | Logan | |
| 2003/0062675 A1 | 4/2003 | Noro et al. | |
| 2004/0077404 A1 | 4/2004 | Schlottmann et al. | |
| 2005/0018045 A1 | 1/2005 | Thomas et al. | |
| 2005/0089212 A1 * | 4/2005 | Mashitani | H04N 13/0296 382/154 |
| 2005/0094019 A1 * | 5/2005 | Grosvenor | G03B 17/00 348/335 |
| 2005/0129325 A1 * | 6/2005 | Wu | G06T 7/593 382/254 |
| 2005/0175257 A1 | 8/2005 | Kuroki | |
| 2005/0239521 A1 | 10/2005 | Harada et al. | |
| 2005/0253924 A1 | 11/2005 | Mashitani | |
| 2005/0270309 A1 * | 12/2005 | Murata | A63F 13/10 345/632 |
| 2005/0270368 A1 | 12/2005 | Hashimoto | |
| 2006/0038833 A1 | 2/2006 | Mallinson et al. | |
| 2006/0060463 A1 | 3/2006 | Tokusashi | |
| 2006/0073892 A1 | 4/2006 | Watanabe et al. | |
| 2006/0171582 A1 | 8/2006 | Eichhorn | |
| 2006/0203085 A1 | 9/2006 | Tomita | |
| 2006/0227151 A1 | 10/2006 | Bannai | |
| 2006/0232584 A1 | 10/2006 | Utsugi et al. | |
| 2006/0239558 A1 | 10/2006 | Rafii et al. | |
| 2006/0244757 A1 | 11/2006 | Fang et al. | |
| 2007/0001003 A1 | 1/2007 | Lee et al. | |
| 2007/0038944 A1 | 2/2007 | Carignano et al. | |
| 2007/0126733 A1 | 6/2007 | Yang et al. | |
| 2007/0178952 A1 | 8/2007 | Ehara et al. | |
| 2007/0197291 A1 | 8/2007 | Shimizu et al. | |
| 2007/0216766 A1 | 9/2007 | Nakaya | |
| 2007/0236514 A1 | 10/2007 | Agusanto et al. | |
| 2007/0260984 A1 | 11/2007 | Marks et al. | |
| 2007/0273644 A1 | 11/2007 | Natucci | |
| 2008/0024523 A1 | 1/2008 | Tomite et al. | |
| 2008/0037863 A1 | 2/2008 | Tooyama et al. | |
| 2008/0071559 A1 | 3/2008 | Arrasvuori | |
| 2008/0100620 A1 | 5/2008 | Nagai et al. | |
| 2008/0109729 A1 | 5/2008 | Notea et al. | |
| 2008/0188303 A1 | 8/2008 | Schlottmann et al. | |
| 2008/0215973 A1 | 9/2008 | Zalewski et al. | |
| 2008/0225041 A1 | 9/2008 | El Dokor et al. | |
| 2008/0246757 A1 * | 10/2008 | Ito | G06T 15/10 345/419 |
| 2008/0266386 A1 * | 10/2008 | Maeda | G06F 3/012 348/47 |
| 2008/0284842 A1 | 11/2008 | Hu | |
| 2008/0292131 A1 | 11/2008 | Takemoto et al. | |
| 2009/0033740 A1 * | 2/2009 | Ishikawa | G06T 15/205 348/39 |
| 2009/0059497 A1 | 3/2009 | Kuwahara et al. | |
| 2009/0060490 A1 | 3/2009 | Kuwahara et al. | |
| 2009/0070476 A1 | 3/2009 | Brackx et al. | |
| 2009/0224999 A1 | 9/2009 | Kuwahara et al. | |
| 2009/0262108 A1 * | 10/2009 | Davidson | G06T 19/00 345/419 |
| 2009/0262184 A1 | 10/2009 | Engle et al. | |
| 2009/0278764 A1 | 11/2009 | Kuwahara et al. | |
| 2009/0278974 A1 | 11/2009 | Kuwahara et al. | |
| 2009/0285484 A1 | 11/2009 | Mallinson et al. | |
| 2009/0303231 A1 | 12/2009 | Robinet et al. | |
| 2009/0322860 A1 | 12/2009 | Zhang et al. | |
| 2010/0020222 A1 | 1/2010 | Jones et al. | |
| 2010/0026712 A1 | 2/2010 | Aliprandi et al. | |
| 2010/0048290 A1 | 2/2010 | Baseley et al. | |
| 2010/0085423 A1 | 4/2010 | Lange | |
| 2010/0085693 A1 | 4/2010 | Koshiishi | |
| 2010/0091096 A1 | 4/2010 | Oikawa et al. | |
| 2010/0103075 A1 | 4/2010 | Kalaboukis et al. | |
| 2010/0120473 A1 | 5/2010 | Oh | |
| 2010/0136507 A1 * | 6/2010 | Miyata | G09B 9/05 434/29 |
| 2010/0142801 A1 | 6/2010 | Koppal et al. | |
| 2010/0182432 A1 | 7/2010 | Augst | |
| 2010/0257252 A1 | 10/2010 | Doughterty et al. | |
| 2010/0304857 A1 * | 12/2010 | Suzuki | A63F 13/10 463/31 |
| 2010/0316367 A1 | 12/2010 | Kuwahara et al. | |
| 2010/0329543 A1 * | 12/2010 | Li | G06T 3/0068 382/154 |
| 2011/0029903 A1 * | 2/2011 | Schooleman et al. | 715/764 |
| 2011/0034103 A1 | 2/2011 | Fong et al. | |
| 2011/0109720 A1 | 5/2011 | Smolic et al. | |
| 2011/0117958 A1 | 5/2011 | Kim et al. | |
| 2011/0205341 A1 * | 8/2011 | Wilson | H04N 13/0275 348/51 |
| 2011/0242286 A1 * | 10/2011 | Pace | H04N 13/0025 348/47 |
| 2011/0242361 A1 | 10/2011 | Kuwahara et al. | |
| 2011/0252122 A1 | 10/2011 | Takeda et al. | |
| 2011/0292033 A1 | 12/2011 | Umezu et al. | |
| 2011/0304611 A1 | 12/2011 | Suzuki | |
| 2011/0304714 A1 | 12/2011 | Akifusa et al. | |
| 2012/0007953 A1 | 1/2012 | Sung | |
| 2012/0077582 A1 | 3/2012 | Noge | |
| 2012/0113228 A1 | 5/2012 | Konno et al. | |

FOREIGN PATENT DOCUMENTS

| | | |
|---|---|---|
| CN | 101039441 | 9/2007 |
| EP | 1 720 131 | 11/2006 |
| EP | 2 157 545 | 2/2010 |
| EP | 2 172 252 | 4/2010 |

(56) References Cited

FOREIGN PATENT DOCUMENTS

| | | |
|---|---|---|
| EP | 2 187 295 | 5/2010 |
| JP | 06-339155 | 12/1994 |
| JP | 10-51711 | 2/1998 |
| JP | 2000-069404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-159019 | 5/2002 |
| JP | 2002-230586 | 8/2002 |
| JP | 1160365 | 12/2002 |
| JP | 2003-103052 | 4/2003 |
| JP | 2004-7214 | 1/2004 |
| JP | 2004-310686 | 11/2004 |
| JP | 2005-20559 | 1/2005 |
| JP | 2005-151162 | 6/2005 |
| JP | 2005-165776 | 6/2005 |
| JP | 2005-230139 | 9/2005 |
| JP | 2005-250950 | 9/2005 |
| JP | 2005-286714 | 10/2005 |
| JP | 2006-024175 | 1/2006 |
| JP | 2006-060516 | 3/2006 |
| JP | 2006-72667 | 3/2006 |
| JP | 2006-86099 | 3/2006 |
| JP | 2006-235774 | 9/2006 |
| JP | 2006-262980 | 10/2006 |
| JP | 2006-271663 | 10/2006 |
| JP | 2007-12025 | 1/2007 |
| JP | 2007-293453 | 11/2007 |
| JP | 2008-502206 | 1/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 2008146109 A * | 6/2008 |
| JP | 2008-277903 | 11/2008 |
| JP | 2008-277920 | 11/2008 |
| JP | 4260215 | 2/2009 |
| JP | 2009025918 A * | 2/2009 |
| JP | 2009-089435 | 4/2009 |
| JP | 2009-151608 | 7/2009 |
| JP | 2009-205556 | 9/2009 |
| JP | 2010-092436 | 4/2010 |
| JP | 2010-170316 | 8/2010 |
| JP | 2010-532120 | 9/2010 |
| JP | 2010-239568 | 10/2010 |
| JP | 2010-244575 | 10/2010 |
| JP | 2010-271950 | 12/2010 |
| JP | 2011212270 A * | 10/2011 |
| WO | 98/02223 | 1/1998 |
| WO | 03/105450 | 12/2003 |
| WO | 2007/111570 | 10/2007 |
| WO | WO 2009/127701 A1 | 10/2009 |
| WO | WO 2009127701 A1 * | 10/2009 |
| WO | 2010/038296 | 4/2010 |

OTHER PUBLICATIONS

Kato et al., "An Augmented Reality System and its Calibration based on Marker Tracking", Transactions of the Virtual Reality Society of Japan, vol. 4, No. 4, 1999, pp. 607-616.
Report on Nintendo DS Lite Hardwire, Mar. 2, 2006, 5 pages, http://pc.watch.impress.co.jp/docs/2006/0302/nintendo.htm.
Yokoya et al., "Stereo Vision Based Video See-through Mixed Reality" Mixed Reality, Merging Real and Virtual Worlds, Proceedings of International Symposium on Mix Reality, Merging Real and Virtual Worlds, Jan. 1, 1999, pp. 131-145, 15 pages.
U.S. Appl. No. 12/862,119, filed Aug. 24, 2010, Shidi Kitahara et al.
U.S. Appl. No. 13/158,824, filed Jun. 13, 2011, Yuichiro Ito.
U.S. Appl. No. 13/158,939, filed Jun. 13, 2011, Yuichiro Ito.
U.S. Appl. No. 13/158,736, filed Jun. 13, 2011, Yuichiro Ito.
U.S. Appl. No. 13/243,622, filed Sep. 23, 2011, Yuichior Ito et al.
Sep. 20, 2012 Office Action in U.S. Appl. No. 12/862,119, 31 pages.
Watt, Alan, 3D Computer Graphics, Addison Wesley, 3rd Edition, 2000, pp. 1-17.
Otsuki et al. "Novel Interaction Methods with Mixed Reality Space" SICE Annual Conference, The University Electro-Communications, pp. 456-460, Japan Aug. 20-22, 2008.
Office Action for U.S. Appl. No. 12/946,248, dated Oct. 7, 2013.
Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999, 10 pages.
U.S. Appl. No. 12/862,119, filed Aug. 24, 2010, Shinji Kitahara et al.
U.S. Appl. No. 12/946,248, filed Nov. 15, 2010, Yasuyuki Oyagi et al.
U.S. Appl. No. 13/030,499, filed Feb. 18, 2011, Yui Ehara et al.
U.S. Appl. No. 13/006,039, filed Jan. 13, 2011, Hideki Konno et al.
Jun. 11, 2012, Notice of Allowance for U.S. Appl. No. 13/006,039, 16 pages.
Nov. 9, 2012 Office Action in U.S. Appl. No. 12/946,248, 40 pages.
Office Action for U.S. Appl. No. 13/158,736, dated Oct. 28, 2013.
May 23, 2013 Office Action from U.S. Appl. No. 13/158,736, 41 pages.
Yoon et aI., Interactive Training for Synthetic Characters, American Association for Artificial Intelligence (1999), 6 pages.
Mar. 29, 2013 Final Office Action for U.S. Appl. No. 12/946,248, 40 pages.
Apr. 25, 2013 Final Office Action for U.S. Appl. No. 12/862,119, 31 pages.
Apr. 15, 2013 Notice of Allowance for U.S. Appl. No. 13/030,499, 18 pages.
Oct. 23, 2013 Office Action in U.S. Appl. No. 13/158,824, 48 pages.
Oct. 25, 2013 Office Action in U.S. Appl. No. 13/243,622, 33 pages.
Notebook Computer [Vaio Note Z] PCG-Z1/P, Japan, Sony Co., Ltd., Mar. 2003, Internet <URL: http://www.vaio.sony.co.jp/Products/Pdf/pcg-zl.pdf>, [searched on Oct. 24, 2013], 8 pages.
Nov. 5, 2013 Notice of Reasons for Rejection for JP 2010-135192, with an English translation, 6 pages.
Yoon et al., Interactive Training for Synthetic Characters, American Association for Artificial Intelligence (1999), 6 pages.
Andrew Bookholt: "MacBook Pro 15" Unibody Mid 2010 LCD Replacement, iFixit, Apr. 13, 2010 (Apr. 13, 2010), XP002722878, Retrieved from the Internet: URL:http://ifixit-guide-pdfs.s3.amazonaws.com/guide_3581_en.pdf [retrieved on Mar. 5, 2014].
"MacBook Pro", Wikipedia, Jun. 9, 2010 (Jun. 9, 2010), XP002722879, Retrieved from the Internet: URL:http://en.wikipedia.org/w/index.php?title=MacBook_Pro
&oldid=366931126 [retrieved on Mar. 5, 2014], the whole document.
Jason Chen: "Open Gal", Gizmode, Apr. 20, 2010 (Apr. 20, 2010), XP002722880, Retrieved from the Internet: URL:http://gizmodo.com/5520877/open-gal/all [retrieved on Mar. 5, 2014].
Andrew Liszewski: "Hands-On With the Nintendo DSi", OhGizmo!, May 6, 2010 (May 6, 2010), XP002722881, Retrieved from the Internet: URL:http://www.ohgizmo.com/2009/05/06/hands-on-with-the-nintendo-dsi/ [retrieved on Mar. 31, 2014].
Nintendo Repair Shop Inc.: "How to Repair DS Hinge and Shell", YouTube, Mar. 11, 2005 (Mar. 11, 2005), Retrieved from the Internet: URL:http://www.youtube.com/watch?v=HxHpQTxCcT0 [retrieved on Apr. 1, 2014].
"Nintendo DS", Wikipedia, Jun. 10, 2010 (Jun. 10, 2010), XP002722882, Retrieved from the Internet: URL:http://en.wikipedia.org/w/index.php?titl=Nintendo_DS&oldid=367317982 [retrieved on Apr. 1, 2014]; p. 1.
Office Action issued in U.S. Appl. No. 13/158,824 dated May 8, 2014.
Office Action issued in U.S. Appl. No. 13/243,622 dated Jun. 3, 2014.
Advisory Action issued in U.S. Appl. No. 13/158,824 dated Aug. 19, 2014.
Office Action issued in U.S. Appl. No. 13/158,824 dated Oct. 3, 2014.

(56) References Cited

OTHER PUBLICATIONS

Office Action issued in U.S. Appl. No. 13/746,600 dated May 28, 2015.
Office Action issued in U.S. Appl. No. 13/746,600 dated May 27, 2015.
Notice of Allowance issued in U.S. Appl. No. 13/746,600.
Notice of Allowance issued in U.S. Appl. No. 13/243,622.
French Wikipedia, "Stereoscopie", Jun. 7, 2010, 12 pages (with translation).
Notice of Opposition issued on Dec. 1, 2015 in corresponding EP Application No. 11168393.4, 38 pages.
Non-Final Office Action issued in co-pending U.S. Appl. No. 13/158,824 dated Jan. 8, 20189, (35 pages).
European Search Report issued in Application Serial No. 11181971.0 dated May 19, 2016.

* cited by examiner

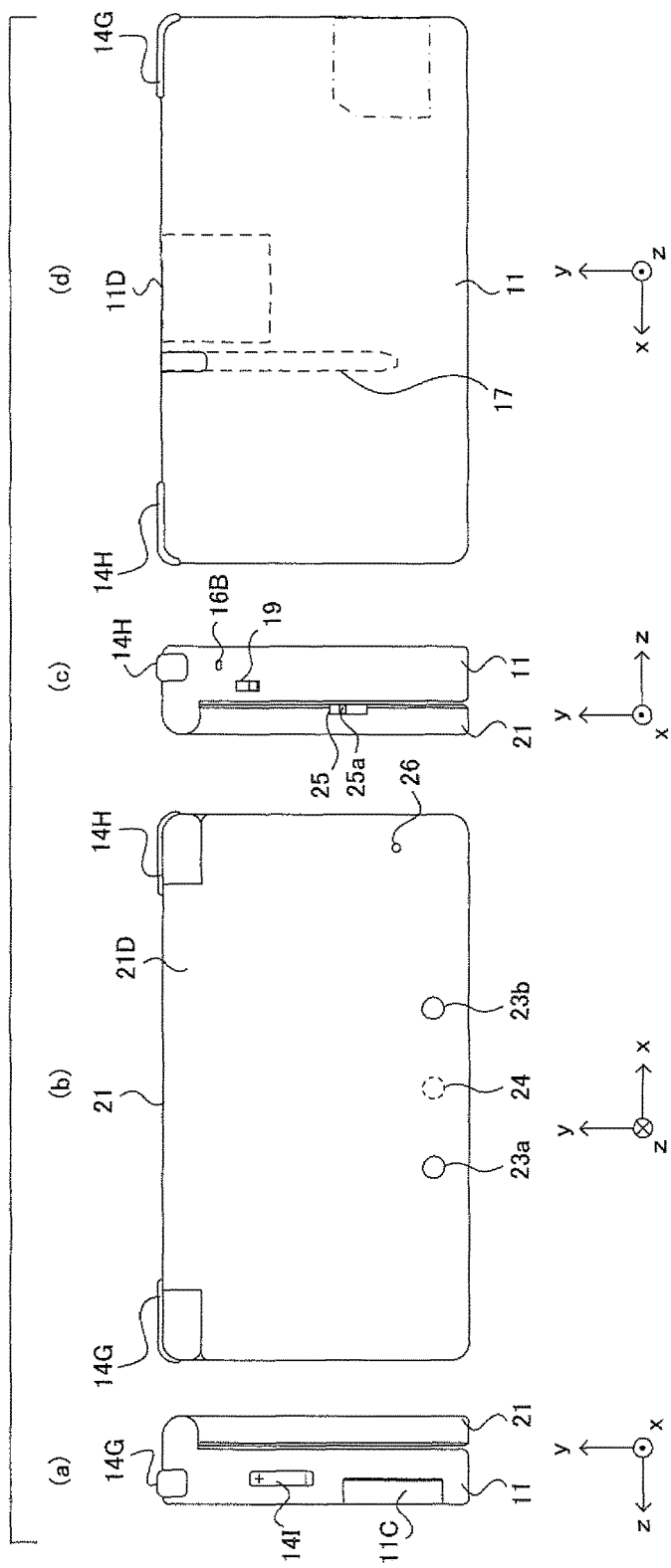

(THIRD POSITION)

(FIRST POSITION)

FIG. 11

| | |
|---|---|
| IMAGE DISPLAY PROGRAM | 70 |
| LATEST LEFT REAL WORLD IMAGE | 71L |
| LATEST RIGHT REAL WORLD IMAGE | 71R |
| DISPLAY LEFT REAL WORLD IMAGE | 72L |
| DISPLAY RIGHT REAL WORLD IMAGE | 72R |
| STEREOSCOPIC VIEW ZERO DISTANCE | 73 |
| VIRTUAL OBJECT INFORMATION | 74 |
| LEFT TRANSFORM MATRIX | 75L |
| RIGHT TRANSFORM MATRIX | 75R |
| LEFT VIEW MATRIX | 76L |
| RIGHT VIEW MATRIX | 76R |
| LEFT PROJECTION MATRIX | 77L |
| RIGHT PROJECTION MATRIX | 77R |
| DISPLAY MODE (SYNCHRONOUS DISPLAY/ASYNCHRONOUS DISPLAY) | 78 |
| MARKER RECOGNITION MODE (ONE-IMAGE RECOGNITION/BOTH-IMAGE RECOGNITION) | 79 |
| MAIN REAL WORLD IMAGE IDENTIFICATION INFORMATION (LEFT REAL WORLD IMAGE/RIGHT REAL WORLD IMAGE) | 80 |
| VARIABLES | 81 |

F I G. 3 3
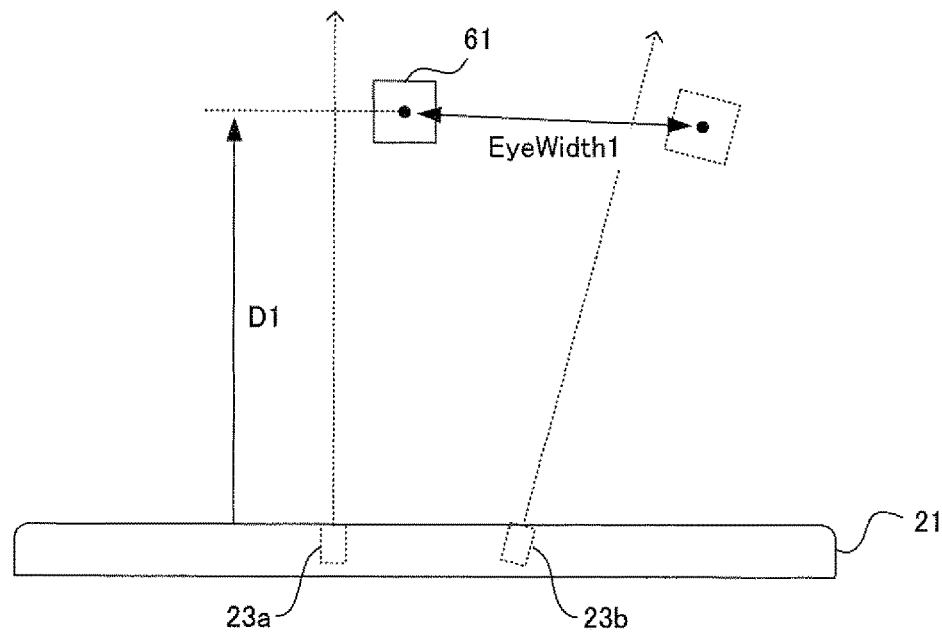
F I G. 3 4
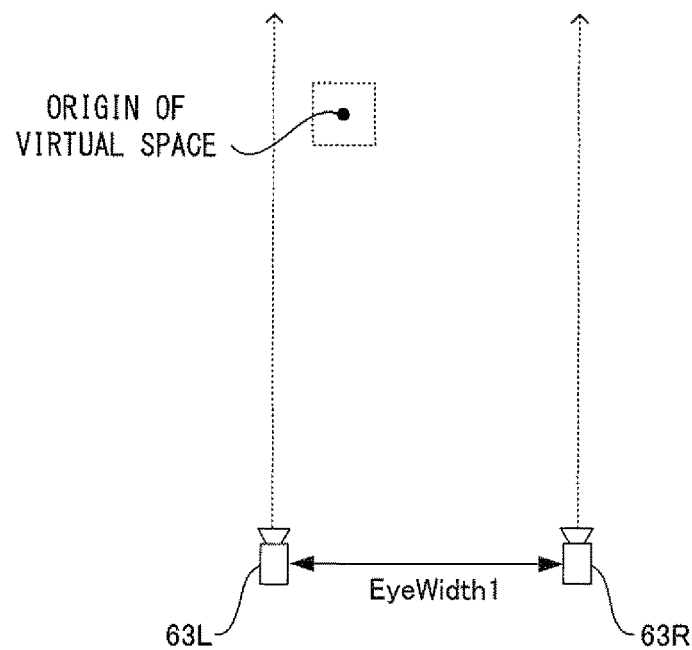

COMPUTER-READABLE STORAGE MEDIUM, IMAGE DISPLAY APPARATUS, IMAGE DISPLAY SYSTEM, AND IMAGE DISPLAY METHOD

CROSS REFERENCE TO RELATED APPLICATION

The disclosures of Japanese Patent Application No. 2010-134545, filed on Jun. 11, 2010, Japanese Patent Application No. 2010-134575, filed on Jun. 11, 2010, and Japanese Patent Application No. 2010-135507, filed on Jun. 14, 2010 are incorporated herein by reference.

FIELD

The present invention relates to a computer-readable storage medium, an image display apparatus, an image display system, and an image display method, and more particularly, to a computer-readable storage medium, an image display apparatus, an image display system, and an image display method for stereoscopically displaying a real world image onto which a 3-dimensional virtual object is superimposed, on a screen of a stereoscopic display apparatus capable of providing a stereoscopic view.

BACKGROUND AND SUMMARY

In recent years, development of an AR (Augmented Reality) technique has been advanced in which a virtual object is superimposed onto an image of a real world and the resultant image is displayed, whereby the virtual object appears to be present in the real world.

For example, a stereoscopic display apparatus disclosed in Patent Literature 1 (Japanese Laid-Open Patent Publication No. 2008-146109) calculates the relative positions and relative orientations of a camera for a right eye and a camera for a left eye with respect to a marker placed in the real world, from respective images shot by the camera for a right eye and the camera for a left eye, which are attached to a head mounted display, and then, based on the result of the calculation, generates an image of a virtual object for a right eye and an image for the virtual object for a left eye. Then, the stereoscopic display apparatus superimposes the image of the virtual object for a right eye and the image for the virtual object for a left eye onto the images shot by the camera for a right eye and the camera for a left eye, respectively, and displays the resultant composite images on an LCD (liquid crystal display) for a right eye and an LCD for a left eye, respectively.

In addition, Non-Patent Literature 1 (Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999) discloses a method of, based on the position and the orientation of a marker in an image shot by a camera, calculating the relative positions and the relative orientations of the marker and the camera with respect to each other in the real world.

However, in the case where the relative positions and the relative orientations of the marker and the camera with respect to each other in the real world are calculated based on the position and the orientation of the marker in an image shot by the camera, if the image shot by the camera is blurred or if the accuracy of marker recognition is not perfect, error occurs in a result of calculation. Therefore, in the stereoscopic display apparatus disclosed in Patent Literature 1, the relative position and orientation of the camera for a right eye with respect to the marker calculated based on an image shot by the camera for a right eye are not always accurate, and also, the relative position and orientation of the camera for a left eye with respect to the marker calculated based on an image shot by the camera for a left eye are not always accurate. An image for a right eye including a virtual object, and an image for a left eye including the virtual object that are generated based on a result of calculation that is not accurate, do not have consistency with each other, that is, they are inconsistence with each other. As a result, a user cannot normally stereoscopically view the virtual object.

Therefore, an object of the present invention is to provide a computer-readable storage medium, an image display apparatus, an image display system, and an image display method that are capable of displaying a virtual object so as to be normally stereoscopically visible.

The present invention has the following features to attain the object mentioned above.

A computer-readable storage medium of the present invention is a computer-readable storage medium having stored therein an image display program which stereoscopically displays a real world image onto which a 3-dimensional virtual object is superimposed, on a screen of a stereoscopic display apparatus capable of providing a stereoscopic view, by using outputs from a real camera imaging section for a right eye and a real camera imaging section for a left eye, the image display program causing a computer to function as: position orientation calculation means for recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; position orientation integrating means for integrating the two pieces of position orientation information calculated by the position orientation calculation means, thereby calculating one piece of position orientation information; virtual camera setting means for determining the position and the orientation of a right virtual camera for generating a virtual image for a right eye, and the position and the orientation of a left virtual camera for generating a virtual image for a left eye, in a predetermined virtual space, based on the one piece of position orientation information integrated by the first position orientation integrating means; right virtual space image generation means for generating a right virtual space image indicating the predetermined virtual space as it is looked at from the right virtual camera; left virtual space image generation means for generating a left virtual space image indicating the predetermined virtual space as it is looked at from the left virtual camera; and display control means for superimposing the right virtual space image onto the piece of real world image data outputted from the real camera imaging section for a right eye, and superimposing the left virtual space image onto the piece of real world image data outputted from the real camera imaging section for a left eye, to output images for a stereoscopic view to the stereoscopic display apparatus.

In the present invention, the virtual camera setting means may determine the positions and the orientations of the right virtual camera and the left virtual camera such that the relationship between relative orientations of the right virtual camera and the left virtual camera with respect to each other is the same as the relationship between designed relative orientations of the real camera imaging section for a right eye and the real camera imaging section for a left eye with respect to each other.

In the present invention, the position orientation integrating means may integrate the information about the relative orientations of the real camera imaging section for a right eye and the predetermined shooting target with respect to each other, and the information about the relative orientations of the real camera imaging section for a left eye and the predetermined shooting target with respect to each other, which are calculated by the position orientation calculation means, thereby calculating one orientation. The virtual camera setting means may use the one orientation integrated by the position orientation integrating means, as each of the orientations of the right virtual camera and the left virtual camera.

In the present invention, the position orientation integrating means may integrate the information about the relative positions of the real camera imaging section for a right eye and the predetermined shooting target with respect to each other, and the information about the relative positions of the real camera imaging section for a left eye and the predetermined shooting target with respect to each other, which are calculated by the position orientation calculation means, thereby calculating one position. The virtual camera setting means may set the positions of the right virtual camera and the left virtual camera so as to be symmetric about the one position integrated by the position orientation integrating means.

In the present invention, the position orientation integrating means may average the information about the relative orientations of the real camera imaging section for a right eye and the predetermined shooting target with respect to each other, and the information about the relative orientations of the real camera imaging section for a left eye and the predetermined shooting target with respect to each other, which are calculated by the position orientation calculation means, thereby calculating an averaged orientation. The virtual camera setting means may use the averaged orientation calculated by the position orientation integrating means, as each of the orientations of the right virtual camera and the left virtual camera.

In the present invention, the position orientation integrating means may calculate the midpoint between the relative position of the real camera imaging section for a right eye and the relative position of the real camera imaging section for a left eye, by using the information about the relative positions of the real camera imaging section for a right eye and the predetermined shooting target with respect to each other, and the information about the relative positions of the real camera imaging section for a left eye and the predetermined shooting target with respect to each other, which are calculated by the position orientation calculation means. The virtual camera setting means may set the positions of the right virtual camera and the left virtual camera so as to be symmetric about the midpoint calculated by the position orientation integrating means.

In the present invention, the image display program may further cause the computer to function as virtual cameras distance determination means for determining the distance between the right virtual camera and the left virtual camera. The virtual camera setting means may set the positions of the right virtual camera and the left virtual camera so as to be symmetric about the position integrated by the position orientation integrating means, and separated by the distance determined by the virtual cameras distance determination means.

In the present invention, the virtual cameras distance determination means may determine the distance between the right virtual camera and the left virtual camera, based on a parallax between the two pieces of real world image data outputted from the real camera imaging section for a right eye and the real camera imaging section for a left eye.

In the present invention, the virtual cameras distance determination means may calculate the distance between the right virtual camera and the left virtual camera, by using the information about the relative positions and relative orientations of the real camera imaging section for a right eye and the predetermined shooting target with respect to each other, and the information about the relative positions and relative orientations of the real camera imaging section for a left eye and the predetermined shooting target with respect to each other, which are calculated by the position orientation calculation means.

An image display apparatus according to a third relevant embodiment stereoscopically displays a real world image onto which a 3-dimensional virtual object is superimposed, on a screen of a stereoscopic display apparatus capable of providing a stereoscopic view, by using outputs from a real camera imaging section for a right eye and a real camera imaging section for a left eye. The image display apparatus comprises: position orientation calculation means for recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; position orientation integrating means for integrating the two pieces of position orientation information calculated by the position orientation calculation means, thereby calculating one piece of position orientation information; virtual camera setting means for determining the position and the orientation of a right virtual camera for generating a virtual image for a right eye, and the position and the orientation of a left virtual camera for generating a virtual image for a left eye, in a predetermined virtual space, based on the one piece of position orientation information integrated by the first position orientation integrating means; right virtual space image generation means for generating a right virtual space image indicating the predetermined virtual space as it is looked at from the right virtual camera; left virtual space image generation means for generating a left virtual space image indicating the predetermined virtual space as it is looked at from the left virtual camera; and display control means for superimposing the right virtual space image onto the piece of real world image data outputted from the real camera imaging section for a right eye, and superimposing the left virtual space image onto the piece of real world image data outputted from the real camera imaging section for a left eye, to output images for a stereoscopic view to the stereoscopic display apparatus.

An image display system according to a third relevant embodiment stereoscopically displays a real world image onto which a 3-dimensional virtual object is superimposed, on a screen of a stereoscopic display apparatus capable of providing a stereoscopic view, by using outputs from a real camera imaging section for a right eye and a real camera imaging section for a left eye. The image display system comprises: a predetermined shooting target; position orientation calculation means for recognizing the predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; position orientation integrating means for integrating the two pieces of position orientation information calculated by the position orientation calculation means, thereby calculating one piece of position orientation information; virtual camera setting means for determining the position and the orientation of a right virtual camera for generating a virtual image for a right eye, and the position and the orientation of a left virtual camera for generating a virtual image for a left eye, in a predetermined virtual space, based on the one piece of position orientation information integrated by the first position orientation integrating means; right virtual space image generation means for generating a right virtual space image indicating the predetermined virtual space as it is looked at from the right virtual camera; left virtual space image generation means for generating a left virtual space image indicating the predetermined virtual space as it is looked at from the left virtual camera; and display control means for superimposing the right virtual space image onto the piece of real world image data outputted from the real camera imaging section for a right eye, and superimposing the left virtual space image onto the piece of real world image data outputted from the real camera imaging section for a left eye, to output images for a stereoscopic view to the stereoscopic display apparatus.

An image display method according to a third relevant embodiment stereoscopically displays a real world image onto which a 3-dimensional virtual object is superimposed, on a screen of a stereoscopic display apparatus capable of providing a stereoscopic view, by using outputs from a real camera imaging section for a right eye and a real camera imaging section for a left eye. The image display method comprises: a position orientation calculation step of recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; a position orientation integrating step of integrating the two pieces of position orientation information calculated in the position orientation calculation step, thereby calculating one piece of position orientation information; a virtual camera setting step of determining the position and the orientation of a right virtual camera for generating a virtual image for a right eye, and the position and the orientation of a left virtual camera for generating a virtual image for a left eye, in a predetermined virtual space, based on the one piece of position orientation information integrated in the first position orientation integrating step; a right virtual space image generation step of generating a right virtual space image indicating the predetermined virtual space as it is looked at from the right virtual camera; a left virtual space image generation step of generating a left virtual space image indicating the predetermined virtual space as it is looked at from the left virtual camera; and a display control step of superimposing the right virtual space image onto the piece of real world image data outputted from the real camera imaging section for a right eye, and superimposing the left virtual space image onto the piece of real world image data outputted from the real camera imaging section for a left eye, to output images for a stereoscopic view to the stereoscopic display apparatus.

According to the present invention, it is possible to display a virtual object so as to be normally stereoscopically visible.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a left side view, a front view, a right side view, and a rear view of the game apparatus 10 in its closed state;

FIG. 11 shows a memory map of a main memory 32 of the game apparatus 10;

FIG. 33 is a diagram illustrating a reason for calculating EyeWidth again;

FIG. 34 is a diagram illustrating the reason for calculating EyeWidth again;

DESCRIPTION OF THE PREFERRED EMBODIMENTS (Structure of Game Apparatus)

Figure 1:
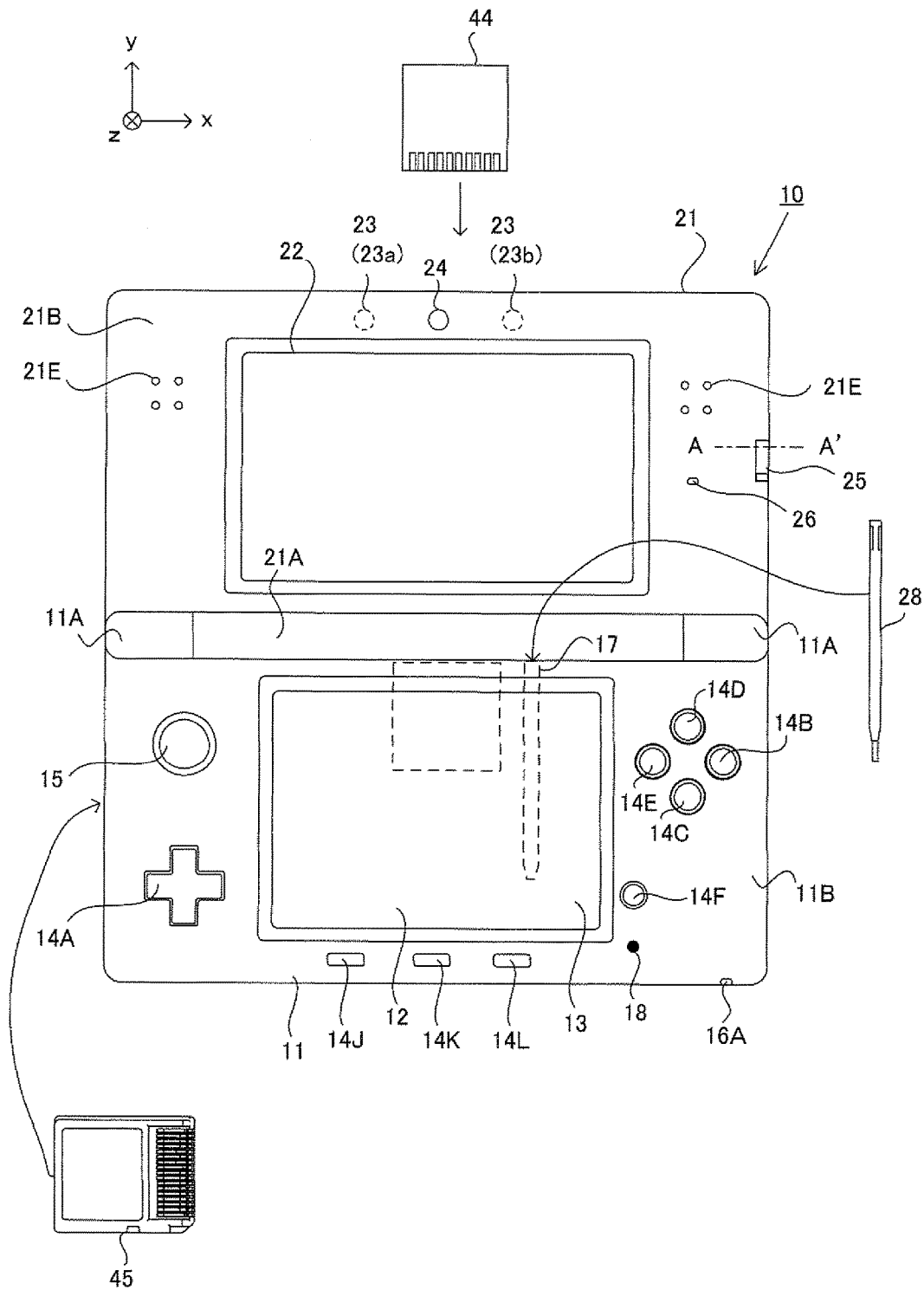
FIG. 1 is a front view of a game apparatus 10 in its opened state.
Figure 2:
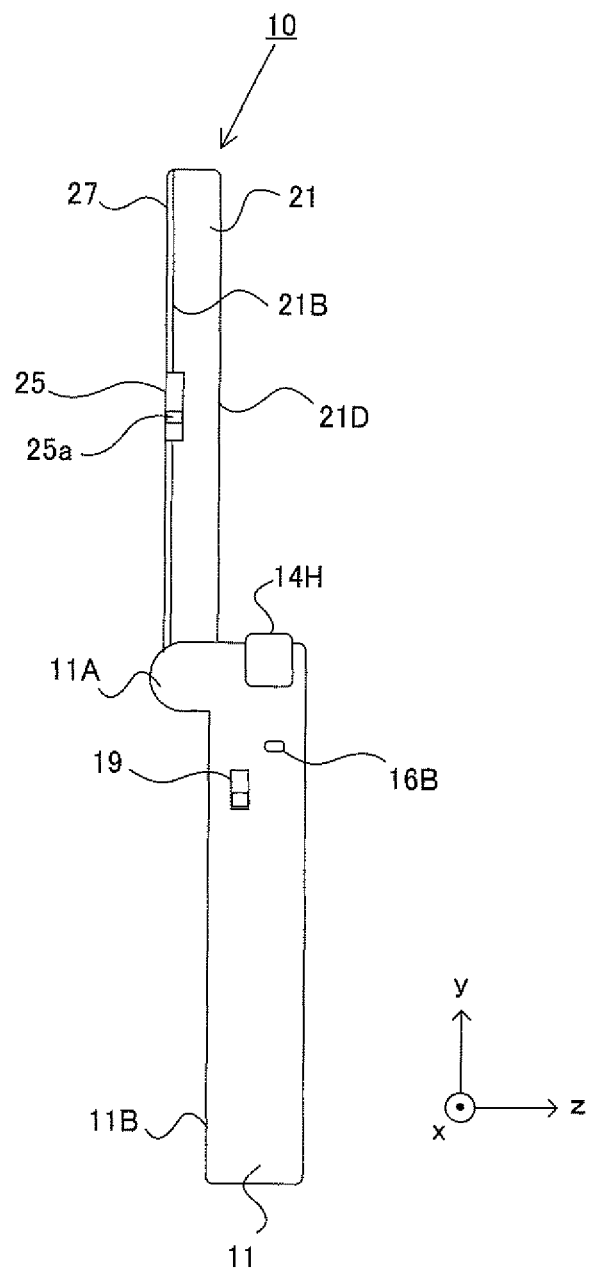
FIG. 2 is a side view of the game apparatus 10 in its opened state.

Hereinafter, a game apparatus according to one embodiment of the present invention will be described. FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to shoot an image by means of an imaging section, display the shot image on a screen, and store data of the shot image. The game apparatus 10 can execute a game program which is stored in an exchangeable memory card or a game program which is received from a server or another game apparatus, and can display, on the screen, an image generated by computer graphics processing, such as an image shot by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (width× height). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, besides the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a 3-dimensional virtual space is executed by the game apparatus 10, the analog stick 15 acts as an input device for moving the predetermined object in the 3-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 7) is provided as a sound input device described below, and the microphone detects for a sound from the outside of the game apparatus 10.

FIG. 3(a) is a left side view of the game apparatus 10 in the closed state. FIG. 3(b) is a front view of the game apparatus 10 in the closed state. FIG. 3(c) is a right side view of the game apparatus 10 in the closed state. FIG. 3(d) is a rear view of the game apparatus 10 in the closed state. As shown in FIG. 3(b) and FIG. 3(d), an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14H can function as shutter buttons (imaging instruction buttons) of the imaging section, for example. Further, as shown in FIG. 3(a), a sound volume button 14I is provided on the left side surface of the lower housing 11. The sound volume button 14I is used for adjusting a sound volume of a speaker of the game apparatus 10.

As shown in FIG. 3(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image shot by the game apparatus 10. The connector and the cover section 11C may be provided on the right side surface of the lower housing 11.

Further, as shown in FIG. 3(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 3(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described later.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images shot by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(b), the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a shoots an image for a left eye, which is viewed by a left eye of a user, and the outer imaging section (right) 23b shoots an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD (charge-coupled device) image sensor and a CMOS (complementary metal-oxide-semiconductor) image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3(b), the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(b) represents the inner imaging section 24 positioned on the inner side surface of the upper housing 21.

As described above, the inner imaging section 24 is used for shooting an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can shoot an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided an the lower housing 11.

Figure 4:
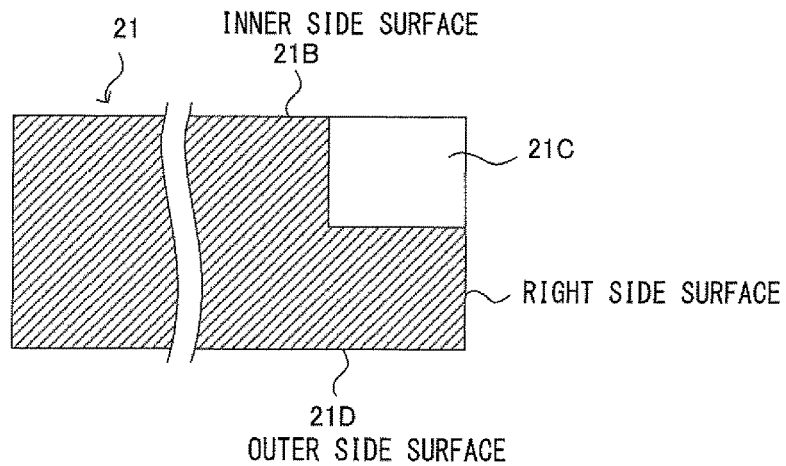
FIG. 4 is a cross-sectional view of an upper housing 21 shown in FIG. 1 taken along a line A-A'.

FIG. 4 is a cross-sectional view of the upper housing 21 shown in FIG. 1 taken along a line A-A'. As shown in FIG. 4, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (the height direction), and a display mode of the upper LCD 22 is determined in accordance with the position of the slider 25a.

Figure 5A:
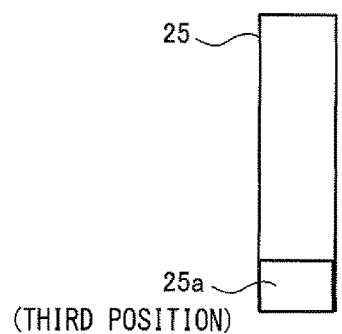
FIG. 5A is a diagram illustrating a state in which a slider 25a of a 3D adjustment switch 25 is positioned at the lowermost position (a third position)
Figure 5B:
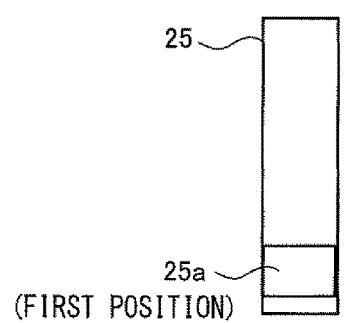
FIG. 5B is a diagram illustrating a state in which the slider 25a of the 3D adjustment switch 25 is positioned at a position (a first position) above the lowermost position.
Figure 5C:
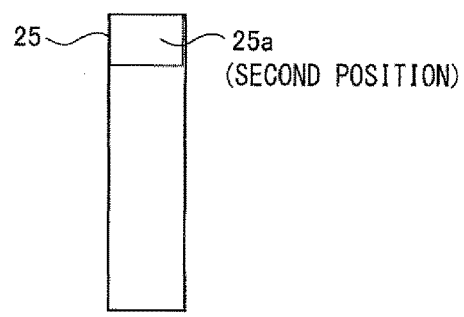
FIG. 5C is a diagram illustrating a state in which the slider 25a of the 3D adjustment switch 25 is positioned at the uppermost position (a second position)

FIG. 5A to FIG. 5C are each a diagram illustrating a state in which the slider 25a of the 3D adjustment switch 25 slides. FIG. 5A is a diagram illustrating a state in which the slider 25a of the 3D adjustment switch 25 is positioned at the lowermost position (a third position). FIG. 5B is a diagram illustrating a state in which the slider 25a of the 3D adjustment switch 25 is positioned above the lowermost position (a first position). FIG. 5C is a diagram illustrating a state in which the slider 25a of the 3D adjustment switch 25 is positioned at the uppermost position (a second position).

As shown in FIG. 5A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25a is positioned between a position shown in FIG. 5B (a position (first position) above the lowermost position) and a position shown in FIG. 5C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a. The slider 25a of the 3D adjustment switch 25 is configured so as to be fixed at the third position, and is slidable, along the height direction, to any position between the first position and the second position. For example, the slider 25a is fixed at the third position by a projection (not shown) which projects, from the side surface of the 3D adjustment switch 25, in the lateral direction shown in FIG. 5A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 6:
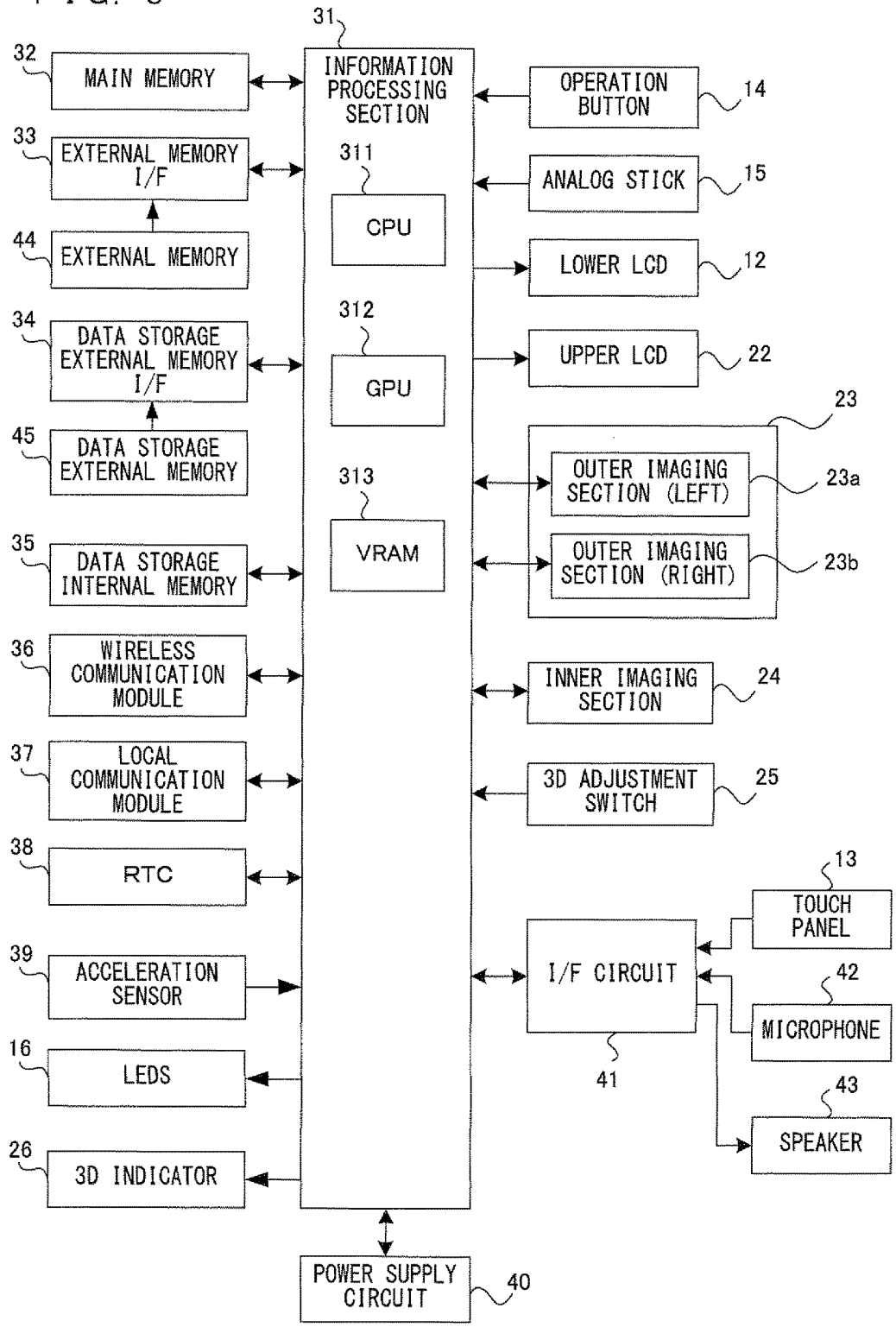
FIG. 6 is a block diagram illustrating an internal configuration of the game apparatus 10.

Next, an internal electrical configuration of the game apparatus 10 will be described with reference to FIG. 6. FIG. 6 is a block diagram illustrating an internal configuration of the game apparatus 10. As shown in FIG. 6, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby executing processing (for example, shooting processing, or image display processing described later) corresponding to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. Predetermined processing is performed by the program loaded by the information processing section 31 being executed. The external data storage memory 45 is implemented as a non-volatile readable and writable memory (for example, a NAND flash memory), and is used for storing predetermined data. For example, images shot by the outer imaging section 23 and/or images shot by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication are stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication by a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform processing in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (image that is stereoscopically visible).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each shoot an image in accordance with an instruction from the information processing section 31, and output data of the shot image to the information processing section 31.

The 3D adjustment switch 25 is connected to the information processing section 31. The 3D adjustment switch 25 transmits, to the information processing section 31, an electrical signal in accordance with the position of the slider 25*a*.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Operation of Game Apparatus 10)

Hereinafter, the outline of operation of the game apparatus 10 according to the present embodiment will be described. In the present embodiment, a composite image obtained by combining an image of the real world currently shot by the outer imaging section 23 (the outer imaging section (left) 23*a* and the outer imaging section (right) 23*b*), and an image of a virtual object present in a 3-dimensional virtual space is displayed in a stereoscopically visible manner on the screen of the upper LCD 22, based on an image display program.

(Stereoscopic Display of Real World Image)

Two images shot by the outer imaging section 23 are supplied to the upper LCD such that the two images have a predetermined parallax, and then are stereoscopically displayed.

Figure 7:
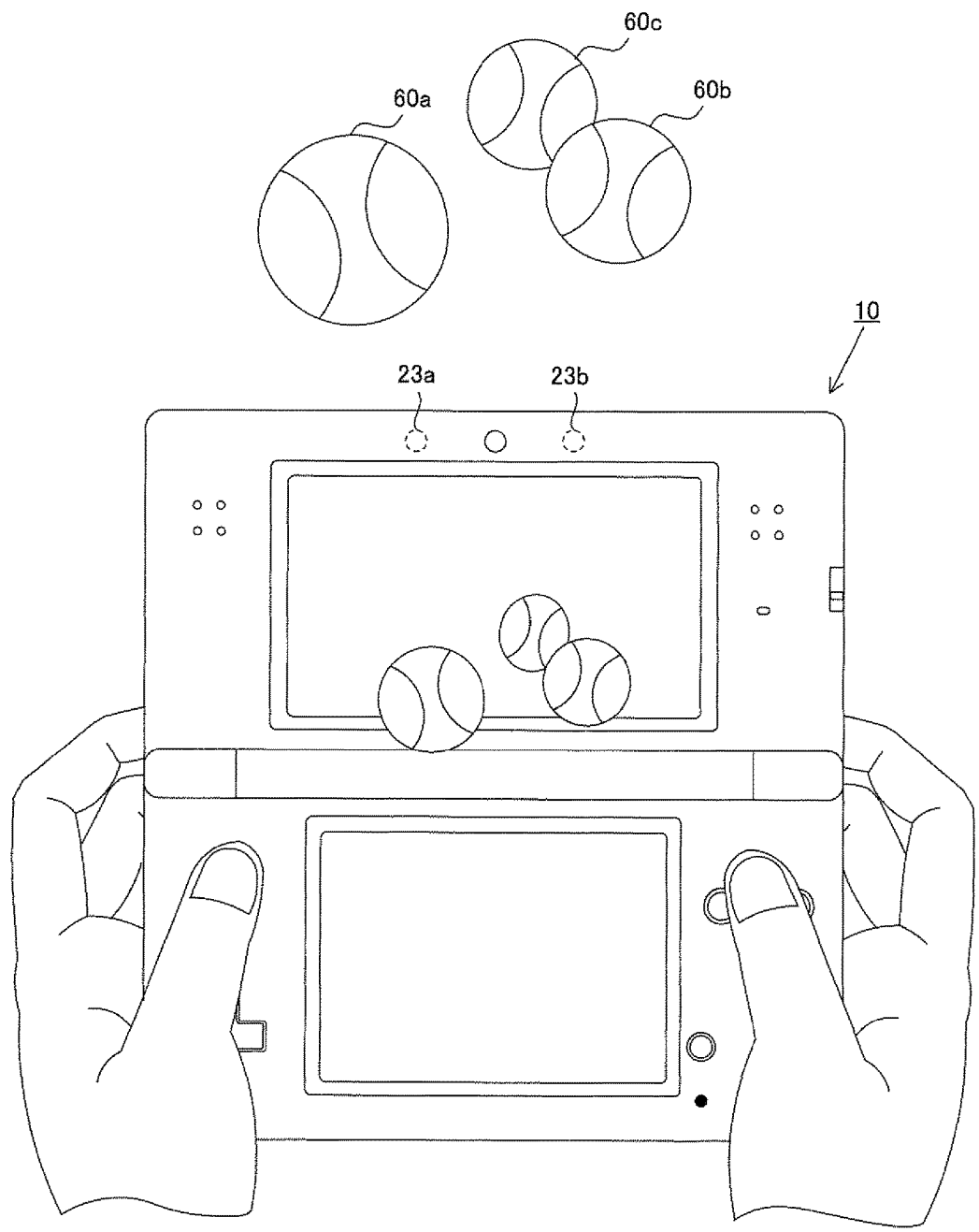
FIG. 7 shows an example of a stereoscopic image displayed on a screen of an upper LCD 22.

FIG. 7 shows an example of a stereoscopic image displayed on the screen of the upper LCD 22 when three balls 60*a* to 60*c* (real objects) are shot by the outer imaging section 23. When the balls 60*a* to 60*c* are shot by the outer imaging section 23, the balls 60*a* to 60*c* are displayed in a stereoscopically visible manner on the screen of the upper LCD 22. As shown in FIG. 7, on the screen of the upper LCD 22, the ball 60*a* which is nearest the outer imaging section 23 appears to be at the nearest position when viewed by the user, and the ball 60*c* which is farthest from the outer imaging section 23 appears to be at the farthest position when viewed by the user. It is noted that in FIG. 7, the state in which balls are partially beyond the screen of the upper LCD 22 is shown for the purpose of facilitating the understanding, but actually, the balls are displayed in the screen. The same holds true for FIG. 8 and FIG. 10 described later. It is noted that in FIG. 7, since a marker 61 (see FIG. 8) described later is not shot by the outer imaging section 23, a virtual object is not displayed on the screen of the upper LCD 22. In addition, although in FIG. 7, FIG. 8, FIG. 10, and the like, the states in which a display target appears to protrude when viewed by the user are shown, displaying in a stereoscopically visible manner includes not only the case where the display target appears to protrude when viewed by the user, but also the case where the display target is displayed with depth so as to appear to be in the back of the screen.

(Stereoscopic Display of Real World Image and CG Image)

Figure 8:
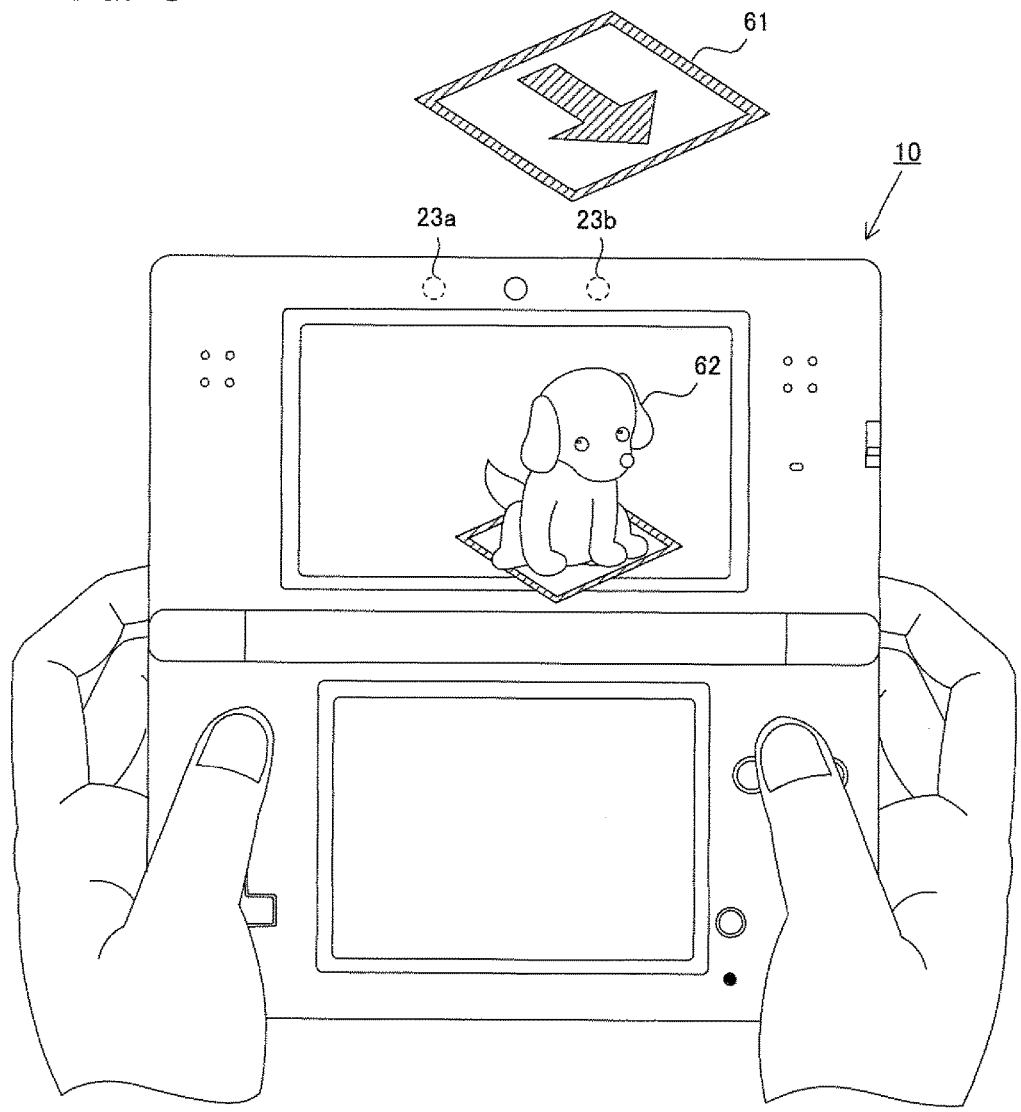
FIG. 8 shows another example of a stereoscopic image displayed on the screen of the upper LCD 22.
Figure 9:
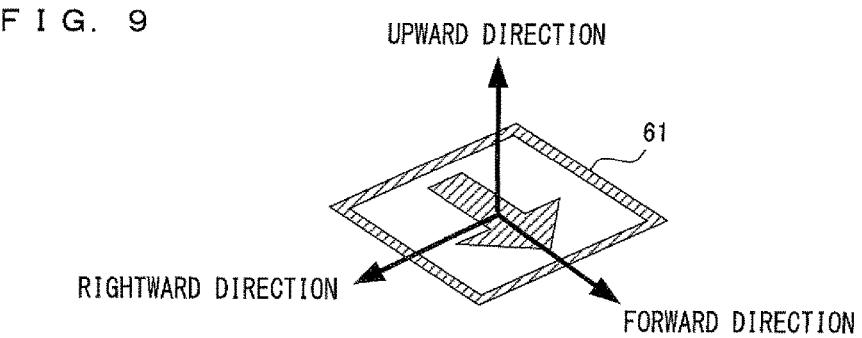
FIG. 9 shows a marker 61.

FIG. 8 shows an example of a stereoscopic image displayed on the screen of the upper LCD 22 when the marker 61 (real object) is being shot by the outer imaging section 23. As shown in FIG. 8, a square including an arrow is drawn on the marker 61 The CPU 311 performs image processing such as pattern matching for an image obtained by the outer imaging section 23, thereby determining whether or not the marker is included in the image. When the marker 61 is being shot by the outer imaging section 23, the marker 61 is displayed as a real world image in a stereoscopically visible manner on the upper LCD 22, and a virtual object 62 (for example, a virtual object representing a dog) is displayed being superimposed onto the real world image, in a stereoscopically visible manner at the position of the marker 61. It is noted that as shown in FIG. 9, directions (forward direction, rightward direction, and upward direction) are set for the marker 61, a virtual object can be placed with its orientation corresponding to the orientation of the marker 61. For example, the virtual object 62 can be placed on the marker 61 such that the forward direction of the virtual object 62 coincides with the forward direction of the marker 61.

Figure 10:
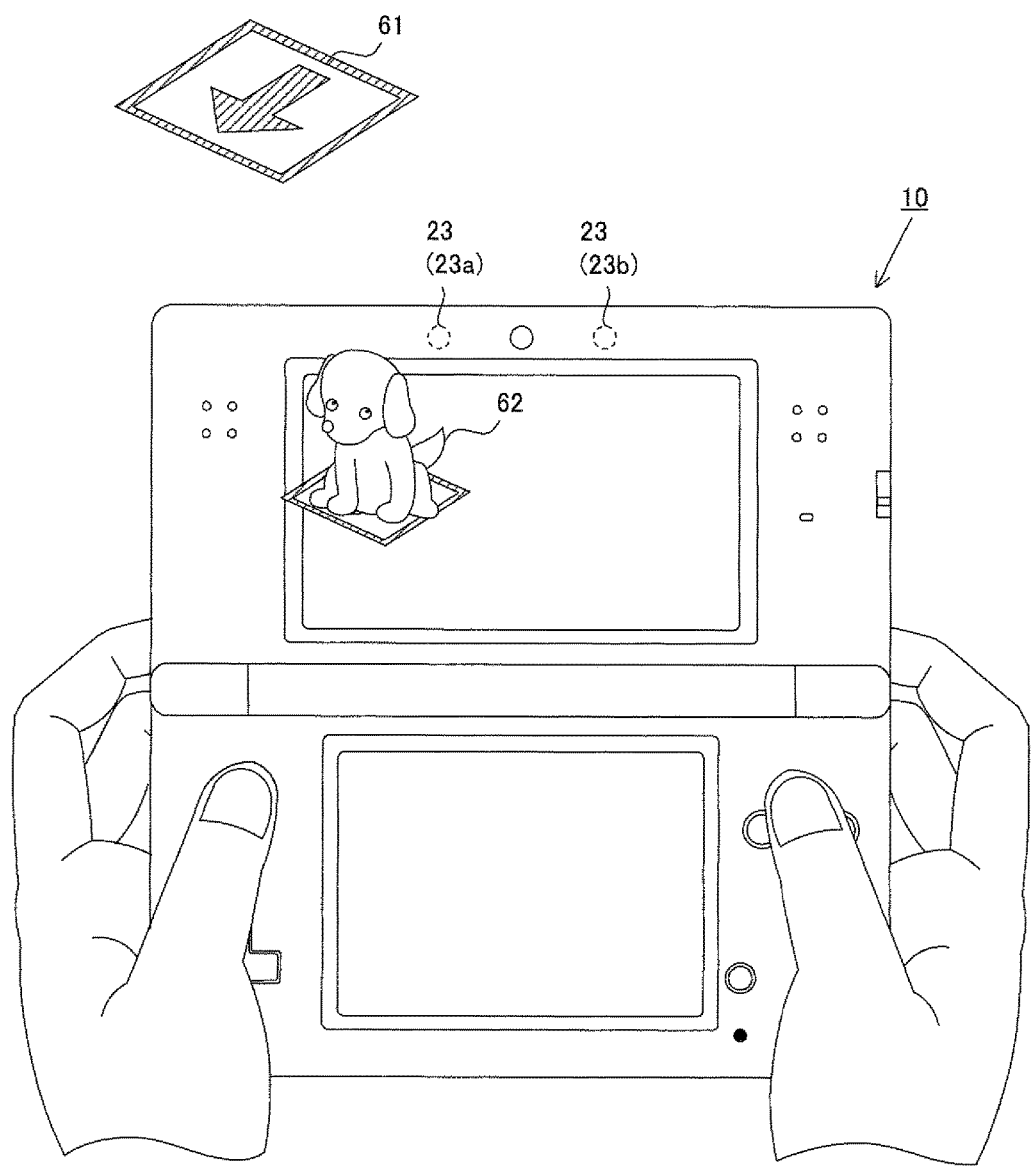
FIG. 10 shows another example of a stereoscopic image displayed on the screen of the upper LCD 22.

FIG. 10 shows another example of a stereoscopic image displayed on the screen of the upper LCD 22 when the marker 61 is being shot by the outer imaging section 23. As shown in FIG. 10, if the position and the direction of the marker 61 displayed on the screen of the upper LCD 22 have changed by the user moving the game apparatus 10, the position and the direction of the virtual object 62 change so as to follow the change. Therefore, it appears to the user as if the virtual object 62 were actually present in the real world.

Hereinafter, with reference to FIG. 11 to FIG. 40, the details of image display processing executed based on the image display program by the game apparatus 10 will be described.

(Memory Map)

First, main data stored in the main memory 32 when the image display processing is performed will be described. FIG. 11 is a diagram showing a memory map of the main memory 32 of the game apparatus 10. As shown in FIG. 11, the main memory 32 stores an image display program 70, a latest left real world image 71L, a latest right real world image 71R, a display left real world image 72L, a display right real world image 72R, a stereoscopic view zero distance 73, a virtual object information 74, a left transform matrix 75L, a right transform matrix 75R, a left view matrix 76L, a right view matrix 76R, a left projection matrix 77L, a right projection matrix 77R, a display mode 78, a marker recognition mode 79, a main real world image identification information 80, variables 81, and the like.

The image display program 70 is a program for causing the CPU 311 to execute the image display processing.

The latest left real world image 71L is the latest image shot by the outer imaging section (left) 23*a*.

The latest right real world image 71R is the latest image shot by the outer imaging section (right) 23*b*.

The display left real world image 72L is the latest image that has been determined as an image that is to be displayed on the upper LCD 22, among images shot by the outer imaging section (left) 23*a*.

The display left real world image 72R is the latest image that has been determined to be displayed on the upper LCD 22, among images shot by the outer imaging section (right) 23*b*.

The stereoscopic view zero distance 73 is a variable indicating the distance, of an object from the outer imaging section 23 in the shooting direction, that allows the object to appear to be present at a position with the same depth as the screen of the upper LCD 22 when the object is stereoscopically displayed on the screen of the upper LCD 22. For example, the stereoscopic view zero distance 73 is represented by unit of centimeter. In the present embodiment, the stereoscopic view zero distance 73 has a fixed value of 25 cm, but this value is merely an example. The stereoscopic view zero distance 73 may be changed anytime as needed, in accordance with instructions from the user, or automatically by a computer. The stereoscopic view zero distance 73 may be defined by a distance from the marker 61 or a ratio about the distance between the outer imaging section 23 and the marker 61. Alternatively, the stereoscopic view zero distance 73 does not necessarily need to be defined as a distance in the real world, but may be defined as a distance in the virtual world. If, for example, the size of the marker 61 is known, it is possible to cause the unit of length in the real world and the unit of length in the virtual space to coincide with each other. In this way, if it is possible to cause both units to coincide with each other, the stereoscopic view zero distance 73 can be set by using the unit of length in the real world. However, if it is not possible to cause both units to coincide with each other, the stereoscopic view zero distance 73 may be set by using the unit of length in the virtual world. It is noted that, as described later, in the present embodiment, it is possible to cause the unit of length in the real world and the unit of length in the virtual space to coincide with each other without using the size of the marker 61.

The virtual object information 74 is information that relates to the aforementioned virtual object 62, and includes 3D model data (polygon data) indicating the shape of the virtual object 62, texture data indicating the pattern of the virtual object 62, information about the position and the orientation of the virtual object 62 in the virtual space, and the like.

The left transform matrix 75L is a coordinate transform matrix that transforms coordinates represented in a coordinate system (marker coordinate system) set based on the position and the orientation of the marker 61, into coordinates represented in a coordinate system (outer imaging section (left) coordinate system) set based on the position and the orientation of the outer imaging section (left) 23a, which matrix is calculated by recognizing the position and the orientation of the marker 61 in a left real world image. The left transform matrix 75L includes information about the relative position and relative orientation of the outer imaging section (left) 23a with respect to the position and the orientation of the marker 61. More specifically, the left transform matrix 75L includes information about the position and the orientation of the outer imaging section (left) 23a in the marker coordinate system.

The right transform matrix 75R is a coordinate transform matrix that transforms coordinates represented in the marker coordinate system, into coordinates represented in a coordinate system (outer imaging section (right) coordinate system) set based on the position and the orientation of the outer imaging section (right) 23b, which matrix is calculated by recognizing the position and the orientation of the marker 61 in a right real world image. The right transform matrix 75R includes information about the relative position and relative orientation of the outer imaging section (right) 23b with respect to the position and the orientation of the marker 61. More specifically, the right transform matrix 75R includes information about the position and the orientation of the outer imaging section (right) 23b in the marker coordinate system.

It is noted that in the present specification, a transform matrix that transforms the marker coordinate system into the outer imaging section (left) coordinate system or the outer imaging section (right) coordinate system, is referred to as a "marker-camera transform matrix". The left transform matrix 75L and the right transform matrix 75R are the "marker-camera transform matrices".

The left view matrix 76L is a coordinate transform matrix that transforms coordinates represented in a world coordinate system of the virtual world, into coordinates represented in a left virtual camera coordinate system, which matrix is used for drawing the virtual object 62 as it is looked at by the left virtual camera. The left view matrix 76L includes information about the position and the orientation of the left virtual camera in the world coordinate system of the virtual world.

The right view matrix 76R is a coordinate transform matrix that transforms coordinates represented in the world coordinate system of the virtual world, into coordinates represented in a right virtual camera coordinate system, which matrix is used for drawing the virtual object 62 as it is looked at by the right virtual camera. The right view matrix 76R includes information about the position and the orientation of the right virtual camera in the world coordinate system of the virtual world.

The left projection matrix 77L is a coordinate transform matrix that transforms coordinates represented in a left virtual camera coordinate system, into coordinates represented in a screen coordinate system, which matrix is used for drawing the virtual world (the virtual object 62 present in the virtual world) as it is looked at by the left virtual camera.

The right projection matrix 77R is a coordinate transform matrix that transforms coordinates represented in a right virtual camera coordinate system, into coordinates represented in the screen coordinate system, which matrix is used for drawing the virtual world (the virtual object 62 present in the virtual world) as it is looked at by the right virtual camera.

The display mode 78 is data indicating the current display mode. More specifically, the display mode 78 is data indicating a synchronous display mode in which the real world image and the virtual space image are superimposed and displayed being synchronized with each other, or an asynchronous display mode in which the real world image and the virtual space image are superimposed and displayed without synchronizing the real world image and the virtual space image with each other.

The marker recognition mode 79 is data indicating the current marker recognition mode. More specifically, the marker recognition mode 79 is data indicating a one-image recognition mode in which marker recognition processing is performed for only one of the left real world image and the right real world image, or a both-image recognition mode in which the marker recognition processing is performed for both the left real world image and the right real world image.

The main real world image identification information 80 is data indicating which of the left real world image and the right real world image is a main real world image. In the above one-image recognition mode, the marker recognition processing is performed for only the main real world image, whereas the marker recognition processing is not performed for the other real world image (hereinafter, referred to as a sub real world image).

Figure 12:
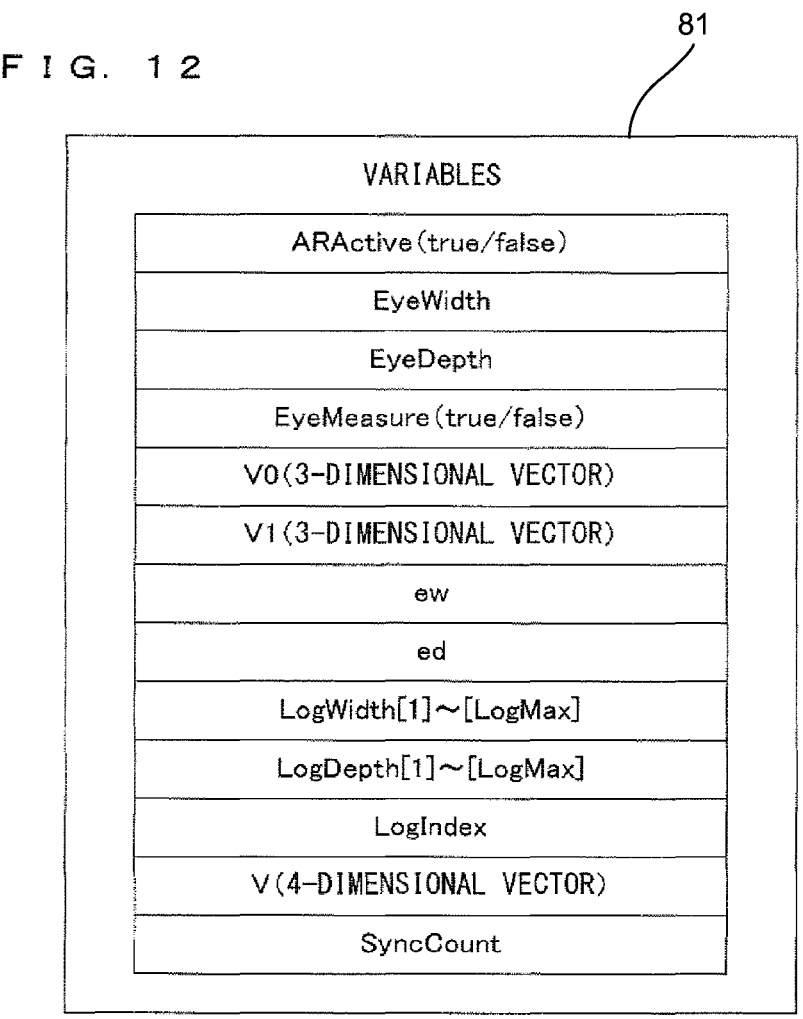
FIG. 12 shows an example of variables stored in the main memory 32.

The variables 81 are used in executing the image display program 70, and include variables shown in FIG. 12. The meanings of the variables will be described below as needed.

When the game apparatus 10 is powered on, the information processing section 31 (CPU 311) of the game apparatus 10 executes a boot program stored in a ROM, which is not shown, thereby initializing units such as the main memory 32. Next, the image display program stored in the data storage internal memory 35 is loaded onto the main memory 32, and then the CPU 311 of the information processing section 31 starts to execute the image display program.

Hereinafter, with reference to flowcharts shown in FIG. 13 to FIG. 19, the flow of processing executed based on the image display program will be described. It is noted that the flowcharts shown in FIG. 13 to FIG. 19 are merely an example. Therefore, the order of the processing steps may be changed as long as the same result is obtained. In addition, the values of the variables, and threshold values used in determination steps are merely an example, and other values may be used as the values of the variables or the threshold values as appropriate. In addition, although in the present embodiment, the CPU 311 executes processing of all steps in the flowcharts shown in FIG. 13 to FIG. 19, a processor or a dedicated circuit other than the CPU 311 may execute some of the steps in the flowcharts shown in FIG. 13 to FIG. 19.

(Marker Processing)

Figure 13:
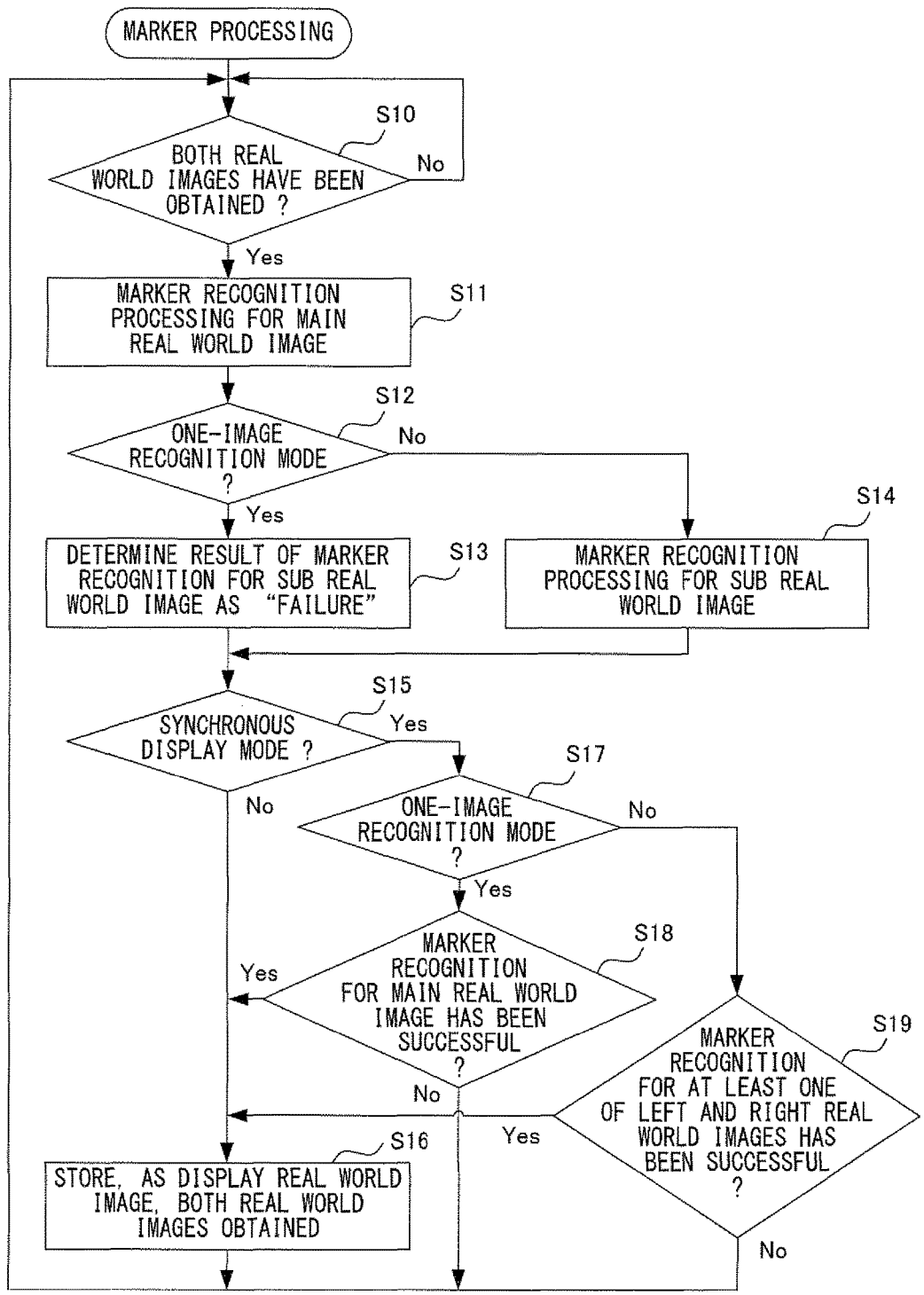
FIG. 13 is a flowchart showing a flow of marker processing.

FIG. 13 is a flowchart showing a flow of marker processing executed based on the image display program 70 by the CPU 311. The marker processing is executed in parallel with main processing described later. In the present embodiment, the marker processing is executed when the CPU 311 is in an idle state. Hereinafter, the details of the marker processing will be described.

In step S10 in FIG. 13, the CPU 311 determines whether or not both real world images (that is, the left real world image and the right real world image) have been obtained by the outer imaging section 23. If both real world images have been obtained, the CPU 311 proceeds to step S11. The latest one of left real world images obtained by the outer imaging section 23 is stored, as the latest left real world image 71L, in the main memory 32, and the latest one of right real world images obtained by the outer imaging section 23 is stored, as the latest right real world image 71R, in the main memory 32.

Figure 20:
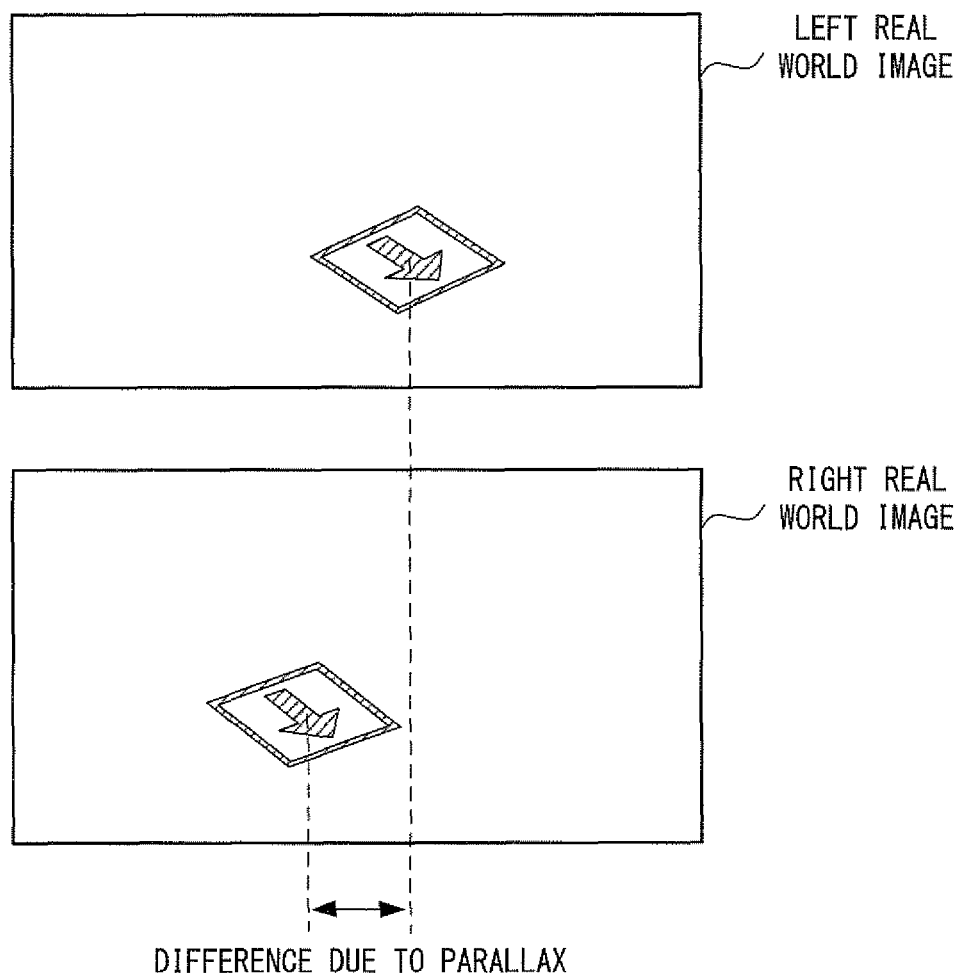
FIG. 20 shows an example of a left real world image and a right real world image.

It is noted that, as previously described, the outer imaging section (left) 23*a* and the outer imaging section (right) 23*b* of the upper housing 21 are separated by a certain distance away (for example, 3.5 cm, hereinafter, referred to as imaging sections distance). Therefore, when the marker 61 is shot by the outer imaging section (left) 23*a* and the outer imaging section (right) 23*b* at the same time, a difference due to a parallax occurs between each of the position and the orientation of the marker 61 in the left real world image shot by the outer imaging section (left) 23*a*, and each of the position and the orientation of the marker 61 in the right real world image shot by the outer imaging section (right) 23*b*, as shown in FIG. 20.

In step S11, the CPU 311 performs the marker recognition processing for the main real world image. More specifically, the CPU 311 determines whether or not the marker 61 is included in the main real world image by a pattern matching method or the like. If the marker 61 is included in the main real world image, the CPU 311 calculates the left transform matrix 75L or the right transform matrix 75R, based on the position and the orientation of the marker 61 in the main real world image (if the main real world image is the left real world image, the CPU 61 calculates the left transform matrix 75L, and if the main real world image is the right real world image, the CPU 61 calculates the right transform matrix 75R).

Figure 21:
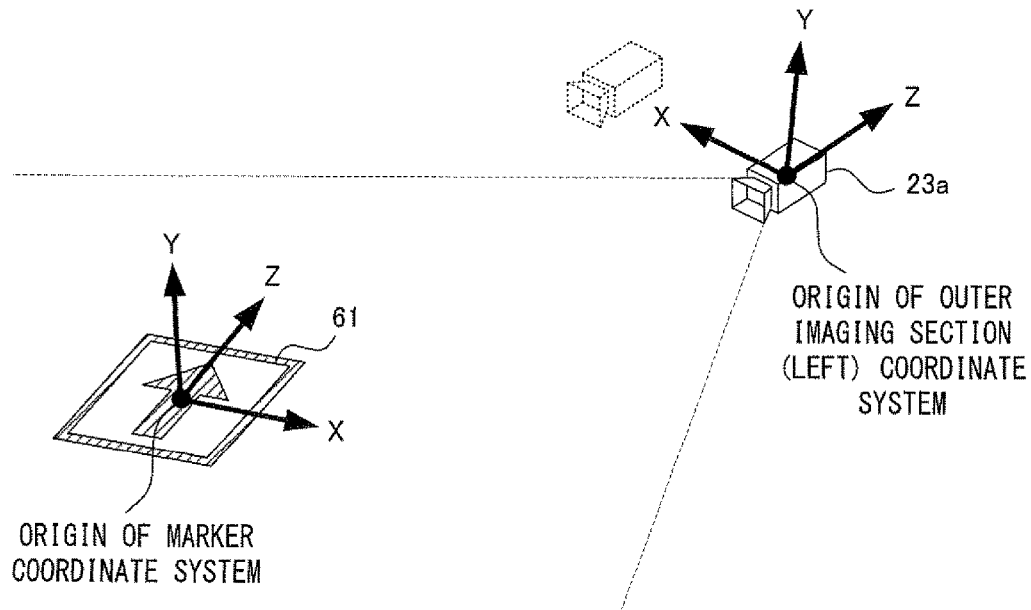
FIG. 21 shows the position and the orientation of a left virtual camera 63L calculated in accordance with a result of marker recognition processing.

It is noted that the left transform matrix 75L is a matrix reflecting therein the position and the orientation of the outer imaging section (left) 23*a* which are calculated based on the position and the orientation of the marker 61 in the left real world image. To be more exact, as shown in FIG. 21, the left transform matrix 75L is a coordinate transform matrix that transforms coordinates represented in the marker coordinate system (in which the position of the marker 61 in the real world is the origin, and the forward direction, the lateral direction, and the normal direction of the marker 61 correspond to the respective axes), into coordinates represented in the outer imaging section (left) coordinate system based on the position and the orientation of the outer imaging section (left) 23*a* which are calculated based on the position and the orientation of the marker 61 in the left real world image.

Figure 22:
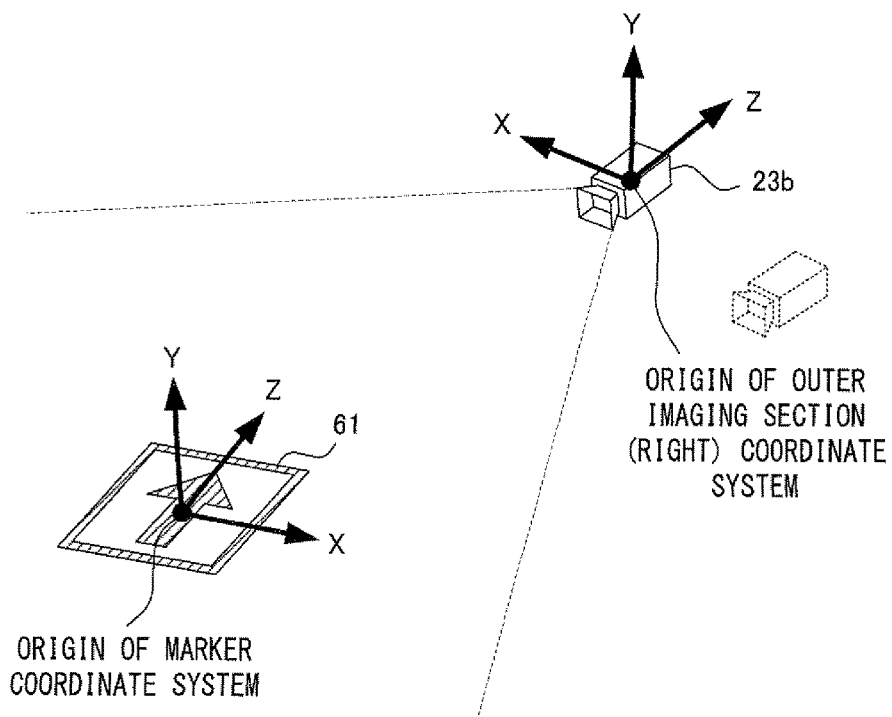
FIG. 22 shows the position and the orientation of a right virtual camera 63R calculated in accordance with a result of marker recognition processing

In addition, the right transform matrix 75R is a matrix reflecting therein the position and the orientation of the outer imaging section (right) 23*b* which are calculated based on the position and the orientation of the marker 61 in the right real world image. To be more exact, as shown in FIG. 22, the right transform matrix 75R is a coordinate transform matrix that transforms coordinates represented in the marker coordinate system, into coordinates represented in the outer imaging section (right) coordinate system based on the position and the orientation of the outer imaging section (right) 23*b* which are calculated based on the position and the orientation of the marker 61 in the right real world image.

It is noted that if it is assumed that the accuracy of the marker recognition is sufficiently high so that there is no error, and that the accuracy in the attachment of the outer imaging section (left) 23*a* and the outer imaging section (right) 23*b* to the game apparatus 10 is sufficiently high so that there is no error, the position of the outer imaging section (right) 23*b* indicated by the right transform matrix 75R which is the result of the marker recognition for the right real world image coincides with a position separated by the certain distance (imaging sections distance), along the x-axis direction of the outer imaging section (left) coordinate system (which direction is the lateral direction of the game apparatus 10 and is included in the horizontal directions when the game apparatus 10 is used), from the position of the outer imaging section (left) 23*a* indicated by the left transform matrix 75L which is the result of the marker recognition for the left real world image. In addition, the orientation of the outer imaging section (right) 23*b* indicated by the right transform matrix 75R, and the orientation of the outer imaging section (left) 23*a* indicated by the left transform matrix 75L are the same as the state of the attachment of the outer imaging section (left) 23*a* and the outer imaging section (right) 23*b* to the game apparatus 10. In the present embodiment, the game apparatus 10 is designed such that the outer imaging section (left) 23*a* and the outer imaging section (right) 23*b* are attached so as to be in parallel with each other. Therefore, the x-axis, the y-axis, and the z-axis of the outer imaging section (left) coordinate system are in parallel with the x-axis, the y-axis, and the z-axis of the outer imaging section (right) coordinate system. However, actually, the marker recognition has some error, and the attachment of the outer imaging section (left) 23*a* and the outer imaging section (right) 23*b* to the game apparatus 10 has some error. Therefore, the relationship between each of the position and the orientation of the outer imaging section (left) 23*a* indicated by the left transform matrix 75L, and each of the position and the orientation of the outer imaging section (right) 23*b* indicated by the right transforms matrix 75R, is not ideal. For example, the left transform matrix 75L and the right transform matrix 75R are such that the outer imaging section (left) 23*a* and the outer imaging section (right) 23*b* are rather close to each other or rather away from each other, or such that the orientation of the outer imaging section (left) 23a and the orientation of the outer imaging section (right) 23b are different. Alternatively, the left transform matrix 75L and the right transform matrix 75R are such that the orientation of the outer imaging section (left) 23a and the orientation of the outer imaging section (right) 23b are not in parallel with each other.

Here, in the AR technology, a matrix that transforms the marker coordinate system into the outer imaging section (left) coordinate system or the outer imaging section (right) coordinate system is designated as a view matrix of a virtual camera, to superimpose a CG image onto the real world image. However, if the left transform matrix 75L is merely designated as the left view matrix 76L, and the right transform matrix 75R is merely designated as the right view matrix 76R in stereoscopically displaying a virtual space image on the upper LCD 22, a normal stereoscopic view of the virtual object 62 might not be provided. Accordingly, in the present embodiment, as is obvious from the description below, based on the position and the orientation (view matrix) of one of the virtual cameras calculated from the result of the marker recognition (marker-camera transform matrix) for the corresponding one of the left real world image and the right real world image, the position and the orientation (view matrix) of the other one of the virtual cameras are determined such that the relationship between each of the position and the orientation of the left virtual camera 63L, and each of the position and the orientation of the right virtual camera 63R, is ideal.

It is noted that if the marker 61 has not been recognized in the main real world image in step S11, a null value is stored in the left transform matrix 75L or the right transform matrix 75R, whereby the failure of the recognition of the marker 61 in the left real world image or the right real world image is recorded.

In step S12, the CPU 311 determines whether or not the current marker recognition mode is the one-image recognition mode. Then, if the current marker recognition mode is the one-image recognition mode, the CPU 311 proceeds to step S13, and if the current marker recognition mode is not the one-image recognition mode (that is, the marker recognition mode is the both-image recognition mode), the CPU 311 proceeds to step S14.

In step S13, the CPU 311 determines, as a failure, the result of the marker recognition for one of the left real world image and the right real world image that is not the main real world image (hereinafter, the one is referred to as a sub real world image). More specifically, if the main real world image is the left real world image, a null value is stored in the right transform matrix 75R, and if the main real world image is the right real world image, a null value is stored in the left transform matrix 75L.

In step S14, the CPU 311 performs the marker recognition processing for the sub real world image. More specifically, the CPU 311 determines whether or not the marker 61 is included in the sub real world image by a pattern matching method or the like. If the marker 61 is included in the sub real world image, the CPU 311 calculates the left transform matrix 75L or the right transform matrix 75R, based on the position and the orientation of the marker 61 in the sub real world image (if the sub real world image is the left real world image, the CPU 311 calculates the left transform matrix 75L, and if the sub real world image is the right real world image, the CPU 311 calculates the right transform matrix 75R).

In step S15, the CPU 311 determines whether or not the current display mode is the synchronous display mode.

Then, if the current display mode is the synchronous display mode, the CPU 311 proceeds to step S17, and if the current display mode is not the synchronous display mode (that is, the current display mode is the asynchronous display mode), the CPU 311 proceeds to step S16.

In step S16, the CPU 311 stores the latest left real world image 71L and the latest right real world image 71R as the display left real world image 72L and the display right real world image 72R, respectively, in the main memory 32. Then, the CPU 311 returns to step S10.

In step S17, the CPU 311 determines whether or not the current marker recognition mode is the one-image recognition mode. Then, if the current marker recognition mode is the one-image recognition mode, the CPU 311 proceeds to step S18, and if the current marker recognition mode is the one-image recognition mode (the current marker recognition mode is the both-image recognition mode), the CPU 311 proceeds to step S19.

In step S18, the CPU 311 determines whether or not the marker recognition for the main real world image has been successful. More specifically, if the main real world image is the left real world image, the CPU 311 determines whether or not a valid matrix which is not a null value is stored in the left transform matrix 75L, and if the main real world image is the right real world image, the CPU 311 determines whether or not a valid matrix which is not a null value is stored in the right transform matrix 75R. Then, if the marker recognition for the main real world image has been successful, the CPU 311 proceeds to step S16, and if the marker recognition for the main real world image has not been successful, the CPU 311 returns to step S10.

In step S19, the CPU 311 determines whether or not at least one of the marker recognition for the left real world image and the marker recognition for the right real world image has been successful. More specifically, the CPU 311 determines whether or not valid matrices which are not null values are stored in the left transform matrix 75L and the right transform matrix 75R. Then, if at least one of the marker recognition for the left real world image and the marker recognition for the right real world image has been successful, the CPU 311 proceeds to step S16, and if not, the CPU 311 returns to step S10.

(Main Processing)

Figure 14:
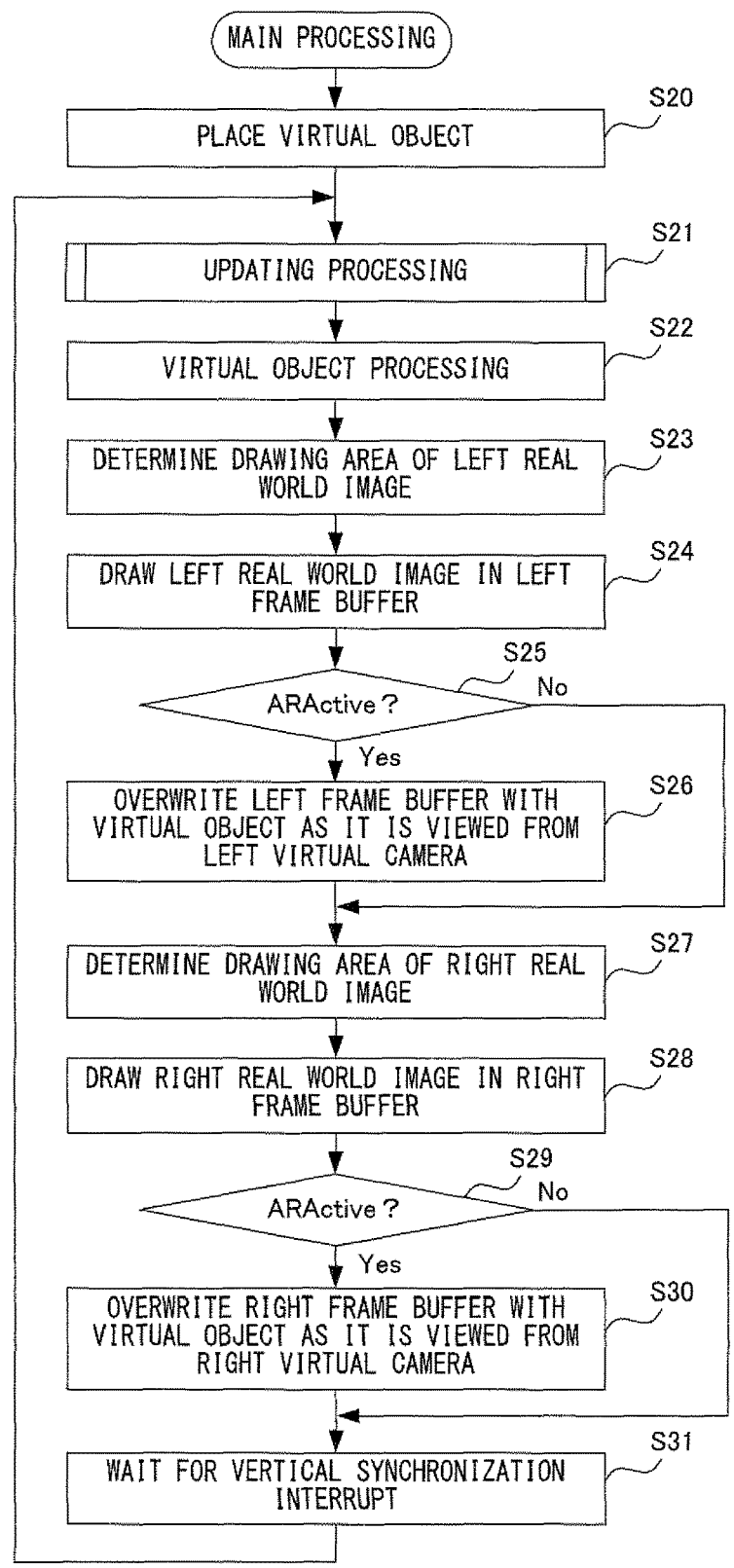
FIG. 14 is a flowchart showing a flow of main processing.

FIG. 14 is a flowchart showing a flow of main processing executed based on the image display program 70 by the CPU 311. The main processing is executed in parallel with the marker processing. Hereinafter, the details of the main processing will be described.

In step S20 in FIG. 14, the CPU 311 places the virtual object 62 at a predetermined position in the 3-dimensional virtual space. In the present embodiment, the virtual object 62 is placed at the origin of the virtual space (the origin of the world coordinate system).

In step S21, the CPU 311 executes updating processing. In the updating processing, the CPU 311 updates variables used for drawing the virtual object 62. The details of the updating processing will be described later.

In step S22, the CPU 311 executes virtual object processing. The virtual object processing relates to the virtual object 62 placed in the virtual space. For example, as needed, the size of the virtual object 62 is changed, or the virtual object 62 is caused to take a predetermined action (The virtual object 62 is caused to move in the virtual space. For example, if the virtual object 62 is caused to move around the origin of the virtual space, the virtual object 62 walking around the origin of the marker coordinate system is displayed). It is noted that control of a movement of the virtual object 62 is realized by changing the coordinates of the position of the virtual object 62 in the world coordinate system in the virtual space.

Figure 23:
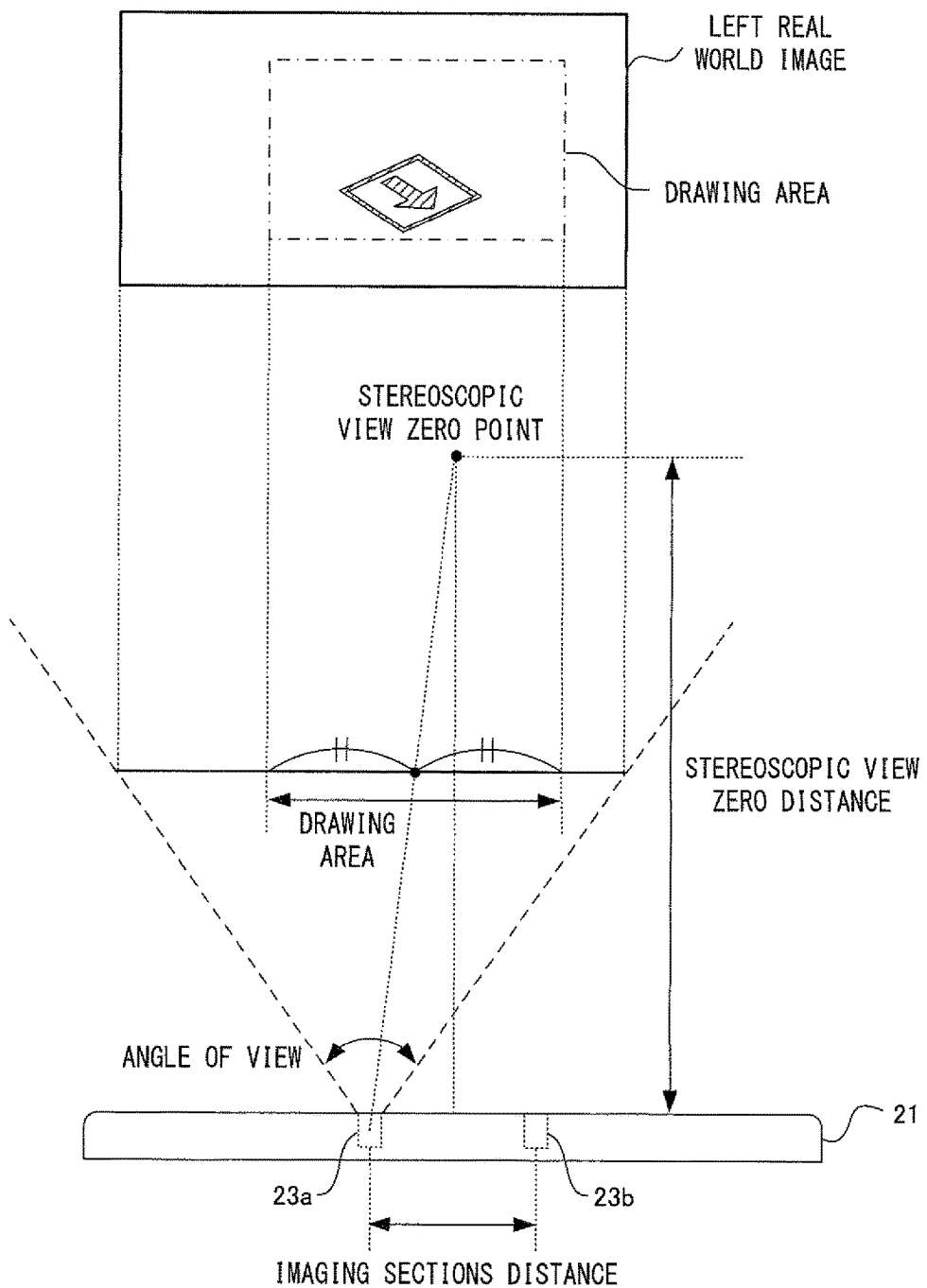
FIG. 23 shows an area cut from the left real world image, based on a stereoscopic view zero distance.

In step S23, in accordance with the stereoscopic view zero distance 73, the CPU 311 determines a drawing area that is an area, of the left real world image, used for display. More specifically, as shown in FIG. 23, a point that is separated by the value of the stereoscopic view zero distance 73 (for example, 30 cm) in the shooting direction from the outer imaging section 23, and that is at the same distance from the outer imaging section (left) 23a and the outer imaging section (right) 23b, is defined as a stereoscopic view zero point. An area whose center overlaps with the stereoscopic view zero point as they are viewed from the outer imaging section (left) 23a, is determined as the drawing area of the left real world image. For example, as shown in FIG. 23, the length in the lateral direction of the drawing area is obtained as a ratio on a segment, taken from a line perpendicular to the shooting direction of the outer imaging section (left) 23a, between the lines creating the angle of view of the outer imaging section (left) 23a. The ratio is applied to the length in the lateral direction of the real world image, whereby the length of the drawing area of the real world image is determined. It is noted that the length in the height direction of the drawing area is determined based on the length in the lateral direction so as to adapt to the ratio of the height and the width of the display screen.

Figure 24:
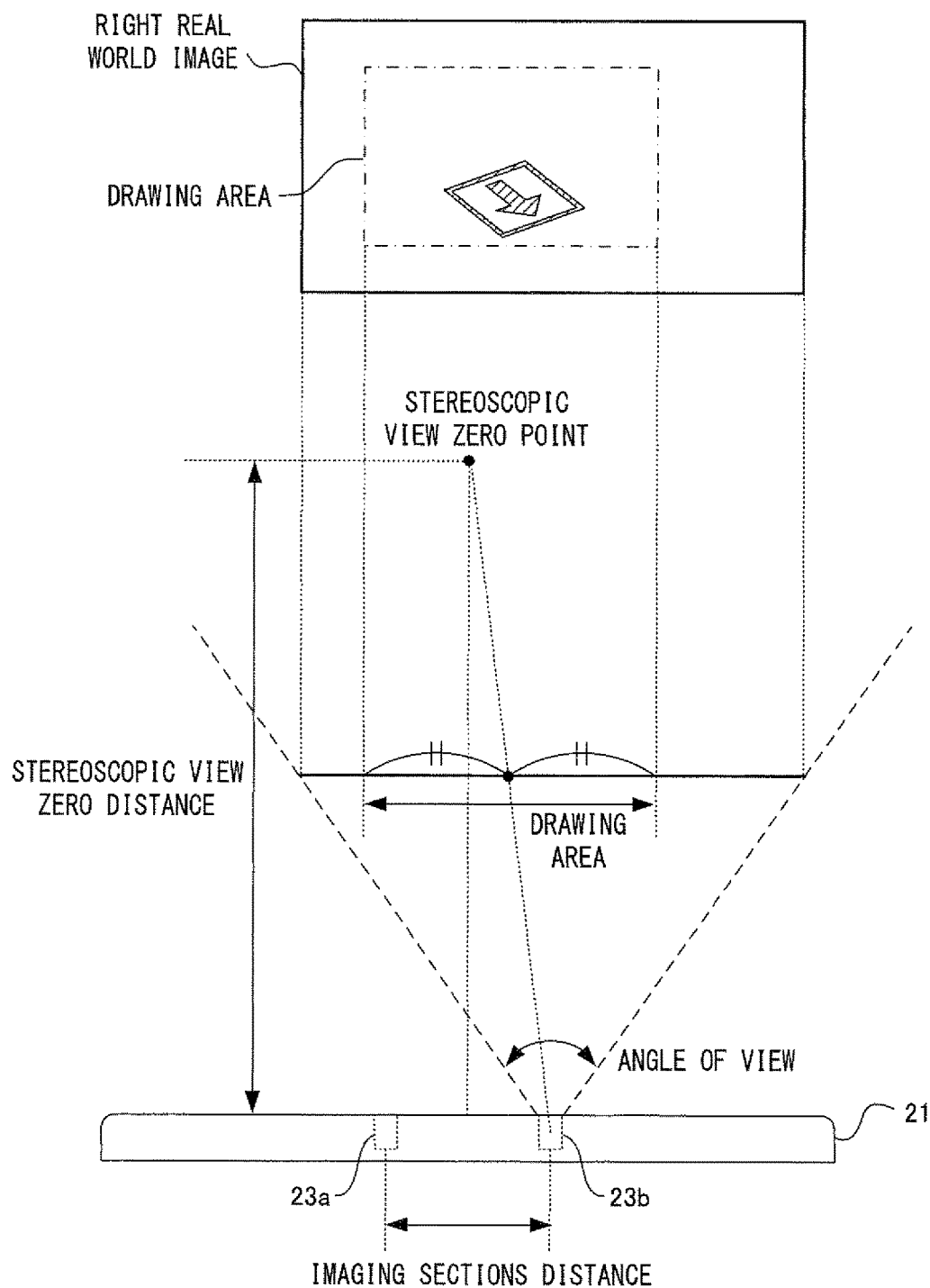
FIG. 24 shows an area cut from the right real world image, based on the stereoscopic view zero distance.
Figure 25:
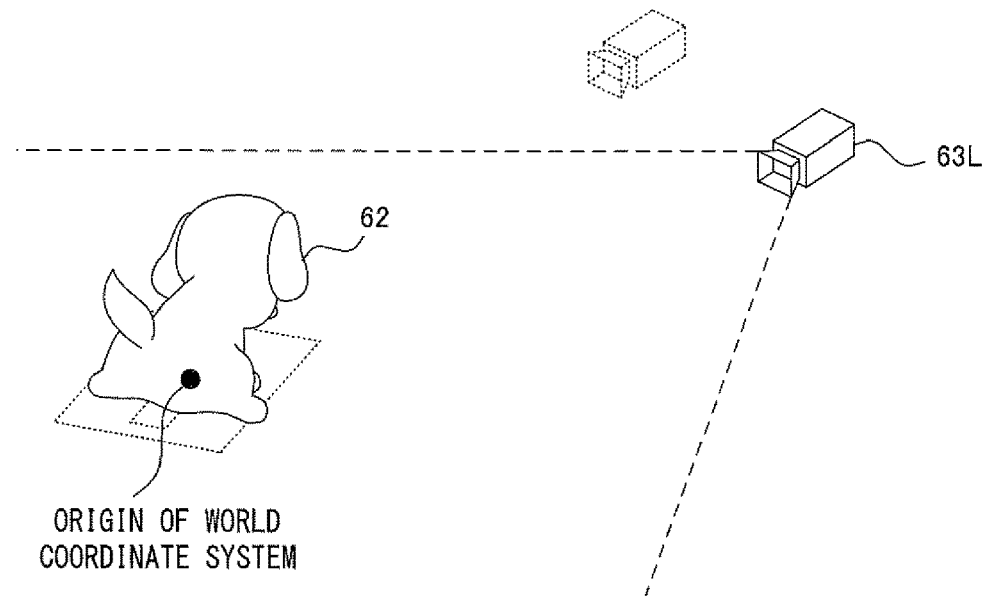
FIG. 25 shows a position relationship between a virtual object 62 and a left virtual camera 63L.

It is noted that in step S27 for determining a drawing area of the right real world image, which step will be described later, an area whose center overlaps with the stereoscopic view zero point as they are viewed from the outer imaging section (right) 23b, is determined as the drawing area of the right real world image, as shown in FIG. 24. As a result, on the screen of the upper LCD 22, the position of the stereoscopic view zero point on an image for a left eye, and the position of the stereoscopic view zero point on an image for a right eye coincide with each other, and appear to have the same depth when viewed by the user.

In step S24, the CPU 311 draws a drawing area of the display left real world image 72L which is determined in step S23, in a predetermined storage area (hereinafter, referred to as a left frame buffer) for temporarily storing an image for a left eye to be supplied to the upper LCD 22, in the VRAM 313.

In step S25, the CPU 311 determines whether or not the value of an AR-Active (see FIG. 12) is true. The AR-Active is a variable (flag) indicating whether or not a virtual object can be displayed being superimposed onto the real world image. If a virtual object can be displayed being superimposed onto the real world image, the value of the AR-Active is set at true, and if a virtual object cannot be displayed being superimposed onto the real world image (for example, in the case where the marker 61 cannot be recognized at all), the value of the AR-Active is set at false (initial value). If the value of the AR-Active is true, the CPU 311 proceeds to step S26, and if the value of the AR-Active is not true (that is, the value of the AR-Active is false), the CPU 311 proceeds to step S27.

Figure 26:
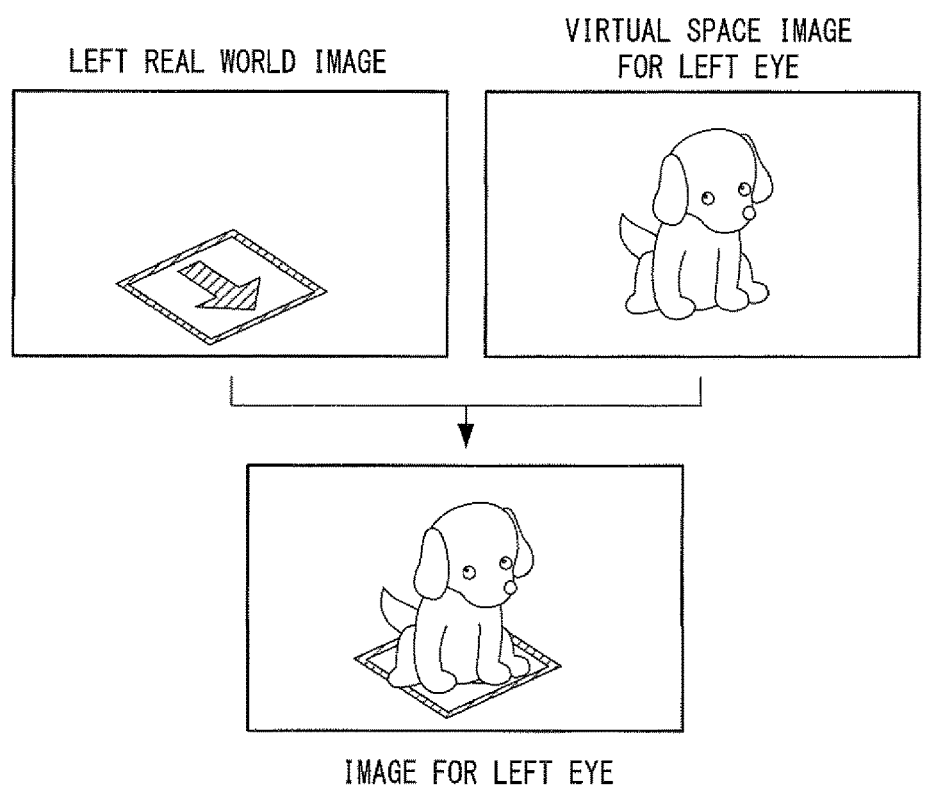
FIG. 26 shows a method of generating an image for a left eye.

In step S26, for example, the CPU 311 overwrites the left frame buffer with the virtual space (hereinafter, referred to as a virtual space image for a left eye) as it is viewed from the left virtual camera 63L, as shown in FIG. 23 (actually and typically, the GPU 312 draws the virtual space in accordance with an instruction from the CPU 311). As a result, the virtual space image for a left eye is superimposed onto the left real world image drawn in the left frame buffer in step S24, as shown in FIG. 26. The resultant image in the left frame buffer is supplied, as an image for a left eye, to the upper LCD 22 at a predetermined timing. It is noted that the background of the virtual space in the virtual space image for a left eye is transparent. Therefore, superimposing the virtual space image onto the real world image generates an image in which the virtual object 62 is present on the real world image.

In step S27, the CPU 311 determines a drawing area of the right real world image in accordance with the stereoscopic view zero distance 73. It is noted that the details of processing of determining the drawing area are omitted because the processing is the same as processing of determining the drawing area of the left real world image.

In step S28, the CPU 311 draws a drawing area of the display right real world image 72R which is determined in step S27, in a predetermined storage area (hereinafter, referred to as a right frame buffer) for temporarily storing an image for a right eye to be supplied to the upper LCD 22, in the VRAM 313.

In step S29, the CPU 311 determines whether or not the value of the AR-Active is true. If the value of the AR-Active is true, the CPU 311 proceeds to step S30, and if the value of the AR-Active is not true (that is, the value of the AR-Active is false), the CPU 311 proceeds to step S31.

In step S30, the CPU 311 overwrites the right frame buffer with the virtual space (hereinafter, referred to as a virtual space image for a right eye) as it is viewed from the right virtual camera 63R (actually and typically, the GPU 312 draws the virtual space in accordance with an instruction from the CPU 311). As a result, the virtual space image for a right eye is superimposed onto the right real world image drawn in the right frame buffer in step S28. The resultant image in the right frame buffer is supplied, as an image for a right eye, to the upper LCD 22 at a predetermined timing.

In step S31, the CPU 311 waits for an interrupt signal (vertical synchronization interrupt) from the upper LCD 22. If the interrupt signal is generated, the CPU 311 returns to step S21. As a result, steps S21 to S31 are repeated in cycles of a predetermined period (for example, 1/60 second).

(Updating Processing)

Next, the details of the updating processing in step S21 in the main processing will be described with reference to the flowchart in FIG. 15.

Figure 15:
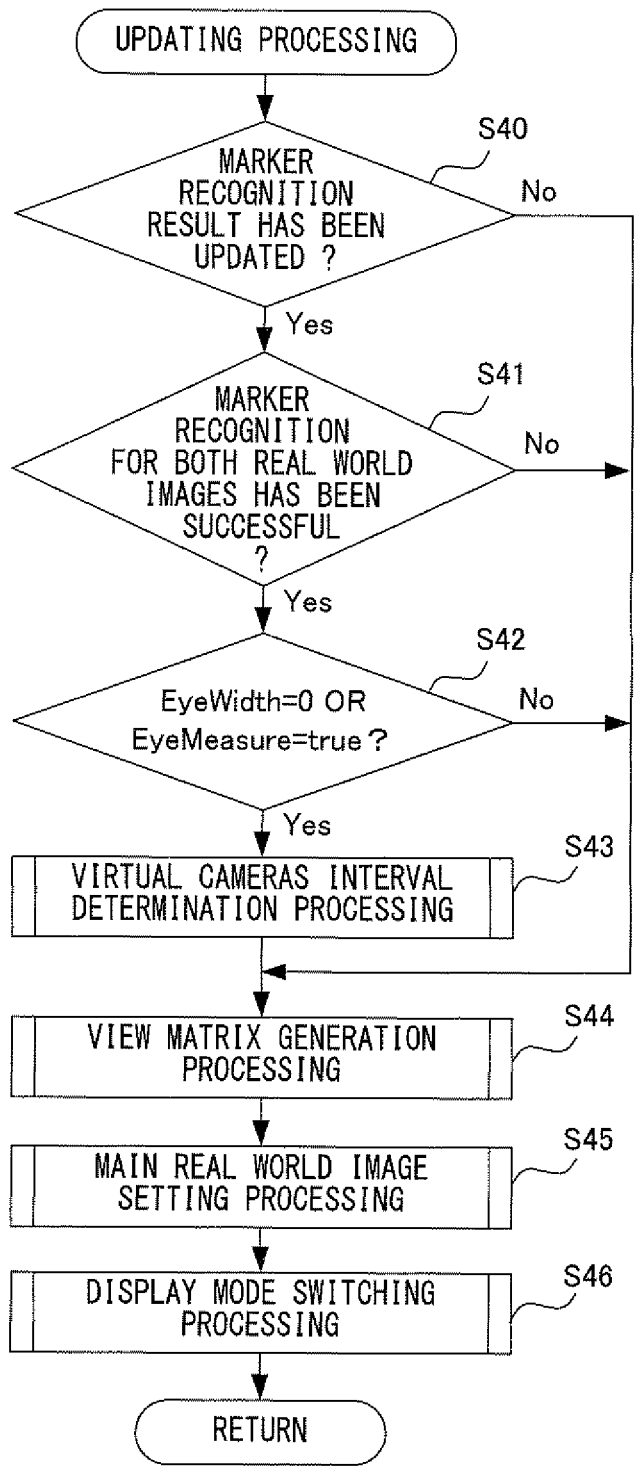
FIG. 15 is a flowchart showing the details of updating processing.

In step S40 in FIG. 15, the CPU 311 determines whether or not the result of the marker recognition (that is, the left transform matrix 75L and the right transform matrix 75R) in the aforementioned marker processing has been updated. If the result of the marker recognition has been updated, the CPU 311 proceeds to step S41, and if the result of the marker recognition has not been updated, the CPU 311 proceeds to step S44.

In step S41, the CPU 311 determines whether or not both the marker recognition for the left real world image and the marker recognition for the right real world image have been successful. If both the marker recognition for the left real world image and the marker recognition for the right real world image have been successful, the CPU 311 proceeds to step S42, and if at least one of or both of the marker recognition for the left real world image and the marker recognition for the right real world image have been failed, the CPU 311 proceeds to step S44.

In step S42, the CPU 311 determines whether or not the value of EyeWidth (see FIG. 12) is 0, or whether or not the value of EyeMeasure (see FIG. 12) is true. The EyeWidth indicates the distance, between the outer imaging section (left) 23a and the outer imaging section (right) 23b, that is based on the position relationship therebetween, and is calculated by using the left transform matrix 75L and the right transform matrix 75R. It is noted that the distance does not need to be calculated on a scale of the real world, and may be calculated as a distance in the virtual space. Specifically, a relationship between the position of the outer imaging section (left) 23a and the position of the outer imaging section (right) 23b is calculated based on the position of the marker 61, by using a relationship between the position of the marker 61 and the position of the outer imaging section (left) 23a, which is indicated by the left transform matrix 75L, and a relationship between the position of the marker 61 and the position of the outer imaging section (right) 23b, which is indicated by the right transform matrix 75R, whereby the distance is calculated. It is noted that if the distance is yet to be determined, the value of the distance is set at 0 (initial value). It is noted that in the present embodiment, the EyeWidth is a scalar value. However, the EyeWidth may be a vector connecting the position of the outer imaging section (left) 23a indicated by the left transform matrix 75L, and the position of the outer imaging section (right) 23b indicated by the right transform matrix 75R. In addition, the EyeWidth may be the magnitude of the component, perpendicular to the shooting direction, of the vector connecting the position of the outer imaging section (left) 23a indicated by the left transform matrix 75L, and the position of the outer imaging section (right) 23b indicated by the right transform matrix 75R. It is noted that as described later, the EyeWidth is used for setting the distance (interval) between the left virtual camera 63L and the right virtual camera 63R in the virtual space. The EyeMeasure is a variable (flag) indicating whether or not the EyeWidth needs to be calculated again. If the EyeWidth needs to be calculated again, the EyeMeasure is set at true, and if the EyeWidth does not need to be calculated again, the EyeMeasure is set at false (initial value). If the value of the EyeWidth is 0 or if the value of the EyeMeasure is true, the CPU 311 proceeds to step S43, and if not (that is, if the value of the EyeWidth is not 0 and the value of the EyeMeasure is false), the CPU 311 proceeds to step S44.

In step S43, the CPU 311 executes virtual cameras interval determination processing. In the virtual cameras interval determination processing, the interval between left virtual camera 63L and the right virtual camera 63R (that is, the EyeWidth) is determined and updated, as appropriate. The details of the virtual cameras interval determination processing will be described later.

In step S44, the CPU 311 executes view matrix generation processing. In the view matrix generation processing, the left view matrix 76L and the right view matrix 76R are calculated, based on the interval between the left virtual camera 63L and the right virtual camera 63R (that is, the EyeWidth) which has been already determined. The details of the view matrix generation processing will be described later.

In step S45, the CPU 311 executes main real world image setting processing. In the main real world image setting processing, the left real world image and the right real world image take turns switching to the main real world image, as appropriate (this is equivalent to the outer imaging section (left) 23a and the outer imaging section (right) 23b taking turns switching to a main imaging section). The details of the main real world image setting processing will be described later.

In step S46, the CPU 311 executes display mode switching processing, and ends the updating processing. In the display mode switching processing, the display mode is switched between the synchronous display mode and the asynchronous display mode, as appropriate. The details of the display mode switching processing will be described later.

(Virtual Cameras Interval Determination Processing)

Next, the details of the virtual cameras interval determination processing in step S43 in the updating processing (FIG. 15) will be described with reference to the flowchart in FIG. 16. In this processing, as previously described, the distance between the position of the outer imaging section (left) 23a relative to the position of the marker 61, which is indicated by the left transform matrix 75L, and the position of the outer imaging section (right) 23b relative to the position of the marker 61, which is indicated by the right transform matrix 75R, is calculated. There are several methods for calculating the distance. In the present embodiment, the following method is employed as an example of the methods for the calculation.

Figure 16:
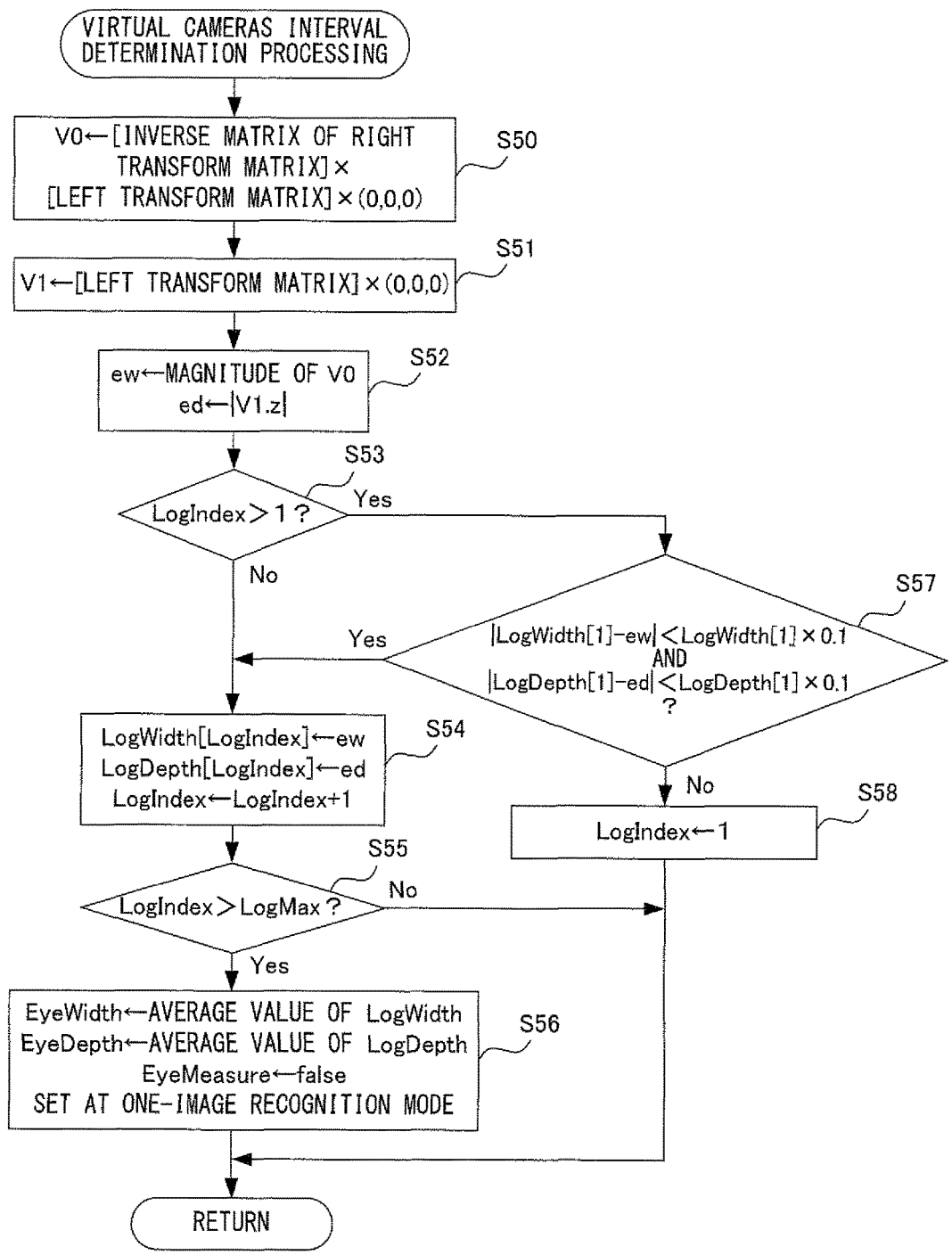
FIG. 16 is a flowchart showing the details of virtual cameras interval determination processing.

In step S50 in FIG. 16, the CPU 311 calculates coordinates V0, based on the left transform matrix 75L and the right transform matrix 75R. Hereinafter, with reference to FIG. 27 to FIG. 29, a method of calculating the V0 will be described. It is noted that in FIG. 27 to FIG. 29, the shooting direction of the outer imaging section (left) 23a, and the shooting direction of the outer imaging section (right) 23b are drawn so as to be greatly different from each other, for the purpose of emphasizing that a relationship between each of the position and the orientation of the outer imaging section (left) 23a relative to the marker 61, which are calculated based on the left real world image, and each of the position and the orientation of the outer imaging section (right) 23b relative to the marker 61, which are calculated based on the right real world image, is not always ideal, as previously described.

Figure 27:
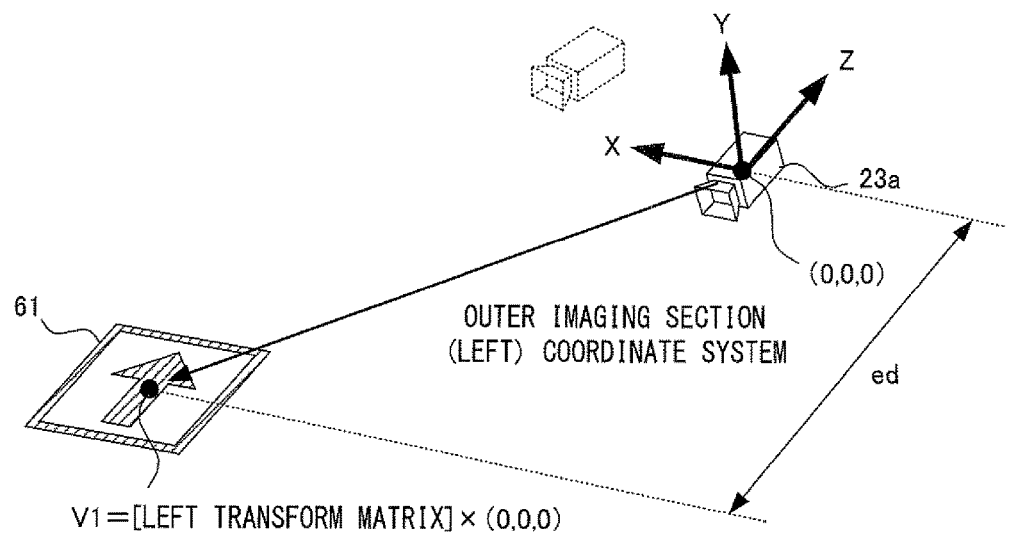
FIG. 27 shows a method of calculating coordinates of a right virtual camera 63R represented in a left virtual camera coordinate system.
Figure 28:
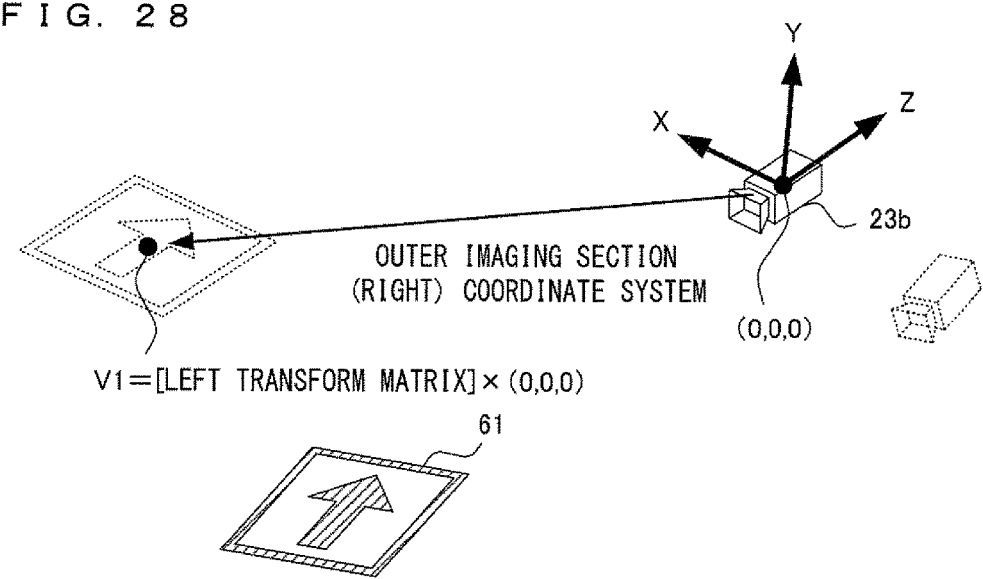
FIG. 28 shows an example of a method of calculating coordinates V0 shown in FIG. 29.
Figure 29:
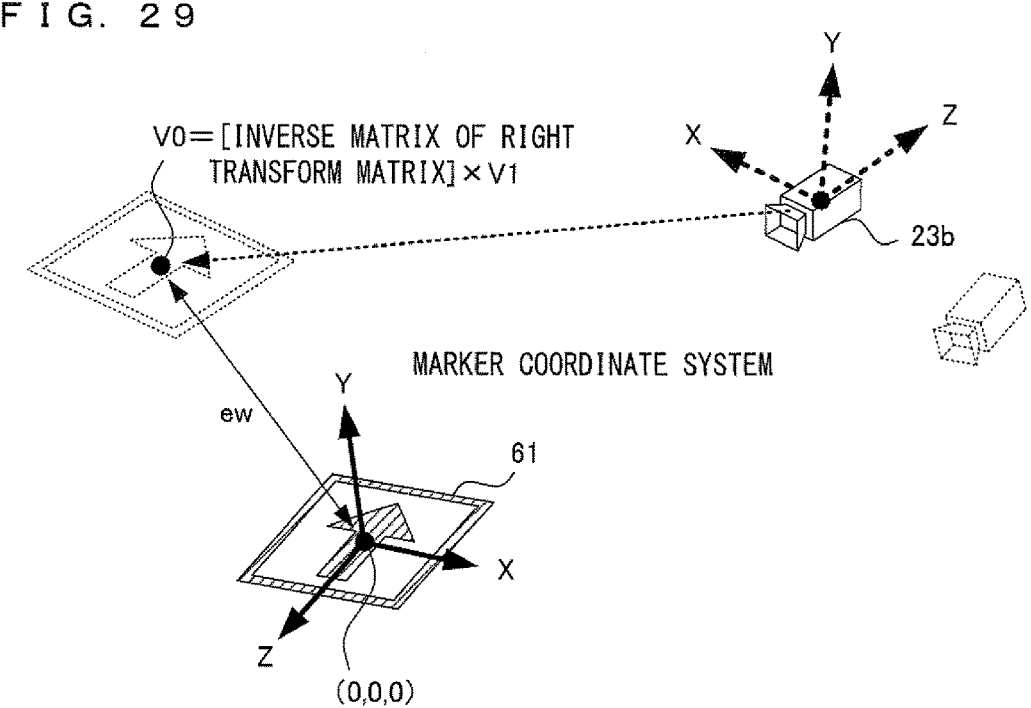
FIG. 29 shows a method of calculating coordinates of the left virtual camera 63L and coordinates of the right virtual camera 63R represented in a marker coordinate system.

First, as shown in FIG. 27, (0, 0, 0) is multiplied by the left transform matrix 75L, thereby obtaining coordinates V1, of the origin of the marker coordinate system, that are represented in the outer imaging section (left) coordinate system. The coordinates V1 indicate the position, of the marker 61 relative to the outer imaging section (left) 23a, which is calculated based on the left real world image. When the coordinates V1 is coordinates V1 are considered as coordinates represented in the outer imaging section (right) coordinate system, coordinates V1 indicate a position shown in FIG. 28, in the outer imaging section (right) coordinate system. The resultant coordinates V1 is multiplied by the inverse matrix of the right transform matrix 75R. Multiplication by the inverse matrix of the right transform matrix 75R corresponds to transform of coordinates represented in the outer imaging section (right) coordinate system into coordinates represented in the marker coordinate system. Therefore, the multiplication by the inverse matrix transforms the coordinate V1 (FIG. 28) represented in the outer imaging section (right) coordinate system into the coordinates V0 represented in the marker coordinate system as shown in FIG. 29. The coordinate V0 thus calculated indicates the difference between the position (coordinates, of the origin of the marker coordinate system, that are represented in the outer imaging section (left) coordinate system) of the marker 61 relative to the outer imaging section (left) 23a, which is calculated based on the left real world image, and the position (coordinates, of the origin of the marker coordinate system, that are represented in the outer imaging section (right) coordinate system) of the marker 61 relative to the outer imaging section (right) 23a, which is calculated based on the right real world image. In the present embodiment, the difference between the relative positions of the marker 61 is considered as being due to the difference between the attachment positions of the outer imaging section (left) 23a and the outer imaging section (right) 23b, thereby estimating the attachment positions of the outer imaging section (left) 23a and the outer imaging section (right) 23b.

In step S51, based on the left transform matrix 75L, the CPU 311 calculates the coordinates V1, of the origin of the marker coordinate system, that are represented in the outer imaging section (left) coordinate system. Specifically, (0, 0, 0) is multiplied by the left transform matrix 75L, thereby obtaining the coordinates V1, of the origin of the marker coordinate system, that are represented in the outer imaging section (left) coordinate system. It is noted that in the present embodiment, the coordinates, of the origin of the marker coordinate system, that are represented in the outer imaging section (left) coordinate system, are defined as V1. However, instead, the coordinates, of the origin of the marker coordinate system, that are represented in the outer imaging section (right) coordinate system, may be defined as V1.

In step S52, the CPU 311 stores, in ew (see FIG. 12), the magnitude (the distance from the origin) (see FIG. 29) of the V0 obtained in step S50, and stores, in ed (see FIG. 12), the absolute value (see FIG. 27) of the z-axis component of the V1 obtained in step S51. However, the value of ew is calculated in unit of length in the marker coordinate system. Therefore, the unit of ew does not coincide with unit of length in the real world. Moreover, as previously described, the actual distance between the outer imaging section (left) 23a and the outer imaging section (right) 23b is known (for example, 3.5 cm). Therefore, by using the actual distance and the value of ew, it is possible to match the unit of length in virtual space to the unit of length in the real world. It is noted that if the size of the marker 61 is known, it is also possible to match the unit of length in virtual space to the unit of length in the real world, by using a correspondence relationship between the size of the marker 61 calculated based on the result of recognition of the marker image, and the size of the marker 61 in the real world.

It is noted that in the case where the shooting direction of the outer imaging section (left) 23a and the shooting direction of the outer imaging section (right) 23b are not in parallel with each other owing to error in the attachment of the outer imaging section (left) 23a and the outer imaging section (right) 23b to the game apparatus 10, the distance (ew) between the outer imaging section (left) 23a and the outer imaging section (right) 23b calculated as described above varies in accordance with the distance in the shooting direction between the outer imaging section 23 and the marker 61. Therefore, as described later, when the distance in the shooting direction between the outer imaging section 23 and the marker 61 has varied, the distance (EyeWidth described later) between the outer imaging section (left) 23a and the outer imaging section (right) 23b is calculated again by using the marker-camera transform matrix as it is at this time.

It is noted that in the present embodiment, the ew indicates the magnitude of the V0. However, the ew may indicate the component of the V0 in the direction of a line connecting the position of the outer imaging section (left) 23a, which is indicated by the left transform matrix 75L, and the position of the outer imaging section (right) 23b, which is indicated by the right transform matrix 75R.

The ew calculated as described above indicates the interval between the outer imaging section (left) 23a and the outer imaging section (right) 23b in the marker coordinate system. The ew is used as the interval between the left virtual camera 63R and the right virtual camera 63R (in step S65 or S68 described later).

It is noted that there is another method of calculating the ew other than the above-described method. For example, (0, 0, 0) is multiplied by the left transform matrix 75L, thereby obtaining the coordinates V1, of the origin of the marker coordinate system, that are represented in the outer imaging section (left) coordinate system (that is, the position of the marker 61 relative to the outer imaging section (left) 23a). Moreover, (0, 0, 0) is multiplied by the right transform matrix 75R, thereby obtaining coordinates Vr, of the origin of the marker coordinate system, that are represented in the outer imaging section (right) coordinate system (that is, the position of the marker 61 relative to the outer imaging section (right) 23b). The ew may be obtained by calculating the distance between the coordinates V1 and the coordinates Vr calculated as described above.

In step S53, the CPU 311 determines whether or not the value of LogIndex (see FIG. 12) is larger than 1 (initial value). If the value of the LogIndex is larger than 1, the CPU 311 proceeds to step S57, and if not (that is, if the value of the LogIndex is 1), the CPU 311 proceeds to step S54. The LogIndex is a variable for identifying each component of arrays (LogWidth and LogDepth).

In step S54, the CPU 311 stores the value of the ew obtained in step S52 in the array LogWidth [LogIndex]. Moreover, the CPU 311 stores the value of the ed obtained in step S52 in the array LogDepth [LogIndex]. Moreover, the value of the LogIndex is incremented. The LogWidth is array variables for storing a plurality of values of the ew. The LogDepth is array variables for storing a plurality of values of the ed.

In step S55, the CPU 311 determines whether or not the value of the LogIndex is larger than the value of Log Max. If the value of the LogIndex is larger than the value of the Log Max, the CPU 311 proceeds to step S56, and if not (that is, if the value of the LogIndex is equal to or smaller than the value of the Log Max), the CPU 311 ends the virtual cameras interval determination processing.

In step S56, the CPU 311 calculates the average value of the components of the LogWidth, and stores the average value in the EyeWidth. Moreover, the CPU 311 calculates the average value of the components of the LogDepth, and stores the average value in the EyeDepth. Moreover, the CPU 311 sets the value of the EyeMeasure at false. Moreover, the CPU 311 sets the marker recognition mode 79 at the one-image recognition mode. The EyeDepth is a variable indicating the depth distance (the depth, the distance in the shooting direction) to the origin of the marker coordinate system from the coordinates of the position of the outer imaging section (left) 23a in the marker coordinate system, which is indicated by the left transform matrix 75L (or the coordinates of the position of the outer imaging section (right) 23b in the marker coordinate system, which is indicated by the right transform matrix 75R). The EyeDepth is used as a reference value for determination in step S72 in FIG. 17 described later. The initial value of the EyeDepth is 0. If processing in step S56 has been finished, the virtual cameras interval determination processing is ended.

In step S57, the CPU 311 determines whether or not: the absolute value of the difference between the value of the ew obtained in step S52 and the value of the LogWidth [1] is smaller than 10 percent of the value of the LogWidth [1]; and the absolute value of the difference between the value of the ed obtained in step S52 and the value of the LogDepth [1] is smaller than 10 percent of the value of the LogDepth

[1]. If the result of the determination in step S57 is positive, the CPU 311 proceeds to step S54, and if the result of the determination in step S57 is negative, the CPU 311 proceeds to step S58.

In step S58, the CPU 311 resets the value of the LogIndex at 1 (initial value), and ends the virtual cameras interval determination processing.

As described above, in the virtual cameras interval determination processing, the ew and the ed are calculated based on the position of the outer imaging section (left) 23a calculated based on the position and the orientation of the marker 61 in the left real world image, and the position of the outer imaging section (right) 23b calculated based on the position and the orientation of the marker 61 in the right real world image. The values of the ew and the values of the ed calculated in this manner are sequentially stored in the LogWidth and the LogDepth, respectively. At this time, if the value of the ew newly calculated is out of a predetermined range (±10%) from the value of the ew that was stored earliest in the LogWidth (that is, the value of the LogWidth [1]), or if the value of the ed newly calculated is out of a predetermined range (±10%) from the value of the ed that was stored earliest in the LogDepth (that is, the value of the LogDepth [1]), values of the ew or values of the ed are stored again in the LogWidth or the LogDepth from the beginning. Therefore, only when values of the ew and values of the ed which are sequentially calculated do not vary significantly (that is, values of the ew and the values of the ed have been stable, to a certain extent, for a certain period), the average value of the values of the ew and the average value of the values of the ed are stored in the EyeWidth and the EyeDepth.

It is noted that when the user is moving or turning the game apparatus 10, the left real world image and the right real world image shot by the outer imaging section 23 are likely to be blurred, and the accuracy of the recognition of the marker 61 significantly decreases. As a result, values of the ew or values of the ed which are sequentially detected are likely to vary significantly. It is desired to avoid determining the value of the EyeWidth and the value of the EyeDepth, based on values of the ew and values of the ed, having low reliability, detected in such a situation as described above. Therefore, in the present embodiment, only when values of the ew and values of the ed which are sequentially calculated do not vary significantly, the value of the EyeWidth and the value of the EyeDepth are determined based on the values of the ew and the values of the ed. In addition, the accuracies of the value of the EyeWidth and the value of the EyeDepth can be enhanced because the average value of a plurality of values of the ew and the average value of a plurality of values of the ed obtained by calculations performed a plurality of times are used as the value of the EyeWidth and the value of the EyeDepth, respectively.

(View Matrix Generation Processing)

Next, the view matrix generation processing in step S44 in the updating processing (FIG. 15) will be described with reference to the flowchart in FIG. 17.

Figure 17:
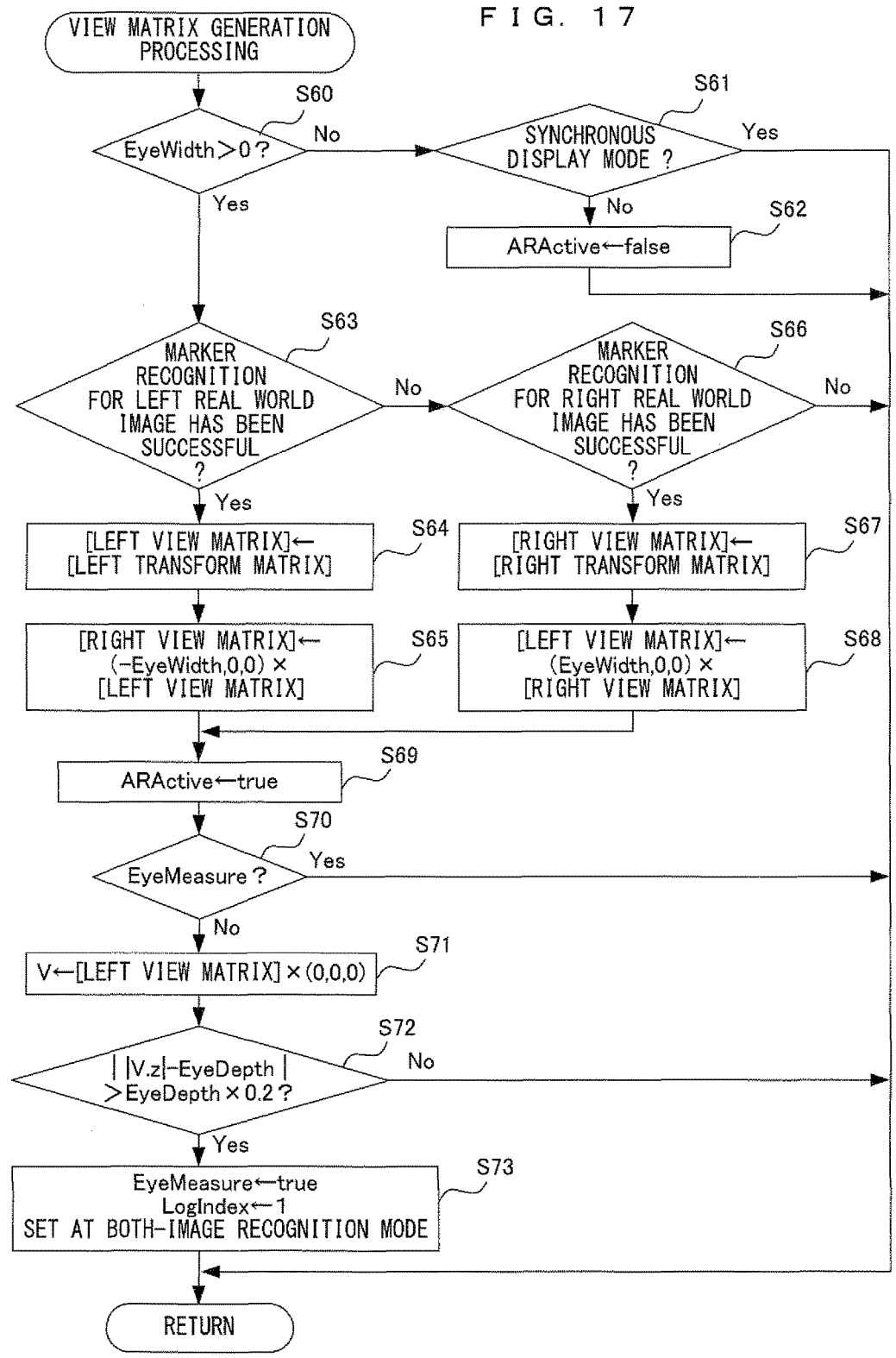
FIG. 17 is a flowchart showing the details of view matrix generation processing.

In step S60 in FIG. 17, the CPU 311 determines whether or not the value of the EyeWidth is larger than 0. If the value of the EyeWidth is larger than 0, the CPU 311 proceeds to step S63, and if not (that is, if the value of the EyeWidth is 0), the CPU 311 proceeds to step S61.

In step S61, the CPU 311 determines whether or not the display mode is the synchronous display mode. If the display mode is the synchronous display mode, the CPU 311 ends the view matrix generation processing, and if not (that is, if the display mode is the asynchronous display mode), the CPU 311 proceeds to step S62.

In step S62, the CPU 311 sets the value of the AR-Active at false. Then, the CPU 311 ends the view matrix generation processing.

In step S63, the CPU 311 determines whether or not the marker recognition for the left real world image has been successful, with reference to the left transform matrix 75L. If the marker recognition for the left real world image has been successful, the CPU 311 proceeds to step S64, and if not (that is, the value of the left transform matrix 75L is a null value), the CPU 311 proceeds to step S66.

In step S64, the CPU 311 stores the value of the left transform matrix 75L in the left view matrix 76L. This means that the position and the orientation of the outer imaging section (left) 23a in the marker coordinate system, which are calculated based on the position and the orientation of the marker 61 in the left real world image, are directly used as the position and the orientation of the left virtual camera 63L for generating a virtual space image for a left eye.

Figure 30:
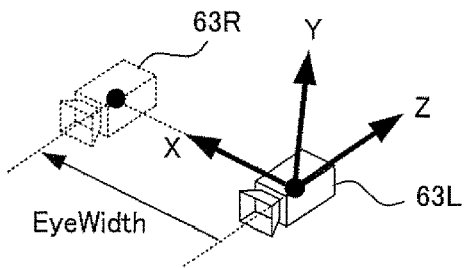
FIG. 30 shows the position of the right virtual camera 63R determined based on the position and the orientation of the left virtual camera 63L.

In step S65, the CPU 311 stores, in the right view matrix 76R, the value of the left view matrix 76L multiplied by a parallel movement matrix (−EyeWidth, 0, 0). This means that a position that is separated by the value of the EyeWidth in the positive direction of the x-axis in the left virtual camera coordinate system from the position of the left virtual camera 63L in the world coordinate system of the virtual space, which has been set in step S64, is used as the position of the right virtual camera 63R for generating a virtual space image for a right eye, as shown in FIG. 30. In addition, the orientation of the right virtual camera 63R is the same as that of the left virtual camera 63L (that is, the x-axis, the y-axis, and the z-axis in the left virtual camera coordinate system are in parallel with those in the right virtual camera coordinate system). As a result, the position and the orientation of the left virtual camera 63L, and the position and the orientation of the right virtual camera 63R are kept consistent with each other, whereby the virtual object 62 can be displayed on the upper LCD 22 so as to provide a normal stereoscopic view.

In step S66, the CPU 311 determines whether or not the marker recognition for the right real world image has been successful, with reference to the right transform matrix 75R. If the marker recognition for the right real world image has been successful, the CPU 311 proceeds to step S67, and if not (that is, the value of the right transform matrix 75R is a null value), the CPU 311 ends the view matrix generation processing.

In step S67, the CPU 311 stores the value of the right transform matrix 75R in the right view matrix 76R. This means that the position and the orientation of the outer imaging section (right) 23b in the marker coordinate system, which are calculated based on the position and the orientation of the marker 61 in the right real world image, are directly used as the position and the orientation of the right virtual camera 63R for generating a virtual space image for a right eye.

Figure 31:
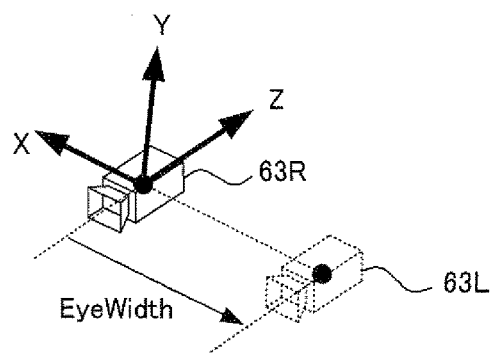
FIG. 31 shows the position of the left virtual camera 63L determined based on the position and the orientation of the right virtual camera 63R.

In step S68, the CPU 311 stores, in the left view matrix 76L, the value of the right view matrix 76R multiplied by a parallel movement matrix (EyeWidth, 0, 0). This means that a position that is separated by the value of the EyeWidth in the negative direction of the x-axis in the right virtual camera coordinate system from the position of the right virtual camera 63R in the world coordinate system of the virtual space, which has been set in step S67, is used as the position of the left virtual camera 63L for generating a virtual space image for a left eye, as shown in FIG. 31. In addition, the orientation of the left virtual camera 63L is the same as that of the right virtual camera 63R (that is, the x-axis, the y-axis, and the z-axis in the left virtual camera coordinate system are in parallel with those in the right virtual camera coordinate system). As a result, the position and the orientation of the left virtual camera 63L, and the position and the orientation of the right virtual camera 63R are kept consistent with each other, whereby the virtual object 62 can be displayed on the upper LCD 22 so as to provide normal stereoscopic viewing.

As described above, in the present embodiment, while the position and the orientation of one of the virtual cameras (for example, the left virtual camera 63L) are set by using (more specifically, directly using) a "marker-camera transform matrix" calculated from an image shot by one of the outer imaging sections (for example, the outer imaging section (left) 23a), the position and the orientation of the other one of the virtual cameras (for example, the right virtual camera 63R) are set without using a "marker-camera transform matrix" calculated from an image shot by the other one of the outer imaging sections (for example, the outer imaging section (right) 23b).

In providing a stereoscopic view of AR by using a stereo camera, two virtual cameras for right and left need to be set, and a transform matrix (left transform matrix 75L) for the outer imaging section (left) 23a and a transform matrix (right transform matrix 75R) for the outer imaging section (right) 23b are used as the "marker-camera transform matrices". In the present embodiment, in setting the virtual cameras 63L and 63R, the respective transform matrices 75L and 75R are not used. Instead, one transform matrix is set (one of the transform matrices 75L and 75R is directly used, or one new transform matrix (for example, using an average position and an average orientation) is generated from both the transform matrices 75L and 75R), and then the positions and the orientations of both the virtual cameras 63L and 63R are set by using the one transform matrix that has been set. In this way, problems on the accuracy of AR recognition can be solved.

In step S69, the CPU 311 sets the value of AR-Active at true. As a result, processing of displaying the virtual object 62 being superimposed onto the real world image is started, or restarted.

In step S70, the CPU 311 determines whether or not the value of the EyeMeasure is true. If the value of the EyeMeasure is true, the CPU 311 ends the view matrix generation processing, and if not (that is, if the value of the EyeMeasure is false), the CPU 311 proceeds to step S71.

Figure 32:
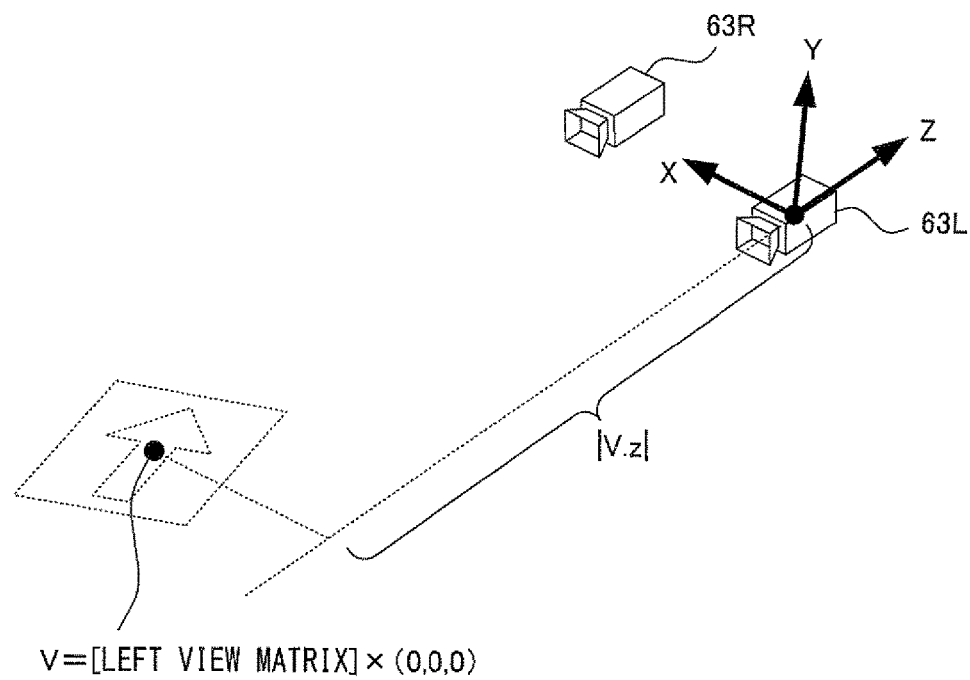
FIG. 32 shows |V·z|.

In step S71, based on the left view matrix 76L determined in step S64 or step S68, the CPU 311 calculates coordinates V, of the origin of the virtual space, that are represented in the left virtual camera coordinate system. Specifically, as shown in FIG. 32, (0, 0, 0) is multiplied by the left view matrix 76L, thereby obtaining the coordinates V, of the origin of the virtual space, that are represented in the left virtual camera coordinate system. It is noted that in the present embodiment, the coordinates, of the origin of the virtual space, that are represented in the left virtual camera coordinate system are defined as V. However, instead, coordinates, of the origin of the virtual space, that are represented in the right virtual camera coordinate system, which coordinates are calculated based on the right view matrix 76R determined in step S65 or step S67, may be defined as V. The V calculated as described above is substantially the same as the position of the marker 61 in the outer imaging section (left) coordinate system (it is noted that the value of the V is calculated in unit of length in the virtual space or the marker coordinate system, and does not coincides with unit of length in the real world).

In step S72, the CPU 311 determines whether or not the absolute value of the difference between the absolute value (|V·z|) of the z-coordinate value of the V and the value of the EyeDepth is larger than 20 percent of the value of the EyeDepth. If the absolute value of the difference is larger than 20 percent of the value of the EyeDepth, the CPU 311 proceeds to step S73, and if not, the CPU 311 ends the view matrix generation processing. The |V·z| is substantially the same as the distance (depth), in the shooting direction, from the outer imaging section 23 to the marker 61. That is, in step S72, the CPU 311 determines whether or not the depth distance (depth) from the outer imaging section 23 to the marker 61 has varied beyond a range of ±20 percent in comparison with the depth distance as it was when the value of the EyeWidth was calculated in the virtual cameras interval determination processing (FIG. 16).

In step S73, the CPU 311 sets the value of the EyeMeasure at true, resets the value of the LogIndex at 1, and sets the marker recognition mode 79 at the both-image recognition mode, thereby ending the view matrix generation processing. As a result, calculation of the EyeWidth in the virtual cameras interval determination processing is started again.

Figure 35:
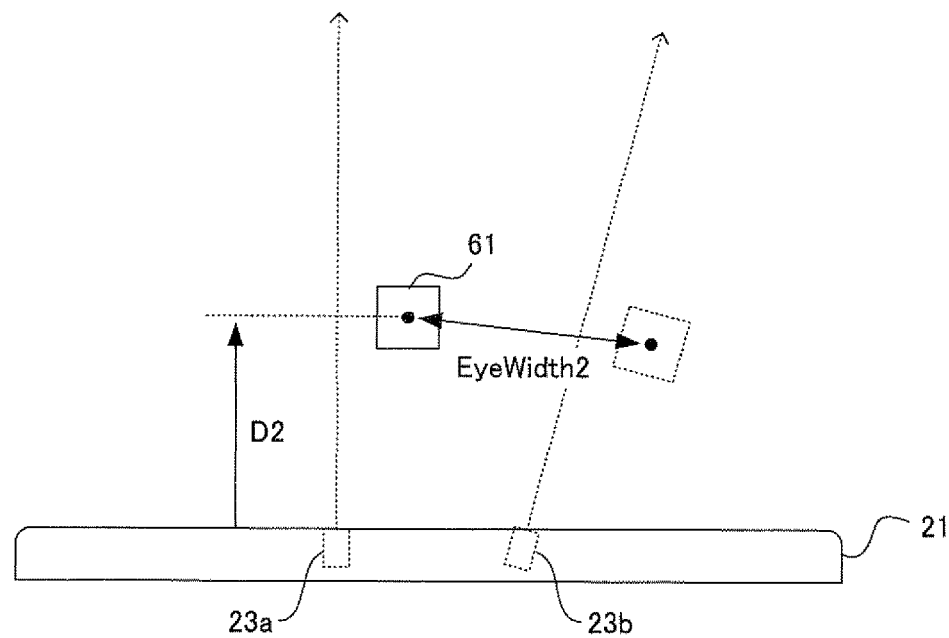
FIG. 35 is a diagram illustrating the reason for calculating EyeWidth again.
Figure 36:
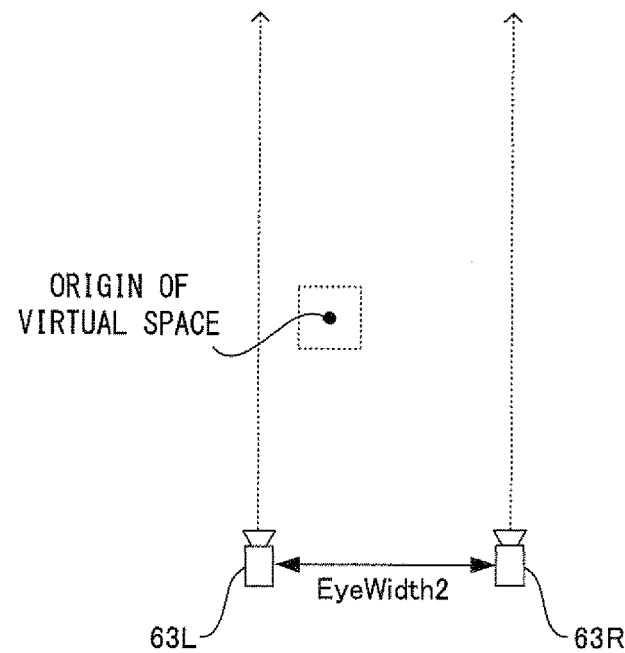
FIG. 36 is a diagram illustrating the reason for calculating EyeWidth again.

The reason why, as described above, the EyeWidth is calculated again when the depth distance (depth) from the outer imaging section 23 to the marker 61 has varied beyond a predetermined range in comparison with the depth distance as it was when the value of the EyeWidth was previously calculated in the virtual cameras interval determination processing, is because the optimum interval (EyeWidth) between the virtual cameras varies in accordance with the depth distance (depth) from the outer imaging section 23 to the marker 61 owing to error in the attachment of the outer imaging section (left) 23a and the outer imaging section (right) 23b to the game apparatus 10. For example, under the condition that the shooting direction of the outer imaging section (left) 23a and the shooting direction of the outer imaging section (right) 23b are not in parallel with each other, it is assumed that when the depth distance from the outer imaging section 23 to the marker 61 is D1, the value of the EyeWidth calculated in the virtual cameras interval determination processing is EyeWidth 1, as shown in FIG. 33. In this case, it is appropriate that in the virtual space, the left virtual camera 63L and the right virtual camera 63R are placed with an interval of the EyeWidth 1 provided therebetween as shown in FIG. 34 (as a result, for example, a virtual object placed at the origin of the virtual space is appropriately displayed in a stereoscopic manner as if the virtual object were really existent on the marker 61). Then, if the depth distance from the outer imaging section 23 to the marker 61 varies to D2 that is smaller than D1 as shown in FIG. 35, the value of the EyeWidth calculated in the virtual cameras interval determination processing is EyeWidth 2 that is smaller than the EyeWidth2. Therefore, it is appropriate that in the virtual space, the left virtual camera 63L and the right virtual camera 63R are placed with an interval of the EyeWidth 2 provided therebetween as shown in FIG. 36.

(Main Real World Image Setting Processing)

Next, the details of the main real world image setting processing in step S45 in the updating processing (FIG. 15) will be described with reference to the flowchart in FIG. 18.

Figure 18:
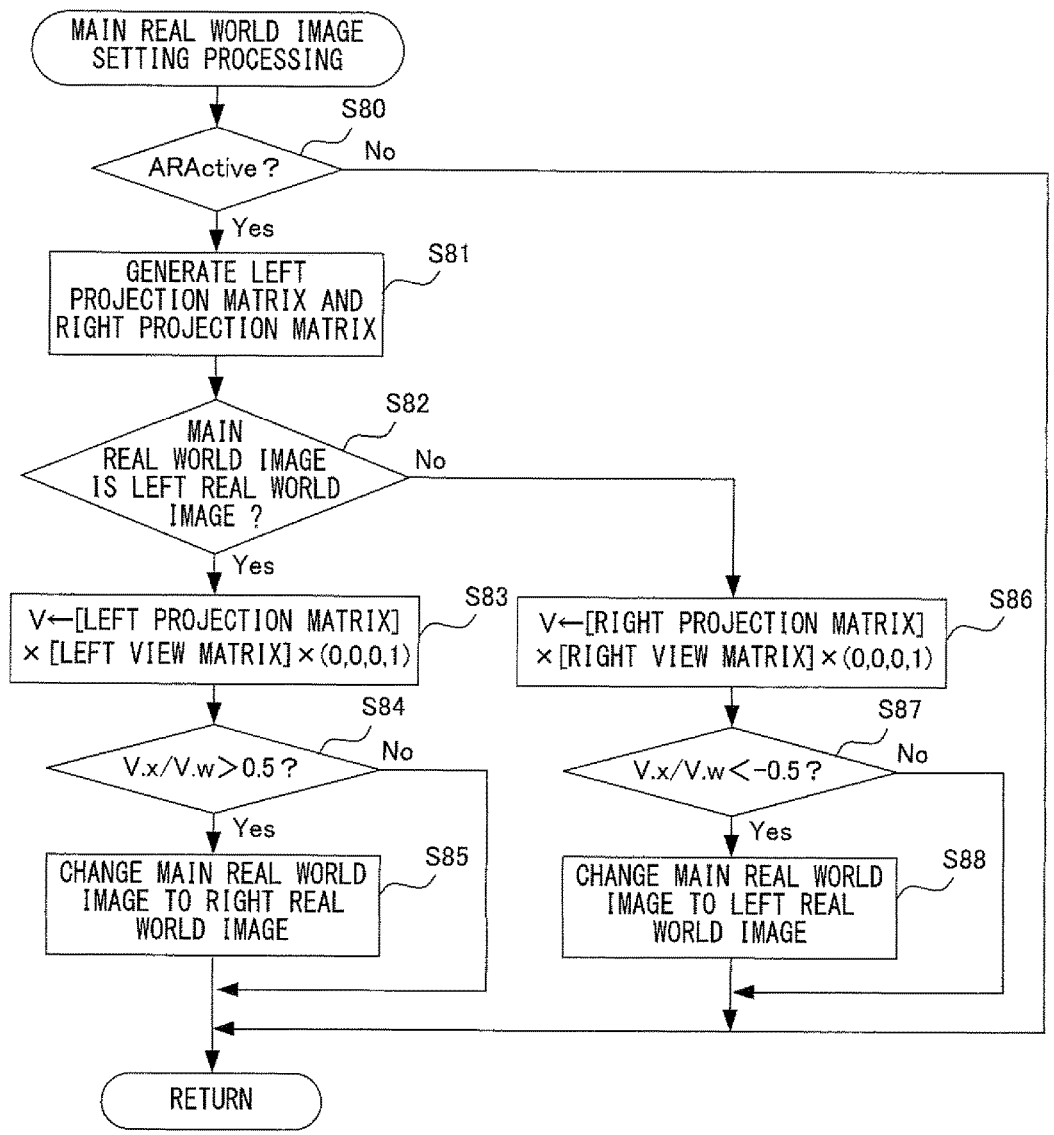
FIG. 18 is a flowchart showing the details of main real world image setting processing.

In step S80 in FIG. 18, the CPU 311 determines whether or not the value of the AR-Active is true. If the value of the AR-Active is true, the CPU 311 proceeds to step S81, and if not (that is, if the value of the AR-Active is false), the CPU 311 ends the main real world image setting processing.

Figure 37:
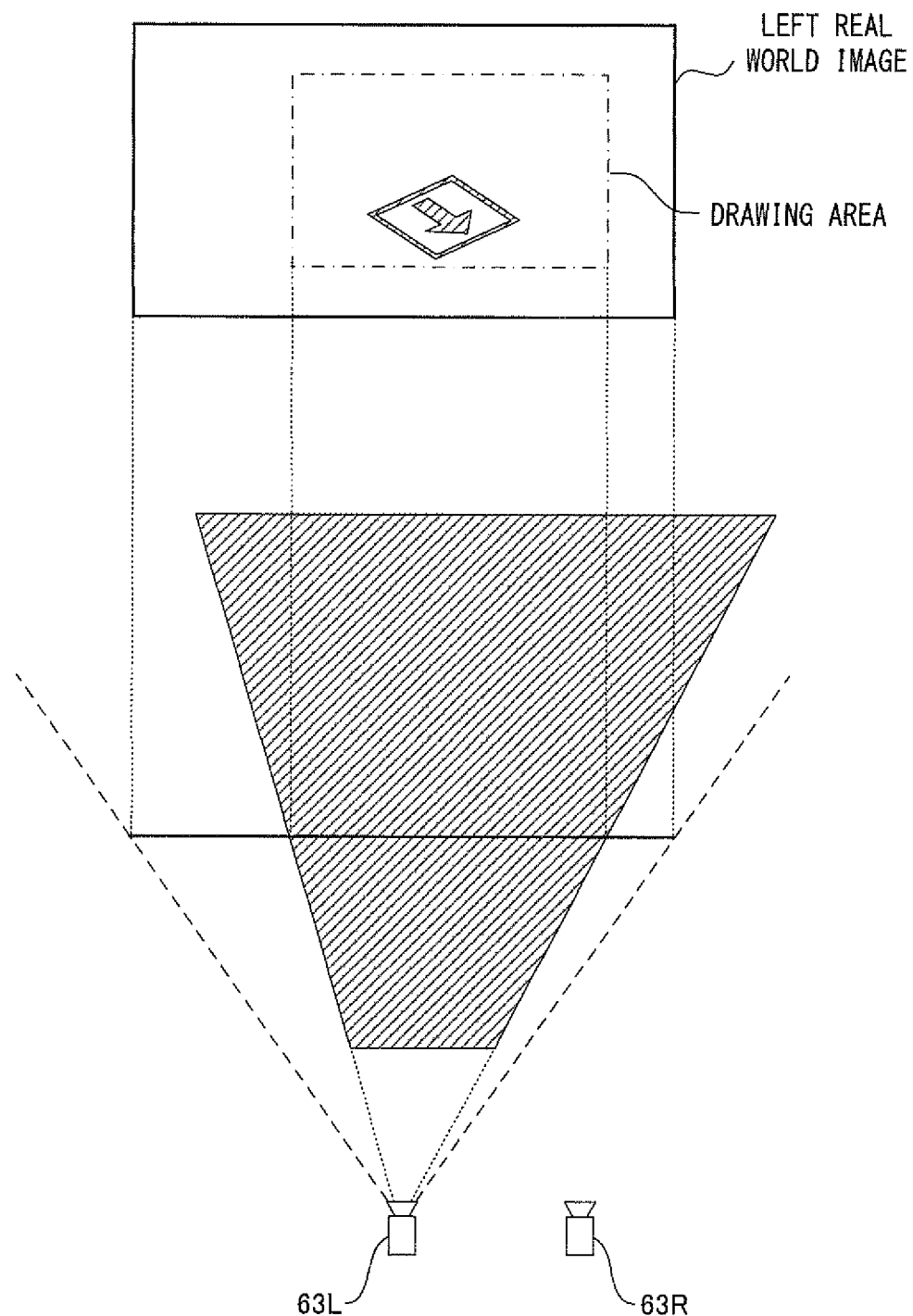
FIG. 37 is a diagram illustrating a left projection matrix.
Figure 38:
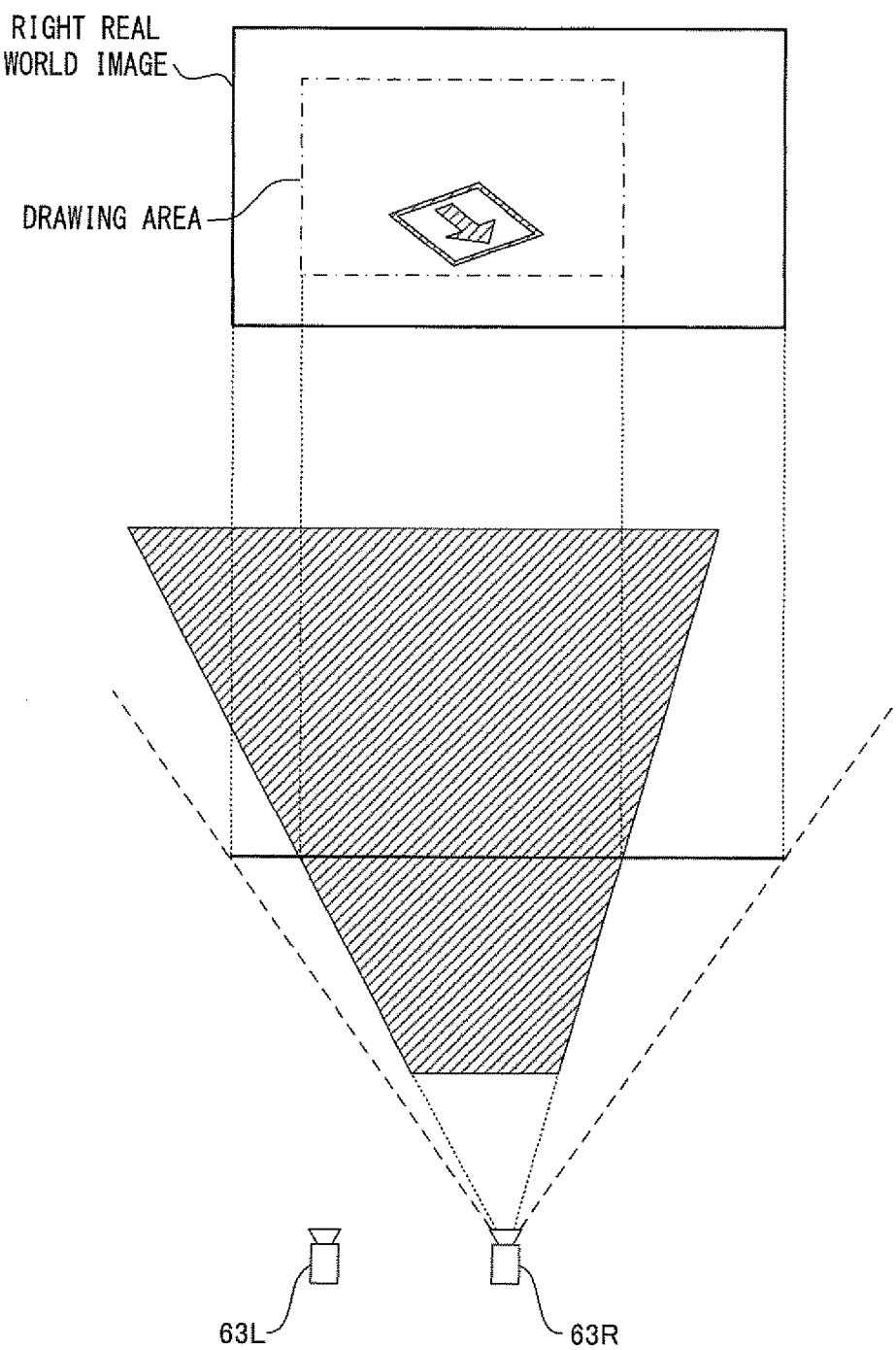
FIG. 38 is a diagram illustrating a right projection matrix.
Figure 39:
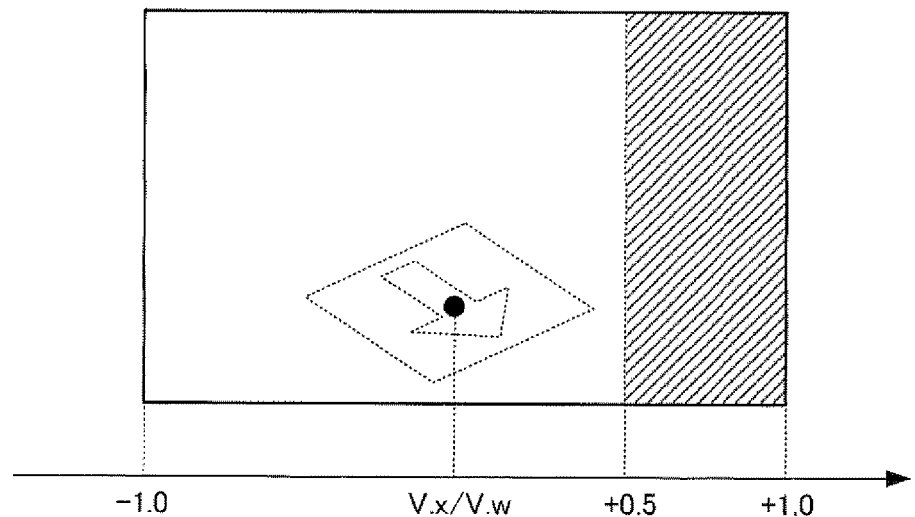
FIG. 39 is a diagram illustrating a method of determining whether or not to switch a main real world image from the left real world image to the right real world image.
Figure 40:
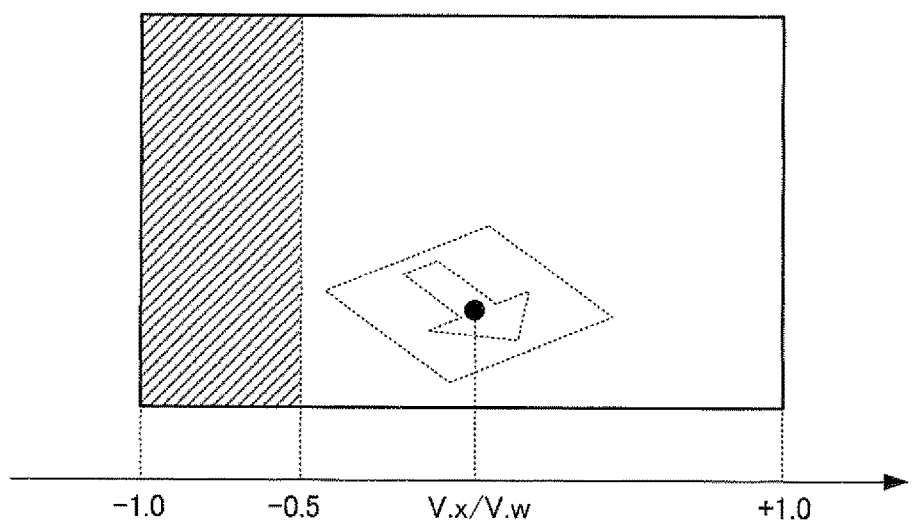
FIG. 40 is a diagram illustrating a method of determining whether or not to switch the main real world image from the right real world image to the left real world image.

In step S81, the CPU 311 generates the left projection matrix 77L and the right projection matrix 77R. The left projection matrix 77L is a matrix for specifying a drawing area of the virtual space as viewed from the left virtual camera 63L. In the present embodiment, as shown in FIG. 37, the left projection matrix 77L is generated so as to correspond to the drawing area of the left real world image determined in step S23 in the main processing. The right projection matrix 77R is a matrix for specifying a drawing area of the virtual space as viewed from the right virtual camera 63R. In the present embodiment, as shown in FIG. 38, the right projection matrix 77R is generated so as to correspond to the drawing area of the right real world image determined in step S27 in the main processing.

Specifically, the projection matrix for the left virtual camera 63L is set as a projection matrix that defines a view volume that has an angle of view such that the ratio of the angle of view in the horizontal direction of the outer imaging section (left) 23a, and the angle of view in the horizontal direction of the left virtual camera 63L is the same as the ratio representing the position and the size in the lateral direction of the drawing area with respect to the length in the lateral direction of the left real world image.

In step S82, the CPU 311 determines whether or not the left real world image is the main real world image. If the left real world image is the main real world image, the CPU 311 proceeds to step S83, and if not (that is, if the right real world image is the main real world image), the CPU 311 proceeds to step S86.

In step S83, the CPU 311 multiplies (0, 0, 0, 1) by the left view matrix 76L and the left projection matrix 77L, thereby obtaining a vector V.

In step S84, the CPU 311 determines whether or not a value (V·x/V·w) obtained by multiplying the first component (x) of the vector V by the fourth component (w) is larger than 0.5. If the value (V·x/V·w) is larger than 0.5, the CPU 311 proceeds to step S85, and if not, the CPU 311 ends the main real world image setting processing. The value of the V·x/V·w indicates the position in the lateral direction, in the virtual space image for a left eye, where the origin of the world coordinate system in the virtual space is present (it is noted that the position in the lateral direction, in the virtual space image for a left eye, where the origin of the world coordinate system in the virtual space is present, is equivalent to the position in the lateral direction, in an image shot by the outer imaging section (left) 23a, where the origin of the marker coordinate system is present). If the origin of the world coordinate system in the virtual space is at the middle of the virtual space image for a left eye, the value of the V·x/V·w is 0. The value of the V·x/V·w approaches −1.0 as the origin of the world coordinate system in the virtual space approaches the left end of the virtual space image for a left eye, and the value of the V·x/V·w approaches +1.0 as the origin of the world coordinate system in the virtual space approaches the right end of the virtual space image for a left eye. If the value of V·x/V·w is larger than 0.5, the origin of the world coordinate system in the virtual space is in the right end area (diagonal-line area in FIG. 39) of the virtual space image for a left eye. In other words, the marker 61 is in the right end area of the left real world image shot by the outer imaging section (left) 23a.

In step S85, the CPU 311 changes the main real world image from the left real world image to the right real world image. That is, in the virtual space image shot by the left virtual camera 63L, if the origin in the virtual space is present to the right of a position separated rightward by a predetermined distance (or by a predetermined percent of the lateral width of the virtual space image) from the middle of the virtual space image, the CPU 311 changes the main real world image to the right real world image. Alternatively, in the image shot by the outer imaging section (left) 23a, if the origin of the marker coordinate system is present to the right of a position separated rightward by a predetermined distance (or by a predetermined percent of the lateral width of the shot image) from the middle of the shot image, the CPU 311 changes the main real world image to the right real world image. Thus, even if, for example, the position of the marker 61 in the left real world image gradually moves rightward to end up disappearing from the left real world image, the CPU 311 changes the main real world image to the right real world image before the marker 61 disappears from the left real world image. Therefore, it is possible to continuously recognize the marker 61 in the one-image recognition mode. If processing in step S85 has been finished, the main real world image setting processing is ended.

In step S86, the CPU 311 multiplies (0, 0, 0, 1) by the right view matrix 76R and the right projection matrix 77R, thereby obtaining the vector V.

In step S87, the CPU 311 determines whether or not the value (V·x/V·w) obtained by multiplying the first component (x) of the vector V by the fourth component (w) is smaller than −0.5. If the value (V·x/V·w) is smaller than −0.5, the CPU 311 proceeds to step S87, and if not, the CPU 311 ends the main real world image setting processing. The value of the V·x/V·w indicates the position in the lateral direction, in the virtual space image for a right eye, where the origin of the world coordinate system in the virtual space is present. If the origin of the world coordinate system in the virtual space is at the middle of the virtual space image for a right eye, the value of the V·x/V·w is 0. The value of the V·x/V·w approaches −1.0 as the origin of the world coordinate system in the virtual space approaches the left end of the virtual space image for a right eye, and the value of the V·x/V·w approaches +1.0 as the origin of the world coordinate system in the virtual space approaches the right end of the virtual space image for a right eye. If the value of V·x/V·w is smaller than −0.5, the origin of the world coordinate system in the virtual space is in the left end area (diagonal-line area in FIG. 40) of the virtual space image for a right eye. In other words, the marker 61 is in the left end area of the right real world image shot by the outer imaging section (right) 23b.

In step S88, the CPU 311 changes the main real world image from the right real world image to the left real world image. Thus, even if for example, the position of the marker 61 in the right real world image gradually moves leftward to end up disappearing from the right real world image, the CPU 311 changes the main real world image to the left real world image before the marker 61 disappears from the right real world image. Therefore, it is possible to continuously recognize the marker 61 in the one-image recognition mode. If processing in step S88 has been finished, the main real world image setting processing is ended.

(Display Mode Switching Processing)

Next, the details of the display mode switching processing in step S46 in the updating processing (FIG. 15) will be described with reference to the flowchart in FIG. 19.

Figure 19:
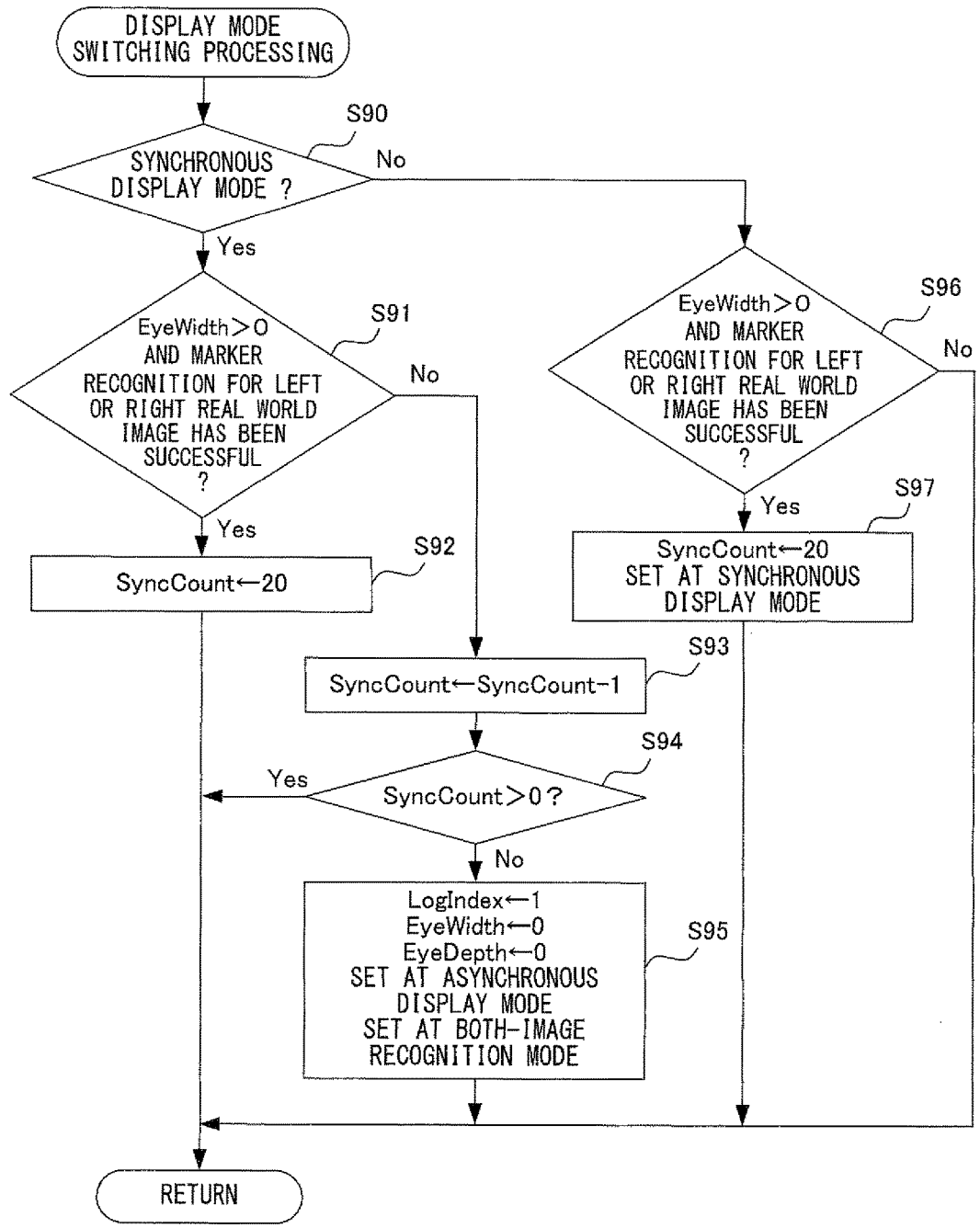
FIG. 19 is a flowchart showing the details of display mode switching processing.

In step S90 in FIG. 19, the CPU 311 determines whether or not the display mode is the synchronous display mode. If the display mode is the synchronous display mode, the CPU 311 proceeds to step S91, and if not (that is, if the display mode is the asynchronous display mode), the CPU 311 proceeds to step S96.

In step S91, the CPU 311 determines whether or not: the EyeWidth is larger than 0; and the marker recognition for the left real world image or the marker recognition for the right real world image has been successful. Then, if the result of the determination is positive, the CPU 311 proceeds to step S92, and if the result of the determination is negative (that is, if the EyeWidth is 0 or if both the marker recognition for the left real world image and the marker recognition for the right real world image have been failed), the CPU 311 proceeds to step S93.

In step S92, the CPU 311 sets the value of SyncCount (see FIG. 12) at 20. The SyncCount is a variable for determining a timing of switching the display mode from the synchronous display mode to the asynchronous display mode. If processing in step S92 has been finished, the display mode switching processing is ended.

In step S93, the CPU 311 decrements the value of SyncCount.

In step S94, the CPU 311 determines whether or not the value of the SyncCount is larger than 0. If the value of the SyncCount is larger than 0, the CPU 311 ends the display mode switching processing, and if not (that is, the value of the SyncCount is 0), the CPU 311 proceeds to step S95.

In step S95, the CPU 311 sets the value of the LogIndex at 1, sets the value of the EyeWidth and the value of the EyeDepth at 0, changes the display mode 78 from the synchronous display mode to the asynchronous display mode, and sets the marker recognition mode 79 to the both-image recognition mode. If processing in step S95 has been finished, the display mode switching processing is ended.

In step S96, the CPU 311 determines whether or not: the EyeWidth is larger than 0; and the marker recognition for the left real world image or the marker recognition for the right real world image has been successful. Then, if the result of the determination is positive, the CPU 311 proceeds to step S97, and if the result of the determination is negative (that is, if the EyeWidth is 0 or if both the marker recognition for the left real world image and the marker recognition for the right real world image have been failed), the CPU 311 ends the display mode switching processing.

In step S97, the CPU 311 sets the value of SyncCount at 20, and changes the display mode from the asynchronous display mode to the synchronous display mode. If processing in step S97 has been finished, the display mode switching processing is ended.

As described above, the display mode switching processing appropriately switches the display mode between the synchronous display mode and the asynchronous display mode. More specifically, just after execution of the image display program has been started, the display mode is the asynchronous display mode, and the latest real world image is constantly displayed on the upper LCD 22. Thereafter, at the time when the marker 61 has been recognized and it has become possible to display the virtual object 62 being superimposed onto the real world image displayed on the upper LCD 22, the display mode is changed from the asynchronous display mode to the synchronous display mode. In the synchronous display mode, in order to superimpose and display the virtual object 62 at a proper position in the real world image, a composite image obtained by superimposing the virtual object 62 onto the last real world image in which the marker 61 has been recognized (which is not always the latest real world image) is displayed on the upper LCD 22. In this way, the position on the real world image where the virtual object 62 is superimposed and displayed can be prevented from being out of a proper position. Thereafter, at the time when the marker 61 has continued to be unrecognized for a predetermined time period, the display mode is changed from the synchronous display mode to the asynchronous display mode, and the latest real world image is constantly displayed on the upper LCD 22. In this way, when the marker 61 continues to be unrecognized, it is possible to prevent an old image from continuing to be displayed on the upper LCD 22.

(Effects of the Present Embodiment)

As described above, in the present embodiment, the position and the orientation of one of the virtual cameras is determined based on the position and the orientation of one of the outer imaging sections (the outer imaging section (left) 23a or the outer imaging section (right) 23b) in the marker coordinate system, which are calculated from the result of the marker recognition for the corresponding one of the left real world image and the right real world image. In addition, the position and the orientation of the other one of the virtual cameras are determined such that the relationship between each of the position and the orientation of the left virtual camera 63L, and each of the position and the orientation of the right virtual camera 63R, is ideal. Therefore, the virtual object 62 can be displayed so as to provide a normal stereoscopic view, on a display apparatus capable of providing a stereoscopic view.

In addition, the interval between the two outer imaging sections are calculated based on the position of the outer imaging section (left) 23a calculated based on the result of the marker recognition for the left real world image, and the position of the outer imaging section (right) 23b calculated based on the result of the marker recognition for the right real world image. The virtual cameras interval (EyeWidth) is determined based on the result of the calculation. A position separated, by the calculated interval in the direction perpendicular to the shooting direction in a coordinate system of one of the virtual cameras, from the position of the one of the virtual cameras, is calculated, to set the other one of the virtual cameras at the calculated position. As a result, both the virtual cameras are set so as to be placed along the direction perpendicular to the shooting direction. In addition, even if the interval between the outer imaging section (left) 23a and the outer imaging section (right) 23b is not known, or even if the accuracy in the attachment of the outer imaging section (left) 23a and the outer imaging section (right) 23b to the game apparatus 10 is bad, it is possible to place the left virtual camera 63L and the right virtual camera 63R with an ideal interval provided therebetween.

In addition, after the virtual cameras interval (EyeWidth) has been determined in the virtual cameras interval determination processing, the marker recognition processing needs to be performed only for the main real world image. Therefore, a load of processing can be reduced in comparison with the case where the marker recognition processing is always performed for both the left real world image and the right real world image.

It is noted that if the interval between the outer imaging section (left) 23a and the outer imaging section (right) 23b is known, the interval (EyeWidth), between the outer imaging section (left) 23a and the outer imaging section (right) 23b in the marker coordinate system, that corresponds to the interval (for example, 3.5 cm) between the outer imaging section (left) 23a and the outer imaging section (right) 23b in the real world, is figured out based on the result of the virtual cameras interval determination processing. Therefore, for example, it is possible to, in the virtual space, perform processing based on a scale of the real world such as displaying a character (virtual object) having a height of 30 cm being superimposed onto the real world image, or moving a character (virtual object) displayed being superimposed onto the real world image real world image at a velocity of 10 cm per second.

(Variations)

It is noted that in the present embodiment, the position and the orientation of the marker 61 in the real world image are recognized, and the virtual object 62 is superimposed onto the real world image in accordance with the result of the recognition. However, in other embodiments, instead of the marker 61, the position and/or the orientation of any recognition target may be recognized, and the virtual object 62 may be superimposed onto the real world image in accordance with the result of the recognition. An example of a recognition target is the face of a person.

In addition, in the present embodiment, a stereoscopic image is displayed on the upper LCD 22, based on the real world image being shot in real time by the outer imaging section 23. However, in other embodiments, a stereoscopic image may be displayed on the upper LCD 22, based on data of moving images shot in the past by the outer imaging section 23, an external stereo camera, or the like.

In addition, in the present embodiment, the outer imaging section 23 is provided in the game apparatus 10 in advance. However, in other embodiments, an external camera attachable to and detachable from the game apparatus 10 may be used.

In addition, in the present embodiment, the upper LCD 22 is provided in the game apparatus 10 in advance. However, in other embodiments, an external stereoscopic display attachable to and detachable from the game apparatus 10 may be used.

In addition, in the present embodiment, the virtual object 62 is placed at the position of the origin of the marker coordinate system. However, in other embodiments, the virtual object 62 may be placed at a position away from the origin of the marker coordinate system.

In addition, in the present embodiment, one virtual object is placed in the virtual space. However, in other embodiments, a plurality of virtual objects may be placed in the virtual space.

In addition, in the present embodiment, in the virtual cameras interval determination processing, the interval (EyeWidth) between the outer imaging section (left) 23a and the outer imaging section (right) 23b in the marker coordinate system is calculated, and based on the interval, the position and the orientation of one of the left virtual camera 63L and the right virtual camera 63R are determined from the position and the orientation of the other one of the virtual cameras calculated based on the result of the marker recognition. However, in other embodiments, the position and the orientation of the outer imaging section 23 (for example, the average position of the position of the outer imaging section (left) 23a and the position of the outer imaging section (right) 23b, and the average orientation of the orientation of the outer imaging section (left) 23a and the orientation of the outer imaging section (right) 23b) may be calculated based on the position and the orientation of the outer imaging section (left) 23a calculated based on the result of the marker recognition for the left real world image, and the position and the orientation of the outer imaging section (right) 23b calculated based on the result of the marker recognition for the right real world image. Based on the result of the calculation, the positions and/or the orientations of the left virtual camera 63L and the right virtual camera 63R may be determined. For example, the orientations of the left virtual camera 63L and the right virtual camera 63R may be determined such that both the orientations are intermediate between the orientation of the outer imaging section (left) 23a calculated based on the result of the marker recognition for the left real world image, and the orientation of the outer imaging section (right) 23b calculated based on the result of the marker recognition for the right real world image. In addition, for example, after the interval (EyeWidth) between the outer imaging section (left) 23a and the outer imaging section (right) 23b is calculated in the virtual cameras interval determination processing, positions separated, by distances of EyeWidth/2 in the respective directions opposite to each other and perpendicular to the shooting direction of the virtual cameras, from a position in the virtual space corresponding to the average position of the position of the outer imaging section (left) 23a calculated based on the result of the marker recognition for the left real world image, and the position of the outer imaging section (right) 23b calculated based on the result of the marker recognition for the right real world image, may be calculated, and the positions of the left virtual camera 63L and the right virtual camera 63R may be determined so as to be the calculated positions.

In addition, in the present embodiment, after the virtual cameras interval (EyeWidth) is calculated in the virtual cameras interval determination processing, the marker recognition processing is performed for only the main real world image. However, in other embodiments, the marker recognition processing may be always performed for both the left real world image and the right real world image.

In addition, in the present embodiment, the upper LCD 22 is a stereoscopic display apparatus of a parallax barrier type. However, in other embodiments, the upper LCD 22 may be a stereoscopic display apparatus of any other type such as lenticular lens type. For example, if a stereoscopic display apparatus of a lenticular lens type is used, an image for a left eye and an image for a right eye may be combined with each other by the CPU 311 or another processor, and the resultant composite image may be supplied to the stereoscopic display apparatus of a lenticular lens type.

In addition, in the present embodiment, the game apparatus 10 is used for superimposing a virtual object onto the real world image and displaying the resultant image. However, in another embodiment, any information processing apparatus or any information processing system (for example, a FDA (Personal Digital Assistant), a mobile phone, a personal computer, or a camera) may be used for superimposing a virtual object onto the real world image and displaying the resultant image.

In addition, in the present embodiment, the image display processing is executed by using only one information processing apparatus (game apparatus 10). However, in other embodiments, a plurality of information processing apparatuses, included in an image display system, that can communicate with each other may share the execution of the image display processing.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an image display program which is configured to stereoscopically display a real world image onto which a 3-dimensional virtual object is superimposed on a screen of a stereoscopic display apparatus configured to provide a stereoscopic view to a user, the stereoscopic display apparatus including a computing system that includes at least one processor circuit coupled to a memory device, the memory device configured to store real world image data output by a left camera and a right camera, the image display program comprising instructions that are, when executed by a computing system, configured to:
  recognize a predetermined shooting target from the stored real world image data output by the left camera and the right camera;
  calculate multiple first position orientation information, which are each based on separate relate world image data acquired over a period of time, indicating relative positions and relative orientations of the right camera and the predetermined shooting target with respect to each other;
  calculate multiple second position orientation information, which are each based on separate relate world image data acquired over the period of time, indicating relative positions and relative orientations of the left camera and the predetermined shooting target with respect to each other;
  determine how much the calculated multiple first position orientation information and the calculated multiple second position orientation information vary;
  as a result of determination that the calculated multiple first position orientation information and the calculated multiple second position orientation information vary less than the predetermined amount, calculate pose data, which is indicative of a single position and a single orientation in a virtual space, as a function of multiple calculated first position orientation information and multiple calculated second position orientation information;
  calculate a midpoint, as the single position, between the relative position of the right camera and the relative position of the left camera;
  calculate a position and an orientation of a right virtual camera for generating a right virtual space image of the virtual space based on the calculated pose data;
  calculate a position and an orientation of a left virtual camera for generating a left virtual space image in the virtual space based on the calculated pose data;
  generate the right virtual space image as viewed from the right virtual camera in accordance with the calculated position and the calculated orientation of the right virtual camera;
  generate the left virtual space image as viewed from the left virtual camera in accordance with the calculated position and the calculated orientation of the left virtual camera;
  superimpose the right virtual space image onto the real world image data outputted from the right camera;
  superimpose the left virtual space image onto the real world image data outputted from the left camera; and
  output the superimposed images to the stereoscopic display apparatus for a stereoscopic view,
  wherein the positions of the right virtual camera and the left virtual camera are symmetrically set about the calculated midpoint.

2. The non-transitory computer-readable storage medium according to claim 1, wherein the determined position and determined orientation of the right virtual camera and the left virtual camera are determined such that a relative orientation between the right virtual camera and the left virtual camera is the same as the relative orientation between the right camera and the left camera.

3. The non-transitory computer-readable storage medium according to claim 1, wherein the orientation of the right virtual camera and the orientation of the left virtual camera are respectively calculated based on, among the single orientation and the single position, only the single orientation.

4. The non-transitory computer-readable storage medium according to claim 1, wherein the position of the right virtual camera and the position of the left virtual camera are respectively calculated based on, among the single orientation and the single position, only the single position.

5. The non-transitory computer-readable storage medium according to claim 1, wherein the instructions are further configured to determine a distance between the right virtual camera and the left virtual camera,
  wherein the position of the right virtual camera and the position of the left virtual camera are separated by the determined distance.

6. The non-transitory computer-readable storage medium according to claim 5, wherein the distance between the right virtual camera and the left virtual camera is determined based on a parallax between the respective real world image data output by a left camera and a right camera.

7. The non-transitory computer-readable storage medium according to claim 5, wherein the distance between the right virtual camera and the left virtual camera is determined by using the calculated second position orientation information and the calculated first position orientation information.

8. The non-transitory computer-readable storage medium according to claim 1, wherein the single orientation is an average of the first orientation information and the second orientation information.

9. The non-transitory computer-readable storage medium of claim 1, wherein the pose data is a transformation matrix which indicates the single position and the single orientation.

10. An image display apparatus which stereoscopically displays a real world image onto which a 3-dimensional virtual object is superimposed, the image display apparatus comprising:
  a memory device configured to store real world image data output by a left camera and a right camera; and
  a processing system that includes at least one processor circuit coupled to the memory device, the processing system configured to:
    recognize a target object from the stored respective real world image data output by the left camera and the right camera;
    calculate multiple first relative information, which are each based on separate relative real world image data acquired from the right camera over a period of time, indicating relative positions and relative orientations of the right camera and the target object with respect to each other;
    calculate multiple second relative information, which are each based on separate relative real world image data acquired from the left camera over a period of time, indicating relative positions and relative orientations of the left camera and the target object with respect to each other;
    determine how much the calculated multiple first relative information and the calculated multiple second relative information vary;
    as a result of determination that the calculated multiple first relative information and the calculated multiple second relative information vary less than the predetermined amount, calculate pose data, which indicates a single position and a single orientation in a virtual space, as a function of the multiple first relative information and the multiple second relative information;

calculate a midpoint, as the single position, between the relative position of the right camera and the relative position of the left camera;

set a position and an orientation of a right virtual camera in the virtual space as a function of the calculated pose data, which is indicative of the single position and the single orientation;

set a position and an orientation of a left virtual camera in the virtual space as a function of the pose data, which is indicative of the single position and the single orientation;

generate a right virtual space image of a virtual space as viewed from the right virtual camera at the set position and orientation thereof;

generate a left virtual space image of the virtual space as viewed from the left virtual camera at the set position and orientation thereof;

superimpose the right virtual space image with the real world image data output by the right camera;

superimpose the left virtual space image with the real world image data output by the left camera; and output the superimposed images for a stereoscopic view to a stereoscopic display apparatus, wherein the positions of the right virtual camera and the left virtual camera are symmetrically set about the calculated midpoint.

11. The image display apparatus of claim 10, wherein the pose data is a variable and the processing system is further configured to store the calculated variable to the memory device, wherein the pose data is used to set right and left virtual cameras over plural consecutive superimposed images that are output to the stereoscopic display.

12. The image display apparatus of claim 11, wherein the variable is a transformation matrix.

13. The image display apparatus of claim 10, wherein the processing system is further configured to:

calculate an interval for setting the right and left virtual cameras;

store the calculated interval and use the calculated interval to set the left and right virtual cameras for multiple different left and right generated virtual space images without recalculating the interval; and in response to determination that a determined depth distance between the right and/or left camera and the target object has changed by more than the threshold amount, recalculate and update the stored interval.

14. An image display system, the image display system comprising:

a left camera configured to output left real world image data;

a right camera configured to output right real world image data;

a predetermined shooting target;

a memory device configured to store the left and right real world image data;

a processing system that includes at least one processor circuit coupled to the memory device, the processing system configured to:

recognize the predetermined shooting target in each of the left and right real world image data stored in the memory device;

calculate multiple right position orientation information, which are each based on separate relative world image data acquired from the right camera over a period of time, that indicates relative positions and relative orientations of the right camera and the predetermined shooting target with respect to each other;

calculate multiple left position orientation information, which are each based on separate relative world image data acquired from the left camera over a period of time, that indicates relative positions and relative orientations of the left camera and the predetermined shooting target with respect to each other;

determine how much the calculated multiple left position orientation information and the calculated multiple right position orientation information vary;

as a result of determination that the calculated multiple left position orientation information and the calculated multiple right position orientation information vary less than the predetermined amount, calculate combined position orientation data, which is indicative of a single position and a single orientation in a three-dimensional virtual space, as a function of the left and right position orientation information;

calculate a midpoint, as the single position, between the relative position of the right camera and the relative position of the left camera;

set the position and the orientation of a right virtual camera in the three-dimensional virtual space based on the calculated combined position orientation data;

set the position and the orientation of a left virtual camera in the three-dimensional virtual space based on the calculated combined position orientation data;

generate a right virtual space image of a virtual space as viewed from the set right virtual camera; and generate a left virtual space image of a virtual space as viewed from the set left virtual camera; and a stereoscopic display apparatus configured to display a first superimposed image and a second superimposed image as a stereoscopic image, where the first superimposed image is based on the right virtual space image and right real world image data and the second superimposed image is based on the left virtual space image and the left real world image data, wherein the positions of the right virtual camera and the left virtual camera are symmetrically set about the calculated midpoint.

15. The image display system of claim 14, wherein the combined position orientation data is a transformation matrix.

16. An image display method for stereoscopically displaying a real world image onto which a 3-dimensional virtual object is superimposed, on a screen of a stereoscopic display apparatus capable of providing a stereoscopic view, the stereoscopic display apparatus including a computing system with at least one processor circuit coupled to a memory device, the memory device configured to store left and right real world image data respectively output by a left camera and a right camera, the image display method comprising:

recognizing a predetermined shooting target in the stored right real world image data and the stored left real world image data;

calculating multiple first poses, which are each based on separate right real world image data acquired over a period of time, which indicates a relative position and a relative orientation of the right camera and the predetermined shooting target with respect to each other;

calculating multiple second poses, which are each based on separate left real world image data acquired over a period of time, which indicates a relative position and a relative orientation of the left camera and the predetermined shooting target with respect to each other;

determine how much the calculated multiple first poses and the calculated second poses information vary;

as a result of determination that the calculated multiple first poses and calculated multiple second poses vary less than the predetermined amount, calculating one pose as a function of the multiple first poses and the multiple second poses, the calculated one pose indicating a single position and a single orientation in a virtual space;

calculating a midpoint, as the single position, between the relative position of the right camera and the relative position of the left camera;

determining the pose of a right virtual camera as a function of the single position and the single orientation indicated by the calculated one pose;

determining the pose of a left virtual camera as a function of the single position and the single orientation indicated by the calculated one pose;

generating a right virtual space image indicating the predetermined virtual space as it is looked at from the right virtual camera that is set at the determined pose of the right virtual camera;

generating a left virtual space image indicating the predetermined virtual space as it is looked at from the left virtual camera that is set at the determined pose of the left virtual camera; and superimposing the right virtual space image onto the right real world image, and superimposing the left virtual space image onto the left real world image, to output images for a stereoscopic view to the stereoscopic display apparatus, wherein positions of the right virtual camera and the left virtual camera are symmetrically set about the calculated midpoint.

17. The image display method of claim 16, wherein the one pose is a transformation matrix.

* * * * *